United States Patent
Takenaka et al.

(10) Patent No.: US 10,794,043 B2
(45) Date of Patent: Oct. 6, 2020

(54) WORK VEHICLE AND CONTROL METHOD FOR WORK VEHICLE

(71) Applicant: KOMATSU LTD., Tokyo (JP)

(72) Inventors: Yuita Takenaka, Tokyo (JP); Masanori Ikari, Tokyo (JP); Masanobu Nakabayashi, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 16/084,390

(22) PCT Filed: Aug. 25, 2017

(86) PCT No.: PCT/JP2017/030615
§ 371 (c)(1),
(2) Date: Sep. 12, 2018

(87) PCT Pub. No.: WO2018/038266
PCT Pub. Date: Mar. 1, 2018

(65) Prior Publication Data
US 2019/0078299 A1    Mar. 14, 2019

(30) Foreign Application Priority Data
Aug. 26, 2016 (JP) .................... 2016-165943

(51) Int. Cl.
*B62D 6/00* (2006.01)
*E02F 9/22* (2006.01)
(Continued)

(52) U.S. Cl.
CPC ............... *E02F 9/225* (2013.01); *B62D 1/12* (2013.01); *B62D 1/14* (2013.01); *B62D 5/04* (2013.01);
(Continued)

(58) Field of Classification Search
CPC ..................................... B62D 6/008
See application file for complete search history.

(56) References Cited

U.S. PATENT DOCUMENTS 6,179,082 B1    1/2001  Ikari
6,202,501 B1    3/2001  Ikari
(Continued)

FOREIGN PATENT DOCUMENTS

CN    201882143 U    6/2011
CN    103963836 A    8/2014
(Continued)

OTHER PUBLICATIONS

The extended European search report for the corresponding European application No. 17843742.2, dated Sep. 6, 2019.
(Continued)

*Primary Examiner* — F Daniel Lopez
(74) *Attorney, Agent, or Firm* — Global IP Counselors, LLP

(57) ABSTRACT

A work vehicle includes a hydraulic actuator, a control valve, a pressure sensing unit, a force imparting component, and a controller. The hydraulic actuator varies a steering angle. The control valve controls flow of fluid supplied to the hydraulic actuator. The operation member is configured to be operated by an operator and to control the control valve when varying the steering angle. The pressure sensing unit senses a pressure produced by the hydraulic actuator. The force imparting component imparts an assisting force or a counterforce to operation of the operation member. The controller controls the force imparting component so as to generate resistance to operation of the operation member based on a pressure value sensed by the pressure sensing unit.

10 Claims, 28 Drawing Sheets

(51) Int. Cl.

| | | |
|---|---|---|
| *E02F 9/16* | (2006.01) | |
| *B62D 1/12* | (2006.01) | |
| *B62D 5/09* | (2006.01) | |
| *B66F 9/075* | (2006.01) | |
| *B62D 5/04* | (2006.01) | |
| *B62D 12/00* | (2006.01) | |
| *B62D 1/14* | (2006.01) | |
| *B62D 5/24* | (2006.01) | |
| *B62D 5/28* | (2006.01) | |
| *B66F 9/22* | (2006.01) | |
| *E02F 9/20* | (2006.01) | |
| *G01L 5/22* | (2006.01) | |
| *B62D 6/10* | (2006.01) | |
| *B62D 7/02* | (2006.01) | |
| *B66F 9/20* | (2006.01) | |

(52) U.S. Cl.
 CPC ............... *B62D 5/09* (2013.01); *B62D 5/24* (2013.01); *B62D 5/28* (2013.01); *B62D 6/008* (2013.01); *B62D 12/00* (2013.01); *B66F 9/07568* (2013.01); *B66F 9/07586* (2013.01); *B66F 9/22* (2013.01); *E02F 9/16* (2013.01); *E02F 9/2004* (2013.01); *E02F 9/22* (2013.01); *G01L 5/223* (2013.01); *B62D 6/10* (2013.01); *B62D 7/026* (2013.01); *B66F 9/205* (2013.01)

(56) References Cited

U.S. PATENT DOCUMENTS

| | | | | |
|---|---|---|---|---|
| 7,306,072 | B2 * | 12/2007 | Bohm | B62D 5/0472 180/422 |
| 8,448,741 | B2 * | 5/2013 | Breiner | B62D 12/00 180/418 |
| 9,102,354 | B2 * | 8/2015 | Williams | B62D 5/00 |
| 2012/0217083 | A1 * | 8/2012 | Brickner | B62D 5/001 180/417 |
| 2014/0019002 | A1 | 1/2014 | Jentz et al. | |
| 2014/0216580 | A1 | 8/2014 | Bauer et al. | |

FOREIGN PATENT DOCUMENTS

| | | |
|---|---|---|
| CN | 105313956 A | 2/2016 |
| DE | 101 02 244 A1 | 3/2002 |
| EP | 3 412 536 A1 | 12/2017 |
| JP | 3-234906 A | 10/1991 |
| JP | 11-105723 A | 4/1999 |
| JP | 11-321664 A | 11/1999 |
| JP | 3695909 B2 | 9/2005 |
| JP | 2006-347212 A | 12/2006 |
| JP | 2007-276532 A | 10/2007 |
| WO | 2013/034514 A1 | 3/2013 |

OTHER PUBLICATIONS

The Office Action for the corresponding Chinese application No. 201780014694.6, dated Mar. 6, 2019.

The International Search Report for the corresponding international application No. PCT/JP2017/030615, dated Nov. 21, 2017.

* cited by examiner

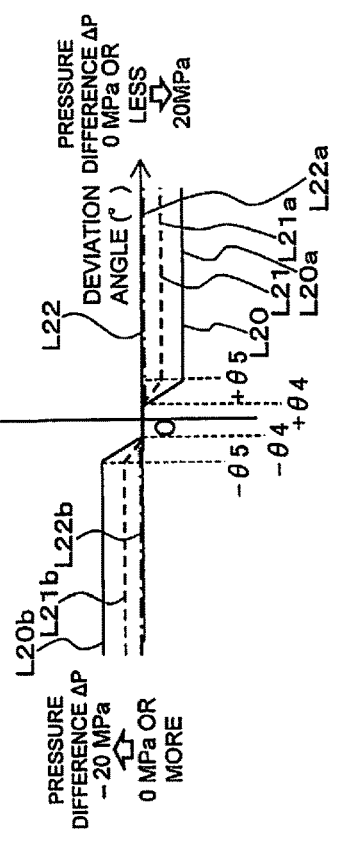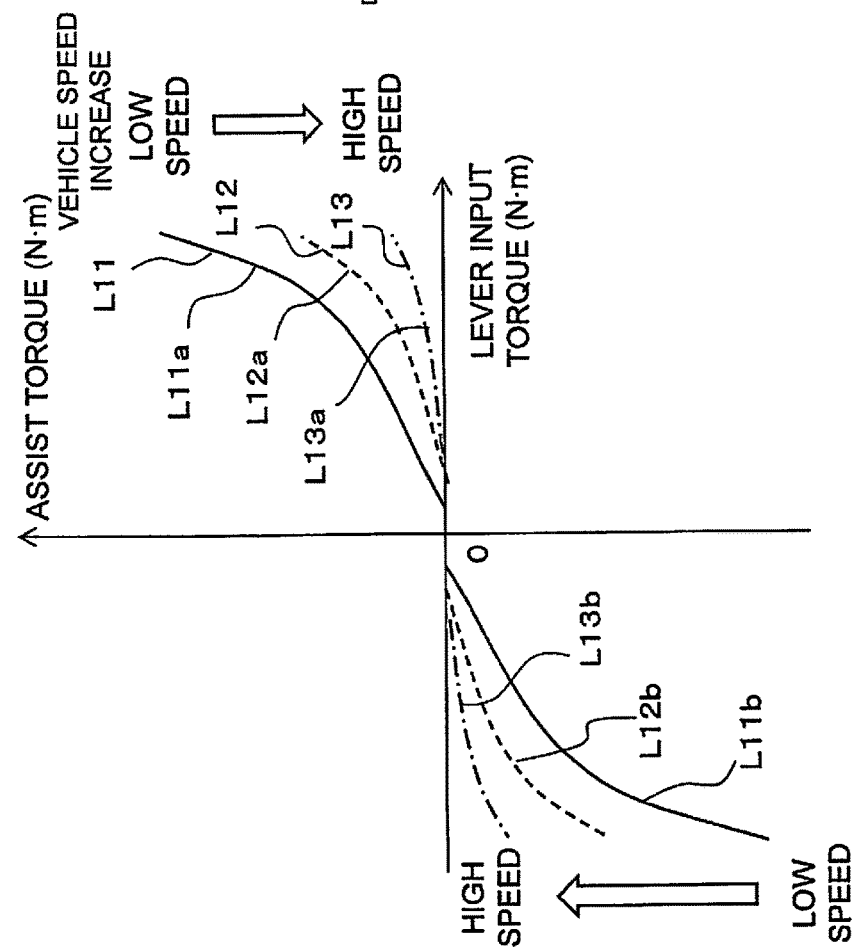
FIG. 18B
FIG. 18A

WORK VEHICLE AND CONTROL METHOD FOR WORK VEHICLE

CROSS-REFERENCE TO RELATED APPLICATIONS

This application is a U.S. National stage application of International Application No. PCT/JP2017/030615, filed on Aug. 25, 2018. This U.S. National stage application claims priority under 35 U.S.C. § 119(a) to Japanese Patent Application No. 2016-165943, filed in Japan on Aug. 26, 2016, the entire contents of which are hereby incorporated herein by reference.

BACKGROUND

Field of the Invention

The present invention relates to a work vehicle and a control method for a work vehicle.

Background Information

As an articulated work vehicle, a configuration has been disclosed in which the steering angle is varied by controlling the flow of fluid supplied to a hydraulic actuator disposed spanning a front frame and a rear frame (see, for example, JP-A H11-105723 and JP-A H11-321664).

The work vehicle in JP-A H11-105723 and JP-A H11-321664 is provided with a steering valve that adjusts the flow of fluid supplied to a hydraulic actuator according to an inputted pilot pressure, and a pilot valve that adjusts a pilot pressure supplied to the steering valve.

The pilot valve is provided with an operation input shaft and a feedback input shaft which can rotate relative to each other. The operation input shaft is linked to the joystick lever and rotates according to the rotation angle of the joystick lever. Also, the feedback input shaft is linked to the front frame by a link mechanism, and rotates according to changes in the steering angle.

This pilot valve adjusts the pilot pressure inputted to the steering valve according to the difference between the rotation angle of the operation input shaft and the rotation angle of the feedback input shaft. The flow of fluid supplied from the steering valve to the hydraulic actuator is varied according to the adjusted pilot pressure and the steering angle is changed.

Since the steering angle is thus varied according to the hydraulic pressure, the operator can change the steering angle by applying a light operating force to the joystick lever, just what is necessary to change the open/closed state of the port of the pilot valve.

SUMMARY

However, with the work vehicles of the above-mentioned JP-A H11-105723 and JP-A H11-321664, the counterforce generated at the joystick lever is determined by the force of a spring member provided to the pilot valve. Therefore, even when a load is applied to the cylinder during the steering operation, the operator cannot feel this load from the operating force of the lever.

That is, if there is an obstacle when the joystick lever is operated and an articulation operation is performed, the operation may be hindered and a load is generated in the hydraulic actuator, but the operator cannot feel this load. Therefore, there is a possibility that the operator may try to perform an impossible operation such as operating the joystick lever in order to perform further articulation even though a load is being applied.

This problem can occur not only in an articulated working vehicle, but also in a working vehicle (such as a forklift) that makes use of a hydraulic cylinder for steering.

In light of problems encountered with conventional work vehicles, it is an object of the present invention to provide a work vehicle and a work vehicle control method with which the operator can feel a load generated in a hydraulic actuator during a steering operation.

To achieve the stated object, the work vehicle according to a first aspect comprises a hydraulic actuator, a control valve, an operation member, a pressure sensor, a force imparting component, and a controller. The hydraulic actuator varies the steering angle. The control valve controls the flow of fluid supplied to the hydraulic actuator. The operation member is operated by an operator and controls the control valve when varying the steering angle. The pressure sensor senses the pressure produced by the hydraulic actuator. The force imparting component imparts an assisting force or a counterforce to the operation of the operation member. The controller controls the force imparting component so as to generate resistance to the operation of the operation member on the basis of the pressure value sensed by the pressure sensor.

Thus sensing the pressure generated in the hydraulic actuator makes it possible to detect a state in which there is an obstacle during a steering operation of the work vehicle so that operation is hindered, and a load is generated in the hydraulic actuator.

When the operator uses the operation member, resistance to this operation is produced on the basis of the sensed pressure value. Consequently, the operator can feel the resistance and feel that a load is being generated in the hydraulic actuator. This prevents the operator from trying to do an impossible operation when a high load is generated at the hydraulic actuator.

The work vehicle according to a second aspect is the work vehicle according to the first aspect, wherein the control valve is mechanically linked to the operation member.

This allows the operator to feel the operation of the control valve directly.

The work vehicle according to a third aspect is the work vehicle according to the first aspect, wherein the controller controls the force imparting component so as to generate a larger resistance force as the pressure value increases.

Consequently, an increase in the pressure generated in the hydraulic actuator can be felt from the resistance produced in the operating member.

The work vehicle according to a fourth aspect is the work vehicle according to the first aspect, wherein the controller generates resistance to the operation of the operation member by decreasing the assisting force or increasing the counterforce produced by the force imparting component.

Consequently, resistance can be generated while imparting an assisting force or counterforce to the operation of the operating member.

The work vehicle according to a fifth aspect is the work vehicle according to the first aspect, wherein two of the hydraulic actuators are provided. One of the hydraulic actuators contracts and the other hydraulic actuator expands so that the steering angle is changed toward either the left or the right side. The other hydraulic actuator contracts and the one hydraulic actuator expands so that the steering angle is changed toward the other of the left and right sides. The pressure sensor senses the pressure value at each of the two hydraulic actuators. The controller controls the force imparting component on the basis of the two pressure values.

When the left and right steering operations of the work vehicle are thus performed by two hydraulic actuators, the force imparting component is controlled on the basis of the pressure values of the respective hydraulic actuators so as to generate resistance against the operation of the operating member. Consequently, when operating the operating member, the operator can feel the load generated during the steering operation.

The work vehicle according to a sixth aspect is the work vehicle according to the fifth aspect, comprising a front frame and a rear frame. The rear frame is linked to the front frame at a linking shaft. The two hydraulic actuators are disposed to the left and right of the linking shaft in the vehicle width direction, and vary the angle of the front frame with respect to the rear frame.

Again with an articulated working vehicle such as this, the operator can feel the load generated in the steering operation when operating the operating member.

The work vehicle according to a seventh aspect is the work vehicle according to the fifth aspect, wherein the controller calculates the difference between the two pressure values and controls the force imparting component on the basis of this pressure difference.

For example, the force imparting component can be controlled so that the greater is the absolute value of the pressure difference, the greater is the resistance generated against the operation of the operation member.

The work vehicle according to an eighth aspect is the work vehicle according to the first aspect, further comprising a torque sensor that senses the torque generated by operation of the operation member. The force imparting component has an electric motor as its drive source. The controller actuates the force imparting component on the basis of the pressure values and the torque.

Consequently, a force can be imparted according to the torque applied to the operating member by the operator. For example, the amount of force imparted can be controlled so that the assisting force imparted by the force imparting portion is increased when the torque applied to the operating member by the operator is high, and the assisting force is reduced when the torque is low.

The work vehicle according to a ninth aspect is the work vehicle according to the eighth aspect, further comprising a speed sensor that senses the speed of the work vehicle. The controller actuates the force imparting component on the basis of the speed in addition to the pressure values and the torque.

Consequently, the resistance can be varied according to the speed. For example, the generated resistance can be reduced when the speed is high, and the resistance can be increased as the speed drops.

The work vehicle according to a tenth aspect is the work vehicle according to the eighth aspect, wherein the controller has a calculator and an actuation controller. The calculator calculates the force to be imparted to the operation of the operation member by combining a first imparted force set on the basis of the torque, and a second imparted force set on the basis of the pressure values. The actuation controller actuates the force imparting component so as to impart the calculated force.

This makes it possible to generate resistance against the operation of the operating member in accordance with the pressure generated in the hydraulic actuator while applying the assisting force or the counterforce by the force imparting component to the operation of the operating member.

The work vehicle according to an eleventh aspect is the work vehicle according to the tenth aspect, further comprising a speed sensor, a target steering angle sensor, and an actual steering angle sensor. The speed sensor senses the speed of the work vehicle. The target steering angle sensor senses a target steering angle inputted with the operation member. The actual steering angle sensor senses the actual steering angle changed by the hydraulic actuators. The first imparted force is set on the basis of the speed of the work vehicle in addition to the torque. The second imparted force is set on the basis of a deviation angle calculated from the value sensed by the target steering angle sensor and the value sensed by the actual steering angle sensor in addition to the pressure values.

Consequently, the assisting force or counterforce imparted by the force imparting component to the operation of the operating member can be varied according to the speed, and resistance can be generated according to the deviation angle.

The work vehicle according to a twelfth aspect is the work vehicle according to the eleventh aspect, wherein the operating member is a joystick lever. The control valve has a first input member, a second input member, and a biasing component. The first input member is displaced according to the target steering angle. The second input member is displaced according to the actual steering angle. The biasing component biases the first input member so that the displacement of the first input member matches the displacement of the second input member. The difference between the displacement of the first input member and the displacement of the second input member corresponds to the deviation angle between the target steering angle and the actual steering angle. The joystick lever is operated against the biasing force of the biasing component.

Consequently, after the joystick lever is operated, the steering angle changes to match the joystick lever, and when the operation amount of the joystick lever and the steering angle coincide, the control valve is in the neutral position.

Also, the control valve is provided with the biasing component, and the operator operates the joystick lever with an operation force that goes against the biasing force of the biasing component. The force imparting component is controlled so as to generate resistance against this operation against the biasing force.

The work vehicle according to a thirteenth aspect is the work vehicle according to the first aspect, further comprising a steering valve that adjusts the flow of fluid supplied to the hydraulic actuator on the basis of the pilot pressure inputted from the control valve. The control valve controls the flow of fluid supplied from the steering valve to the hydraulic actuator by adjusting the pilot pressure.

Since the steering valve is thus operated by the pilot pressure, the load generated in the hydraulic actuator is not transmitted to the operating member, but with the present invention, resistance is generated against the operation of the operating member, which conveys information about the hydraulic actuator to the operator.

The control method for a work vehicle pertaining to a fourteenth aspect comprises an acquisition step, a generation step, and a transmission step. The acquisition step involves acquiring a sensing signal from a pressure sensor that senses the pressure produced by a hydraulic actuator that varies a steering angle. The generation step involves generating a control signal for generating resistance, on the basis of the sensing signal, to the operation of an operating member by an operator when varying the steering angle. The transmission step involves transmitting the control signal to a force imparting component that imparts an assisting force or a counterforce to the operation of the operation member.

Thus sensing the pressure generated in the hydraulic actuator makes it possible to detect a state in which there is an obstacle during a steering operation of the work vehicle so that operation is hindered, and a load is generated in the hydraulic actuator.

Then, on the basis of the sensed pressure value, when the operator operates the operation member, resistance to that operation produced. This allows the operator to feel the resistance and to feel that a load is being generated in the hydraulic actuator. Therefore, this prevents the operator from trying to do an impossible operation when a high load is being generated in the hydraulic actuator.

The present invention provides a work vehicle and a method for controlling a work vehicle, with which an operator can feel a load generated in a hydraulic actuator during a steering operation.

BRIEF DESCRIPTION OF DRAWINGS

FIG. 18A is a graph of assist torque information (the imparted assist torque versus lever input torque) provided for each speed and stored in the controller in FIG. 17, and FIG. 18B is a graph of assist torque information (the imparted assist torque versus deviation angle) provided for each pressure difference and stored in the controller in FIG. 17;

DETAILED DESCRIPTION OF EMBODIMENT(S)

The wheel loader in an embodiment of the present invention will now be described through reference to the drawings.

Embodiment 1

1. Configuration
1-1. Overview of Wheel Loader Configuration

Figure 1:
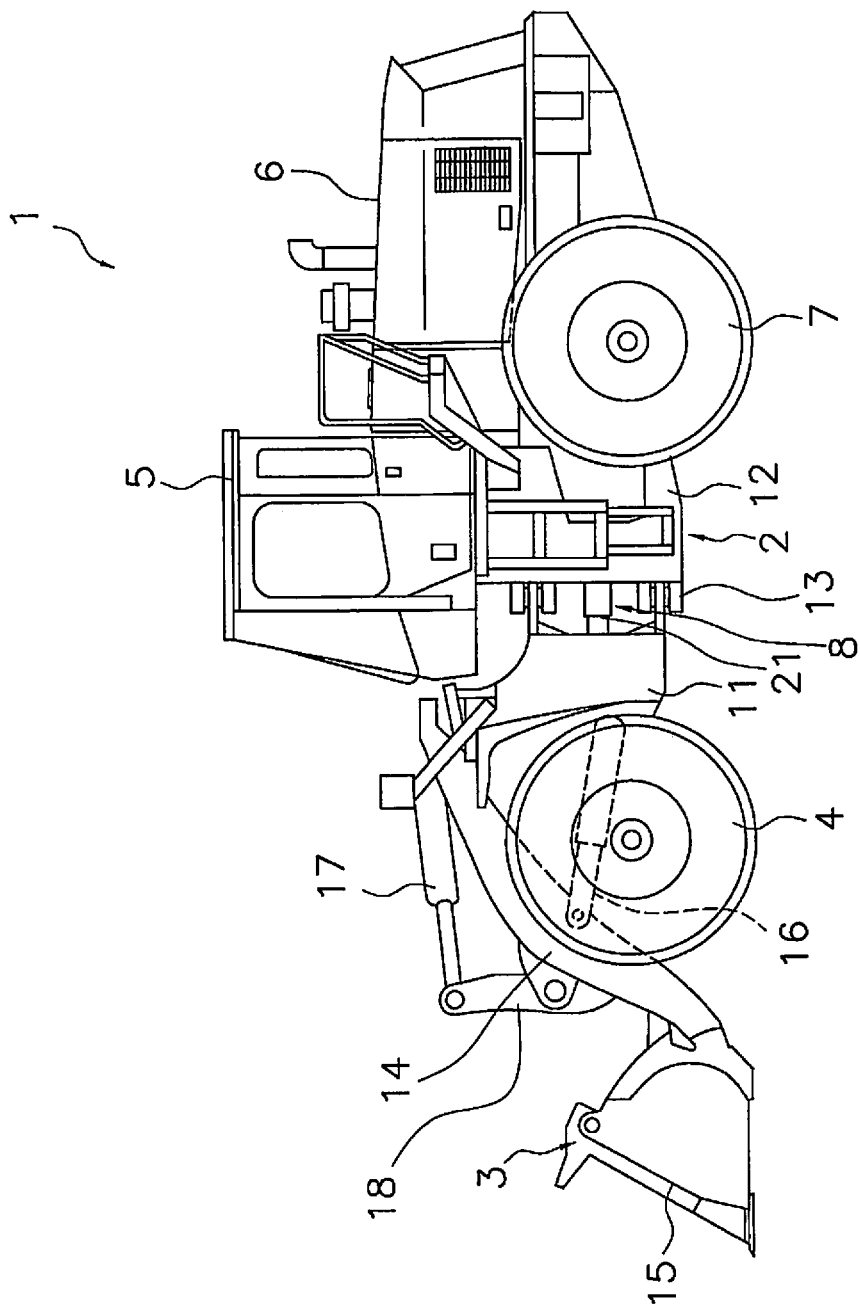
FIG. 1 is a side view of a wheel loader in Embodiment 1 of the present invention.

FIG. 1 is a simplified view of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operation device 8 (see FIG. 2 (discussed below)).

The wheel loader 1 uses the work implement 3 to load earth and perform other such work.

The body frame 2 is what is called an articulated type, and has a front frame 11, a rear frame 12, and a connecting shaft 13. The front frame 11 is disposed ahead of the rear frame 12. The connecting shaft 13 is provided in the center in the vehicle width direction, and links the front frame 11 and the rear frame 12 so that they can pivot relative to each other. The front tires 4 are mounted on the left and right sides of the front frame 11. The rear tires 7 are mounted on the left and right sides of the rear frame 12.

The work implement 3 is driven by working fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. Expansion and contraction of the lift cylinder 16 causes the boom 14 to pivot up and down. One end of the bucket cylinder 17 is attached to the front frame 11, and the other end of the bucket cylinder 17 is attached to the bucket 15 via a bell crank 18. As the bucket cylinder 17 expands and contracts, the bucket 15 pivots up and down.

The cab 5 is installed on the rear frame 12, and in its interior are disposed a steering wheel or a joystick lever 24 (see FIG. 2 (discussed below)) for a steering operation, a lever for operating the work implement 3, various display devices, and so forth. The engine compartment 6 is disposed on the rear frame 12 to the rear of the cab 5, and houses an engine.

The steering operation device 8 will be described in detail below, but has steering cylinders 21 and 22, and when the flow of fluid supplied to the steering cylinders 21 and 22 is changed, this changes the steering angle of the front frame 11 with respect to the rear frame 12, thereby changing the traveling direction of the wheel loader 1.

1-2. Steering Operation Device

Figure 2:
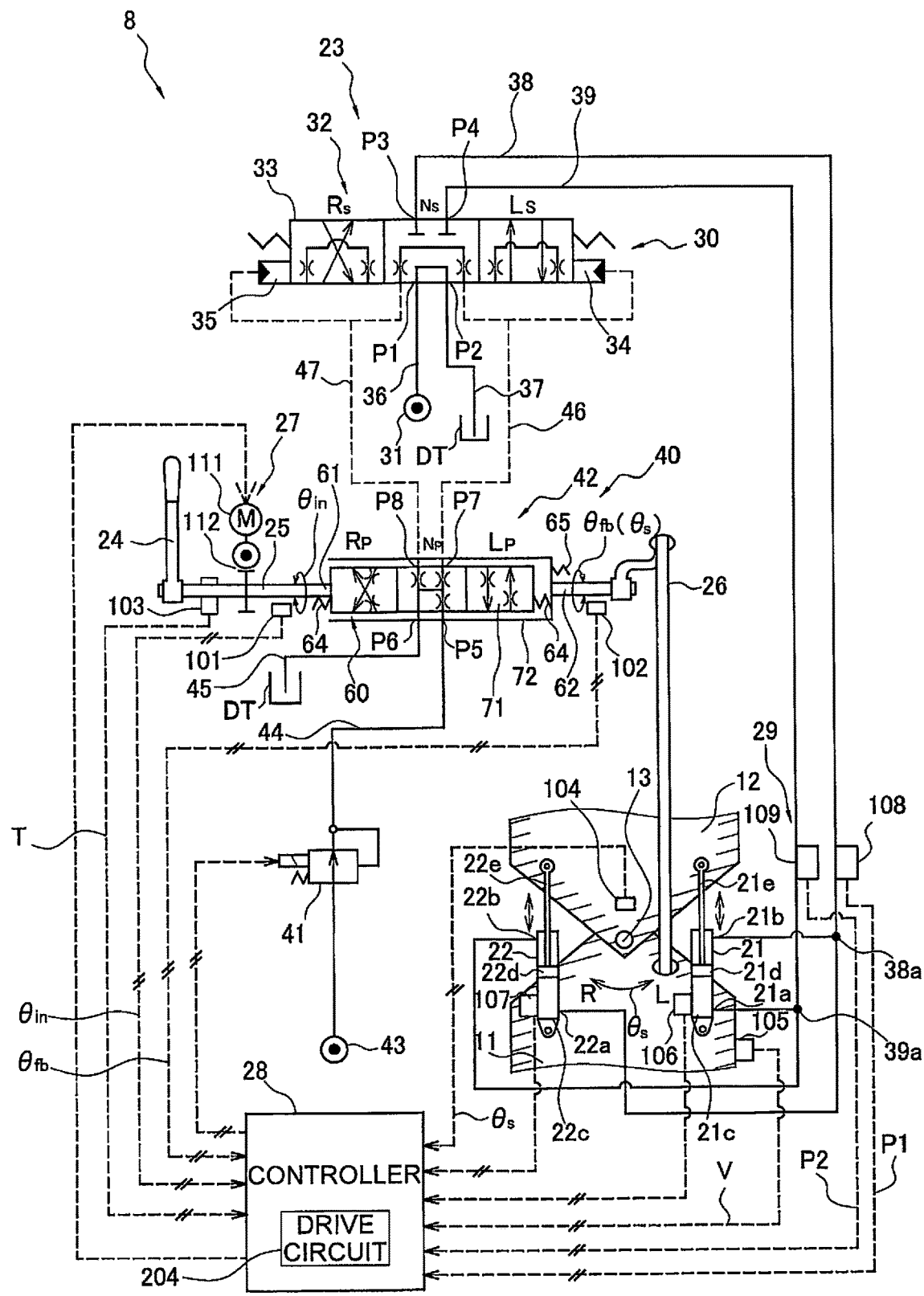
FIG. 2 is a hydraulic circuit diagram showing the configuration of the steering operation device of the wheel loader of FIG. 1.

FIG. 2 is a hydraulic circuit diagram of the configuration of the steering operation device 8. The steering operation device 8 in this embodiment mainly has the pair of steering cylinders 21 and 22, a steering hydraulic circuit 23, the joystick lever 24, a connecting portion 25, a link mechanism 26, a force imparting component 27, a controller 28, and a pressure sensing unit 29.

1-2-1. Steering Cylinders

The steering cylinders 21 and 22 are driven by hydraulic pressure. The steering cylinders 21 and 22 are disposed side by side on the left and right sides in the vehicle width direction, with the connecting shaft 13 in between. The steering cylinder 21 is disposed on the left side of the connecting shaft 13 (see FIG. 1). The steering cylinder 22 is disposed on the right side of the connecting shaft 13.

The steering cylinder 21 has a cylinder tube 21c, a piston 21d, and a piston rod 21e. The cylinder tube 21c is linked to the front frame 11. The piston 21d is provided slidably in the cylinder tube 21c. The piston rod 21e is fixed to the piston 21d and is linked to the rear frame 12.

The steering cylinder 22 has a cylinder tube 22c, a piston 22d, and a piston rod 22e. The cylinder tube 22c is linked to the front frame 11. The piston 22d is provided slidably in the cylinder tube 22c. The piston rod 22e is fixed to the piston 22 d and is linked to the rear frame 12.

The steering cylinder 21 is provided with an extension port 21a and a contraction port 21b, and the steering cylinder 22 is provided with an extension port 22a and a contraction port 22b.

In the steering cylinder 21, the piston 21d divides the space inside the cylinder tube 21c into a first space on the piston rod 21e side and a second space on the opposite side. The extension port 21a is linked to the second space, and the contraction port 21b is connected to the first space.

In the steering cylinder 22, the piston 22d divides the space inside the cylinder tube 22c into a first space on the piston rod 22e side and a second space on the opposite side. The extension port 22a is linked to the second space, and the contraction port 22b is connected to the first space.

When fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22, the steering cylinder 21 extends and the steering cylinder 22 contracts. This changes the steering angle θs, and the vehicle turns to the right. When fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22, the steering cylinder 21 contracts and the steering cylinder 22 extends. This changes the steering angle θs, and the vehicle turns to the left.

A steering angle sensor 104 that senses the steering angle θs is provided near the connecting shaft 13 disposed between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for sensing the stroke of the cylinder, and the steering cylinder 22 is provided with a cylinder stroke sensor 107 for sensing the stroke of that cylinder. The sensing values of the cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a spool type of valve, and is a flow control valve that adjusts the flow of fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

The steering valve 32 has a valve body 33 that can move between a neutral position Ns, a left steering position Ls, and a right steering position Rs. When the valve body 33 is disposed in the neutral position Ns, the main pump port P1 and the main drain port P2 are communicating with each other. In this case, the first steering port P3 and the second steering port P4 are not in communication with any port. When the valve body 33 is disposed in the left steering position Ls, the main pump port P1 and the first steering port P3 are communicating with each other, and the main drain port P2 and the second steering port P4 are communicating with each other. When the valve body 33 is disposed in the right steering position Rs, the main pump port P1 and the second steering port P4 are communicating with each other, and the main drain port P2 and the first steering port P3 are communicating with each other.

The steering valve 32 has a first pilot chamber 34 and a second pilot chamber 35. When no pilot pressure is being supplied to the first pilot chamber 34 or the second pilot chamber 35, and when the same pilot pressure is being supplied to the first pilot chamber 34 and the second pilot chamber 35, the valve body 33 is located in the neutral position Ns. In a state in which the pilot pressure is being supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes, according to the supplied pilot pressure. Accordingly, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying fluid from a pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 has a built-in electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via the pilot hydraulic line 44, and the variable pressure reducer 41 is connected to the pilot hydraulic pressure source 43. The pilot drain port P6 is connected to the drain tank DT that collects fluid via a pilot drain line 45. The first pilot port P7 is connected to the first pilot chamber 34 of the steering valve 32 via the first pilot line 46. The second pilot port P8 is connected to the second pilot chamber 35 of the steering valve 32 via the second pilot line 47.

The pilot valve 42 has a valve body component 60 including an operation spool 71 and an operation sleeve 72. With the operation sleeve 72 as a reference, the operation spool 71 is able to move between a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 is in the left pilot position Lp with respect to the operation sleeve 72, the pilot pump port P5 communicates with the first pilot port P7, and the pilot drain port P6 communicates with the second pilot port P8. When the operation spool 71 is in the right pilot position Rp with respect to the operation sleeve 72, the pilot pump port P5 communicates with the second pilot port P8, and the pilot drain port P6 communicates with the first pilot port P7.

Figure 3:
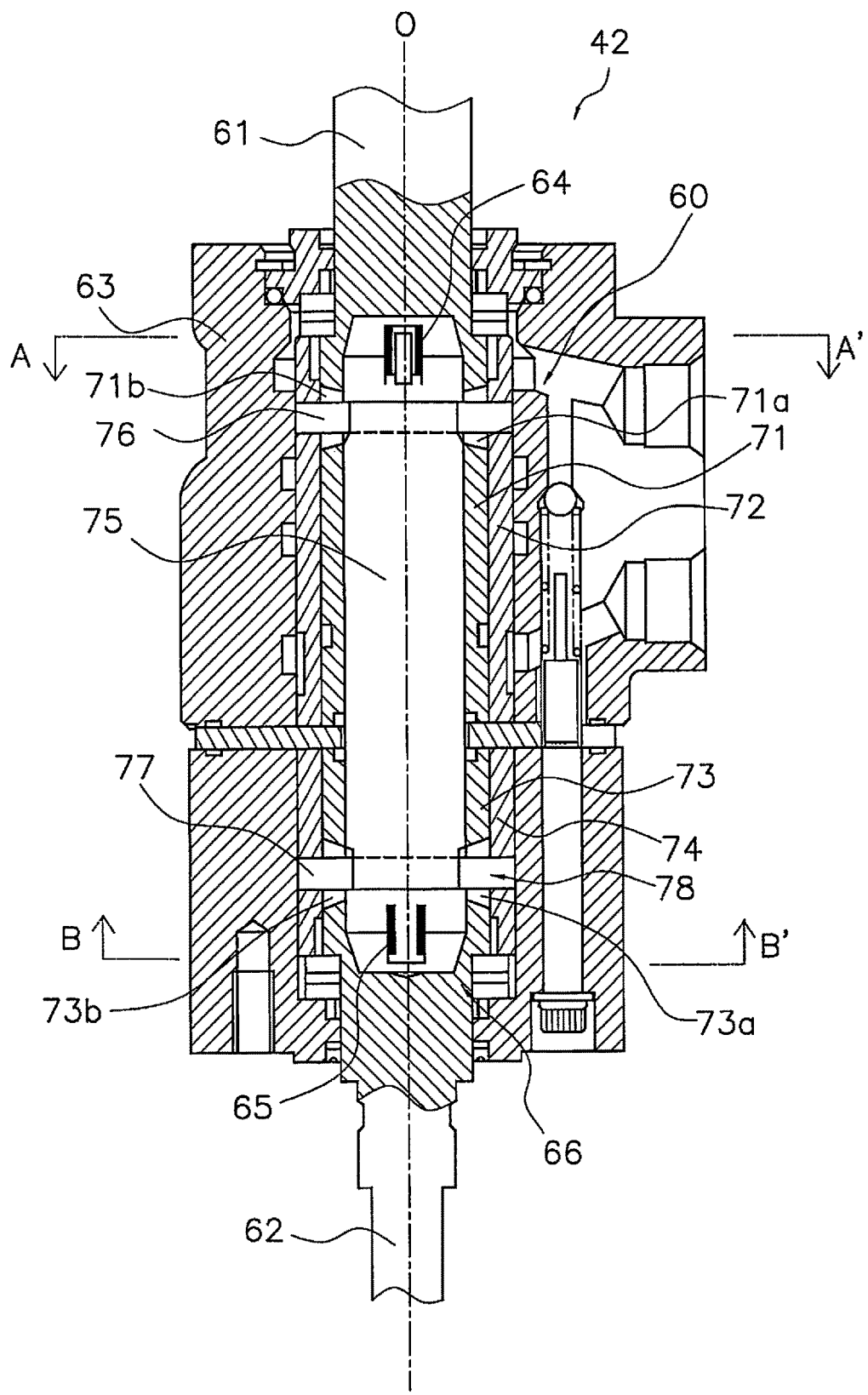
FIG. 3 is a cross sectional configuration diagram of the pilot valve in FIG. 2.

FIG. 3 is a cross sectional configuration diagram of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided rotatably around its center axis O, and is inserted into the housing 63. The operation input shaft 61 is connected to the joystick lever 24 (discussed below) via the connecting portion 25. The operation input shaft 61 rotates at the same rotation angle as the rotation angle θin of the joystick lever 24 to the left and right.

Feedback Input Shaft

The feedback input shaft 62 is disposed coaxially with the operation input shaft 61, and is provided rotatably around the center axis O. The feedback input shaft 62 is inserted into the housing 63 so as to be opposite the operation input shaft 61. The feedback input shaft 62 is connected to the front frame 11 via the link mechanism 26 (discussed below), and rotates at the same rotation angle as the steering angle θs of the front frame 11 with respect to the rear frame 12.

Housing

A substantially cylindrical space is formed in the housing 63, and the operation input shaft 61 and the feedback input shaft 62 are inserted as described above. The housing 63 houses the valve body component 60 and the feedback component 66, and the pilot pump port P5, the pilot drain port P6, the first pilot port P7, and the second pilot port P8 are formed in the housing 63.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and is disposed coaxially with the operation input shaft 61, and is connected to the operation input shaft 61. The joystick lever 24 is connected to the operation input shaft 61 via the connecting portion 25 (discussed below), and when the operator operates the joystick lever 24 to the right side by the rotation angle θin, the operation input shaft 61 and the operation spool 71 also rotate to the right around the center axis O by the rotation angle θin. Slits 71a and 71b are formed in the operation spool 71 near the operation input shaft 61, along the circumferential direction at two opposing positions so as to sandwich the center axis O in between.

The operation sleeve 72 has a substantially cylindrical shape and is disposed outside the operation spool 71 and inside the housing 63 so as to be rotatable with respect to the operation spool 71 and the housing 63.

In this specification, "right rotation" and "left rotation" refer to the rotation direction when viewed from above.

First Spring

The first spring 64 is inserted between the operation spool 71 and the operation sleeve 72, which are rotatable with respect to each other, and generates a counterforce corresponding to the difference in rotation angle between the operation spool 71 and the operation sleeve 72.

Figures 4A, 4B:
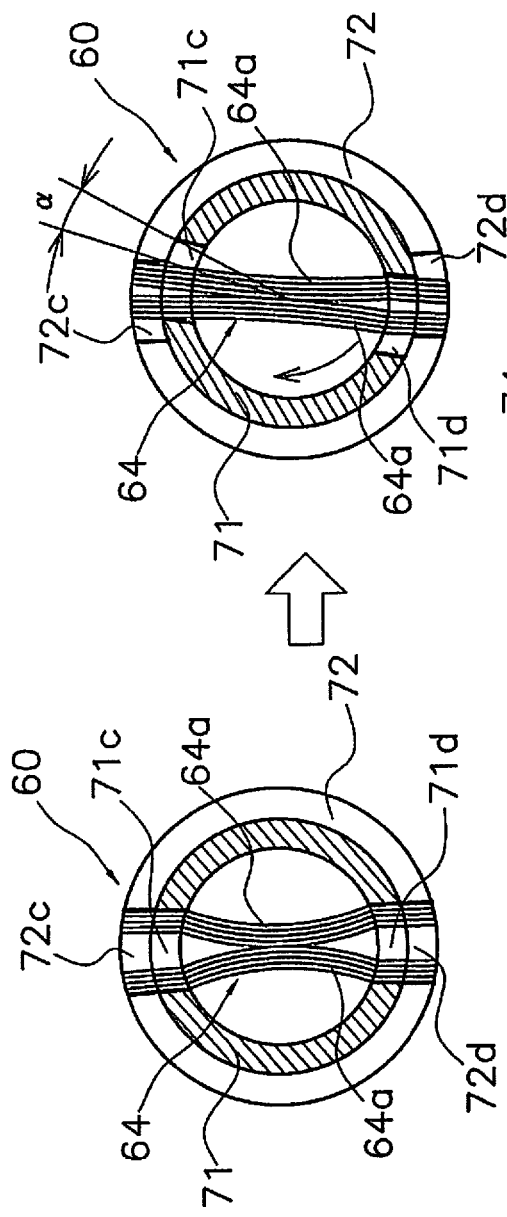
FIGS. 4A and 4B are a cross sections along the A-A' line in FIG. 3, and FIGS. 4C and 4D are cross sections along the B-B' line in FIG. 3.

FIG. 4A is a cross section along the A-A' line perpendicular to the center axis O. As shown in FIG. 4A, square holes 71c and 71d are provided to diametrically opposed walls of the operation spool 71. Also, rectangular grooves 72c and 72d are formed in diametrically opposed walls at the end of the operation sleeve 72 on the operation input shaft 61 side. The first spring 64 is formed from two sets of leaf springs 64a in which a plurality of convex leaf springs are stacked. The two sets of leaf springs 64a are arranged so that the convex parts are opposite each other to form an X shape in FIG. 4A. The two sets of leaf springs 64a pass through the holes 71c and 71d in the operation spool 71, and the ends thereof intrude to the grooves 72c and 72d in the operation sleeve 72. In this manner, the operation spool 71 and the operation sleeve 72 are linked by the first spring 64.

As shown in FIG. 4A, a state in which the circumferential positions of the hole 71c and the groove 72c substantially coincide and the circumferential positions of the hole 71d and the groove 72d substantially coincide is a state in which the valve body component 60 is in the neutral position Np.

Also, when the joystick lever 24 is operated, the operation spool 71 rotates with respect to the operation sleeve 72 as shown in FIG. 4B, and the operation spool 71 moves to the left pilot position Lp or the right pilot position Rp with respect to the operation sleeve 72. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated at the joystick lever 24. In other words, the first spring 64 biases the operation spool 71 so as to be in the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, and coaxially with the operation input shaft 61 and the feedback input shaft 62 (the center axis O). The drive shaft 75 is disposed inside the operation spool 71. The first center pin 76 is disposed perpendicular to the center axis O at the end of the drive shaft 75 on the operation input shaft 61 side. The ends of the first center pin 76 pass through the slits 71a and 71b and are fixed to the operation sleeve 72. As will be described in detail below, the rotation angle of the operation spool 71 with respect to the operation sleeve 72 is restricted to an angle within a specific range by the first center pin 76 and the slits 71a and 71b. Also, since the first center pin 76 is fixed to the operation sleeve 72 and the drive shaft 75, when the drive shaft 75 rotates, the operation sleeve 72 integrated with the drive shaft 75 also rotates.

The feedback spool 73 has a substantially cylindrical shape and is disposed coaxially with the feedback input shaft 62, and is connected to the feedback input shaft 62. Slits 73a and 73b are formed in the feedback spool 73 in the circumferential direction near the feedback input shaft 62, at two positions opposite each other with the center axis O in between. The drive shaft 75 is disposed inside the feedback spool 73. The feedback input shaft 62 is linked to the front frame 11 via the link mechanism 26 (discussed below), and when the front frame 11 rotates to the right by the steering angle θs with respect to the rear frame 12, the feedback input shaft 62 and the feedback spool 73 also rotate to the right by the same rotation angle θs as the steering angle θs.

The feedback sleeve 74 has a substantially cylindrical shape and is disposed outside the feedback spool 73 and inside the housing 63 so as to be rotatable with respect to the feedback spool 73 and the housing 63.

The restrictor 78 restricts the rotation of the feedback sleeve 74 with respect to the feedback spool 73 to an angle within a specific range. The restrictor 78 is constituted by a second center pin 77 and wall portions 73ae and 73be (see FIG. 7 (discussed below)) at the ends of the slits 73a and 73b in the circumferential direction.

The second center pin 77 is disposed at the end of the drive shaft 75 on the feedback input shaft 62 side, perpendicular to the center axis O. The ends of the second center pin 77 pass through the slits 73a and 73b and are fixed to the feedback sleeve 74. The rotation of the feedback sleeve 74 relative to the feedback spool 73 is restricted to an angle within a specific range by the second center pin 77 and the slits 73a and 73b. Also, since the second center pin 77 is fixed to the feedback sleeve 74 and the drive shaft 75, when the feedback sleeve 74 rotates, the drive shaft 75 integrated with the feedback sleeve 74 also rotates. When the drive shaft 75 rotates, the operation sleeve 72 fixed to the drive shaft 75 is rotated by the first center pin 76.

Second Spring

Figures 4C, 4D:
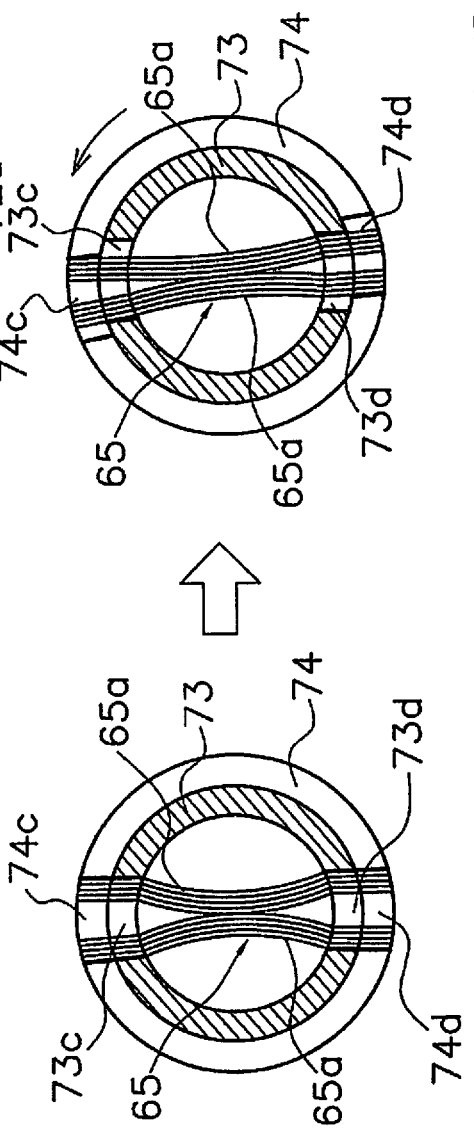

The second spring 65 is inserted between the feedback spool 73 and the feedback sleeve 74, which are rotatable with respect to each other, and generates a counterforce corresponding to the rotation difference between the spool and the sleeve. FIG. 4C is a cross section along the B-B' line in FIG. 23.

As shown in FIG. 4C, square holes 73c and 73d are provided to the feedback spool 73, in diametrically opposed walls.

Rectangular grooves 74c and 74d are formed in diametrically opposed walls at the end of the feedback sleeve 74 on the feedback input shaft 62 side. The second spring 65 is formed from two sets of leaf springs 65a in which a plurality of convex leaf springs are stacked. The two sets of leaf springs 65a are disposed so that the convex parts are opposite each other to form an X shape in FIG. 4C. The leaf springs 65a pass through the holes 73c and 73d in the feedback spool 73 and the ends thereof intrude the grooves 74c and 74d in the operation sleeve 72. The feedback spool 73 and the feedback sleeve 74 are thus linked by the second spring 65. In the state in FIG. 4C, the hole 73c and the groove 74c coincide in the circumferential direction, and the hole 73d and the groove 74d coincide in the circumferential direction. The feedback sleeve 74 is thus biased by the second spring 65 so that the positions of the grooves 74c and 74d in the circumferential direction coincide with the circumferential positions of the holes 73c and 73d of the feedback spool 73.

Although the first spring 64 bends until the operation spool 71 is restricted with respect to the operation sleeve 72, the second spring 65 is set to begin bending upon being subjected to a force greater than or equal to the counterforce generated in the first spring 64 until it is restricted.

Figure 7:
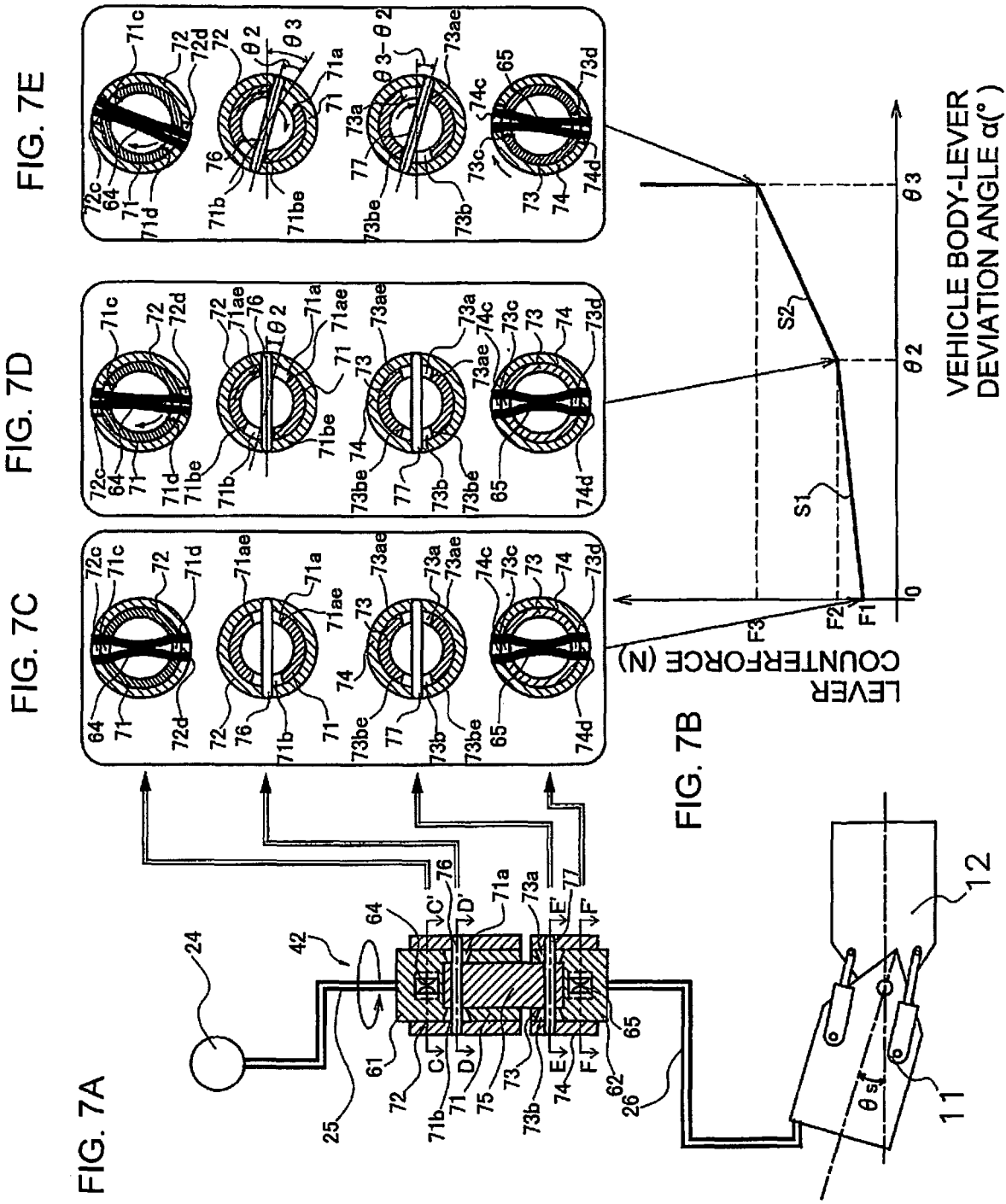
FIG. 7A is a simplified diagram of the pilot valve in FIG. 3, FIG. 7B a graph of the relation between lever counterforce and vehicle body-lever deviation angle in the pilot valve in FIG. 7A, FIG. 7C consists of cross sections along the C-C', D-D', E-E', and F-F' lines in FIG. 7A when the deviation angle α is zero, FIG. 7D consists of cross sections along the C-C', D-D', E-E', and F-F' lines in FIG. 7A when the deviation angle α is θ2, and FIG. 7E consists of cross sections along the C-C', D-D', E-E', and F-F' lines in FIG. 7A when the deviation angle α is θ3.

More precisely, as will be discussed below through reference to FIG. 7, when the operation spool 71 rotates to the angle at which it is restricted with respect to the operation sleeve 72, and when the joystick lever 24 is then operated, as shown in FIG. 4D, the second spring 65 bends and the feedback sleeve 74 rotates with respect to the feedback spool 73. FIG. 4D is a cross section along the B-B' line in FIG. 3, and since the view is from below, the arrows in the rotation direction are opposite to those in FIG. 4B.

That is, when the joystick lever 24 is operated beyond the angle at which the operation spool 71 is restricted with respect to the operation sleeve 72, the operator will have to operate the joystick lever 24 against the biasing force of the second spring 65.

With the above configuration of the feedback component 66, when the feedback input shaft 62 rotates in response to a change in the steering angle, the feedback spool 73 rotates, and the feedback sleeve 74 linked to the feedback spool 73 via the second spring 65 also rotates. Then, the operation sleeve 72 fixed to the feedback sleeve 74 via the second center pin 77, the drive shaft 75, and the first center pin 76 rotates, a change occurs in the difference in the rotation angle between the operation spool 71 and the operation sleeve 72, and the pilot pressure is changed.

That is, with the pilot valve 42, the position of the operation spool 71 with, respect to the operation sleeve 72 moves to the neutral position Np, the left pilot position Lp, or the right pilot position Rp according to the difference α between the rotation angle θin of the operation input shaft 61 and the rotation angle fb of the feedback input shaft 62 (which coincides with the steering angle θs). When the rotation angle difference α is zero, the operation spool 71 is in the neutral position Np with respect to the operation sleeve 72. When the operation spool 71 is in the left pilot position Lp or the right pilot position Rp with respect to the operation sleeve 72, the pilot valve 42 changes the opening surface area through which fluid passes from the pilot hydraulic pressure source 43 in accordance with the rotation angle difference α. This adjusts the pilot pressure that is sent from the pilot valve 42 to the steering valve 32 according to the difference α of the rotation angle.

The operation input shaft 61 is provided with a first rotation angle sensor 101 constituted by a rotary sensor, for example. The first rotation angle sensor 101 senses the rotation angle θin of the operation input shaft 61. The feedback input shaft 62 is provided with a second rotation angle sensor 102 constituted by a rotary sensor, for example. Also, the second rotation angle sensor 102 senses the rotation angle θfb (=θs) of the feedback input shaft 62. The rotation angles gin and θfb sensed by the first rotation angle sensor 101 and the second rotation angle sensor 102 are sent to the controller 28 as sensing signals.

As described above, the steering angle θs is also sensed by the steering angle sensor 104 in the connecting shaft 13, but since the rotation angle θfb of the feedback input shaft 62 coincides with the steering angle θs, the steering angle sensor 104 need not be provided.

1-2-3. Joystick Lever, Connecting Portion

Figure 5:
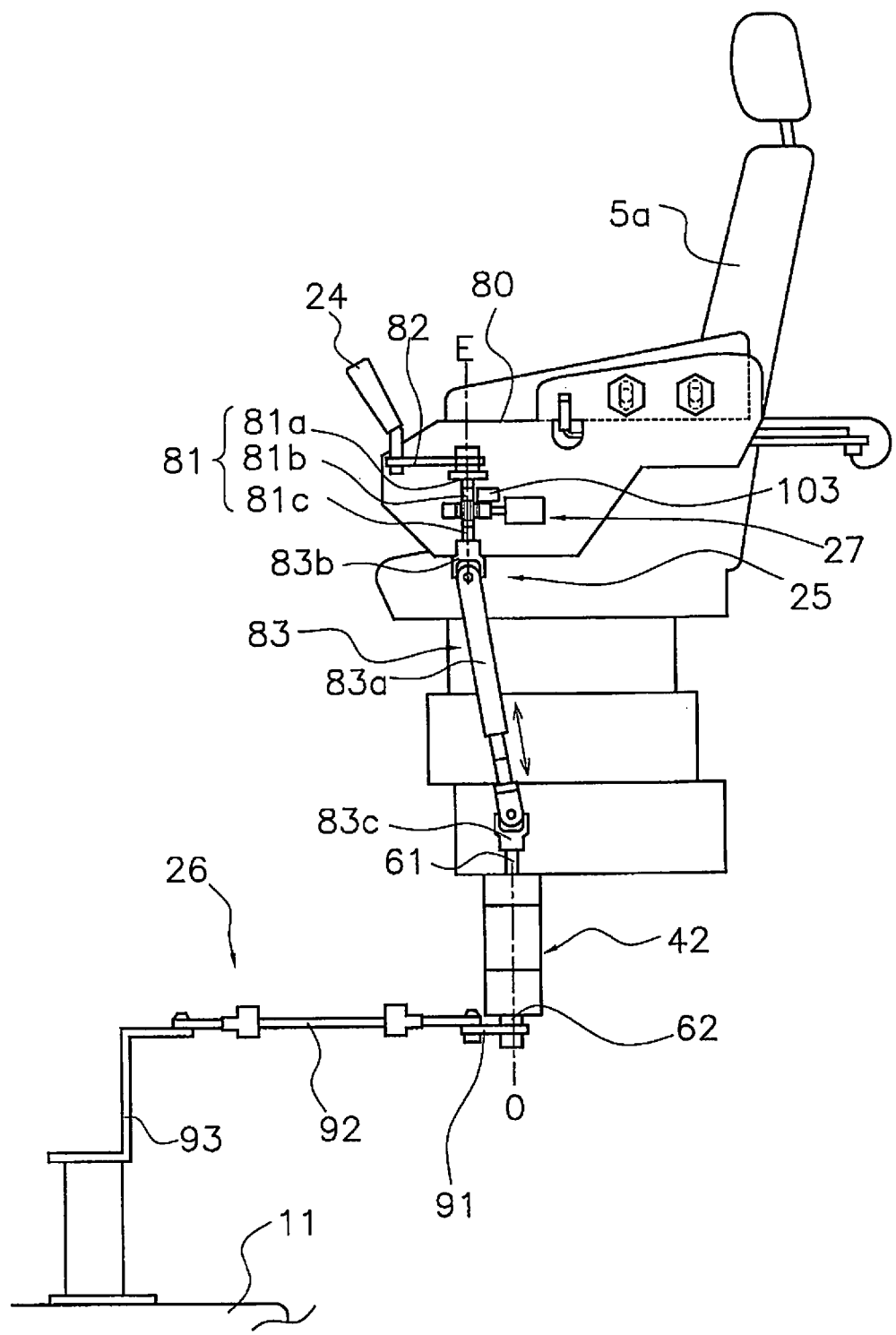
FIG. 5 is a side view of the linking portion and the link mechanism in FIG. 2.

FIG. 5 is a side view of the configuration inside the cab 5. A driver's seat 5a on which the operator sits is provided in the cab 5. A steering box 80 is disposed on the left side of the driver's seat 5a in the vehicle width direction.

The joystick lever 24 is disposed so as to protrude obliquely upward from the steering box 80 toward the front.

The connecting portion 25 connects the joystick lever 24 and the pilot valve 42. The connecting portion 25 mainly has a steering operation shaft 81, a connecting bar 82, and a universal joint 83.

The steering operation shaft 81 is disposed vertically and is supported by the steering box 80 so as to be rotatable around its center axis E. The connecting bar 82 is disposed in the steering box 80 and connects the joystick lever 24 and the steering operation shaft 81.

More precisely, the steering operation shaft 81 is configured such that a lever-side shaft 81a, an input shaft 81b, and a valve-side shaft 81c are connected in that order (see FIG. 8 (discussed below)). That is, one end of the lever-side shaft 81a is linked to the connecting bar 82, and the other end of the lever-side shaft 81a is connected to one end of the input shaft 81b. Also, the other end of the input shaft 81b is connected to one end of the valve-side shaft 81c, and the other end of the valve-side shaft 81c is linked to the universal joint 83. An assisting force or a counterforce from a force imparting unit 27 (discussed below) is inputted to the input shaft 81b.

The universal joint 83 connects the steering operation shaft 81 to the operation input shaft 61 of the pilot valve 42 disposed near the driver's seat 5a. The universal joint 83 has a telescoping central portion 83a and joint portions 83b and 83c disposed at the ends of the central portion 83a. The joint portion 83b is connected to the steering operation shaft 81. The joint portion 83c is connected to the operation input shaft 61.

Figure 6:
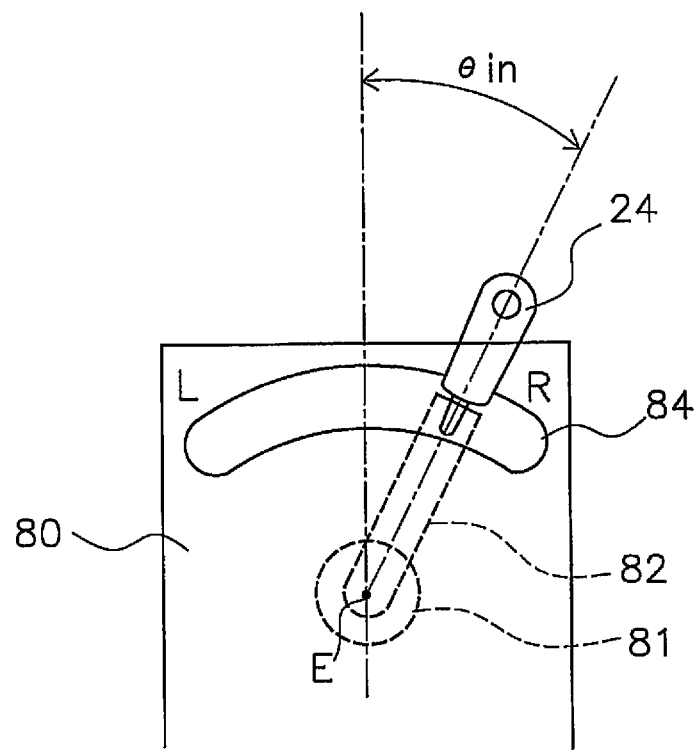
FIG. 6 is a top view of the joystick lever in FIG. 5.

FIG. 6 is a plan view of the area near the joystick lever 24 as viewed from above. As shown in FIG. 6, the joystick lever 24 is formed so as to protrude obliquely upward from an arc-shaped hole 84 formed in the upper face of the steering box 80. The joystick lever 24 can be turned horizontally around the steering operation shaft 81 (more precisely, the center axis Q). Also, an R mark is formed at the edge on the right end of the hole 85 of the steering box 80, and an L mark is formed at the edge on the left end.

For example, as shown in FIG. 6, when the operator rotates the joystick lever 24 from the center position to the right side by the rotation angle θin, the steering operation shaft 81 also rotates to the right by the angle θin. This rotation of the steering operation shaft 81 by the rotation angle θin is transmitted through the universal joint 83 to the operation input shaft 61, and the operation input shaft 61 also rotates to the right by the rotation angle gin. The same is true when the joystick lever 24 is rotated to the left.

1-2-4. Link Mechanism

The link mechanism 26 has a follow-up lever 91, a follow-up link 92, and a bracket 93.

The follow-up lever 91 is fixed to the feedback input shaft 62 of the pilot valve 42. The bracket 93 is fixed to the front frame 11. The follow-up link 92 links the follow-up lever 91 and the bracket 93.

The front frame 11 and the pilot valve 42 disposed on the rear frame 12 are linked by this link mechanism 26.

The link mechanism 26 makes the steering angle θs of the front frame 11 relative to the rear frame 12 be the same as the rotation angle θfb of the feedback input shaft 62.

That is, when the front frame 11 rotates to the right side by the steering angle θs around the connecting shaft 13 with respect to the rear frame 12, the feedback input shaft 62 also rotates to the right by the rotation angle θs via the link mechanism 26, and when the front frame 11 rotates to the left side by the steering angle θs, the feedback input shaft 62 also rotates to the left by the rotation angle θs via the link mechanism 26.

1-2-5. Lever Counterforce

The lever counterforce generated by the first spring 64 and the second spring 65 when operating the joystick lever 24 will now be described.

FIG. 7A is a simplified diagram of the pilot valve 42. FIG. 7B is a graph of the relation between the vehicle body-lever deviation angle and the lever counterforce. The vehicle body-lever deviation angle α is the difference (θin−θfb) between the rotation angle θin of the joystick lever 24 and the steering angle θs (=θfb) of the front frame 11 with respect to the rear frame 12. FIG. 7C consists of cross sections along the C-C', D-D', E-E', and F-F' lines in FIG. 7A when the deviation angle α is zero. FIG. 7D consists of cross sections along the C-C', D-D', E-E', and F-F' lines in FIG. 7A when the deviation angle α is θ2. FIG. 7E consists of cross sections along the C-C', D-D', E-E', and F-F' lines in FIG. 7A when the deviation angle α is θ3. As shown in FIG. 7A, the cross sections along the C-C', D-D', E-E', and F-F' lines are all views from above. In FIG. 7B, play in the joystick lever 24 is not taken into account in order to make the drawing easier to understand.

When the operator rotates the joystick lever 24 from the center position by the rotation angle θin, the operation input shaft 61 also rotates by the rotation angle θin. On the other hand, since the response of the steering cylinders 21 and 22 is delayed, the steering angle θs gradually increases following the rotation angle θin. This rotation angle θin of the joystick lever 24 indicates the target steering angle, and the steering angle θs indicates the actual steering angle. The feedback input shaft 62 also rotates at the same rotation angle θs as the steering angle θs in response to a change in the steering angle θs. The feedback spool 73 also rotates along with the feedback input shaft 62, and the feedback sleeve 74 linked via the second spring 65 also rotates as a result of this rotation.

Here, since the feedback sleeve 74 and the operation sleeve 72 are integrated by the first center pin 76, the second center pin 77, and the drive shaft 75, the operation sleeve 72 is also rotated by the rotation of the feedback sleeve 74.

That is, the difference in rotation angle that occurs between the rotation angle of the operation spool 71 and the rotation angle of the operation sleeve 72 corresponds to the deviation angle α (see FIG. 4B).

Since the first spring 64 biases the operation spool 71 to the neutral position Np with respect to the operation sleeve 72, in order to increase the deviation angle α, the joystick lever 24 has to be operated against the biasing force of the first spring 64.

The first spring 64 has the spring characteristic S1 shown in FIG. 7B. With the spring characteristic S1 of the first spring 64, in order to rotate the operation input shaft 61, the joystick lever 24 has to be operated with a force greater than or equal to the initial counterforce F1 (the force required to start bending the first spring 64). Also, with the spring characteristic S1 of the first spring 64, the lever counterforce increases as the deviation angle α increases. That is, as the deviation angle α increases, the force required to operate the joystick lever 24 increases.

As shown in FIG. 7C, in the neutral position Np where the deviation angle α is zero, the first center pin 76 is disposed in the center of the slits 71*a* and 71*b* of the operation spool 71. Also, the second center pin 77 is disposed in the center of the slits 73*a* and 73*b* of the feedback spool 73.

Then, the deviation angle α is increased by turning the joystick lever 24 to the right, for example, and when the deviation angle α reaches the angle θ2, as shown in FIG. 7D, the first center pin 76 hits the wall portion 71*ae* formed in the circumferential direction of the slit 71*a*, and the wall portion 71*be* formed in the circumferential direction of the slit 71*b*. At this point, the second center pin 77 is disposed in the center of the slits 73*a* and 73*b* of the feedback spool 73. This is because, if we let F2 be the counterforce produced by the first spring 64 when the deviation angle α is the angle θ2, the initial counterforce (the force required to start bending the second spring 65) is set to F2 as indicated by the spring characteristic S2 of the second spring 65. The initial counterforce of the second spring 65 may be set higher than F2, as long as it is equal to or greater than F2.

Furthermore, in order to rotate the joystick lever 24 to the right, the operator has to operate it against the counterforce of the second spring 65. That is, when the joystick lever 24 is rotated further to the right, the first center pin 76 hits the wall portion 71*be* and the wall portion 71*ae*, so if the operator tries to rotate operation spool 71, the operation sleeve 72 will have to be rotated as well. Also, as described above, the operation sleeve 72 is integrated with the feedback sleeve 74, and the feedback spool 73 is connected to the feedback input shaft 62. Therefore, when the joystick lever 24 is further rotated to the right, as shown in FIG. 4D, the joystick lever 24 is operated against the counterforce of the second spring 65.

When the deviation angle α reaches θ3, the second center pin 77 hits the wall portion 73*ae* formed in the circumferential direction of the slit 73*a* and the wall portion 73*be* formed in the circumferential direction of the slit 73*b*, as shown in FIG. 7E. Thus, the second center pin 77 can rotate by an angle of (θ3−θ2). That is, the pilot valve 42 is configured so that the deviation angle α cannot be greater than the angle θ3. Therefore, as shown in FIG. 7B, the lever counterforce rises linearly at the angle θ3. If the second center pin 77 hits the wall portions 73*ae* and 73*be* hard, it produces a sudden reaction that subjects the wrist of the operator to a load. This angle θ3 is also called the catch-up angle.

FIG. 7B illustrates an example in which the joystick lever 24 is rotated to the right, but the same holds true when it is rotated to the left, in which case the deviation angle α is a negative value, and there is left and right symmetry as indicated by the two-dot chain line L30 in FIG. 12 (discussed below). That is, the first center pin 76 hits the wall portions 71*ae* and 71*be* at −θ2, and the second center pin 77 hits the wall portions 73*ae* and 73*be* at −θ3. Thus, the pilot valve 42 is configured so that the absolute value of the deviation angle α does not become greater than the angle θ3.

A difference is generated between the rotation angle of the operation spool 71 and the rotation angle of the operation sleeve 72 up until the deviation angle α reaches θ2, but once the angle θ2 is exceeded, there is no longer any difference in the rotation angle between the operation spool 71 and the operation sleeve 72, so the aperture of the pilot valve 42 is constant. Also, the aperture of the pilot valve 42 is constant while the deviation angle α is between the angles θ2 and θ3, but the pilot pressure may be varied according to the deviation angle by controlling the variable pressure reducer 41.

1-2-6. Force Imparting Component

Figure 8:
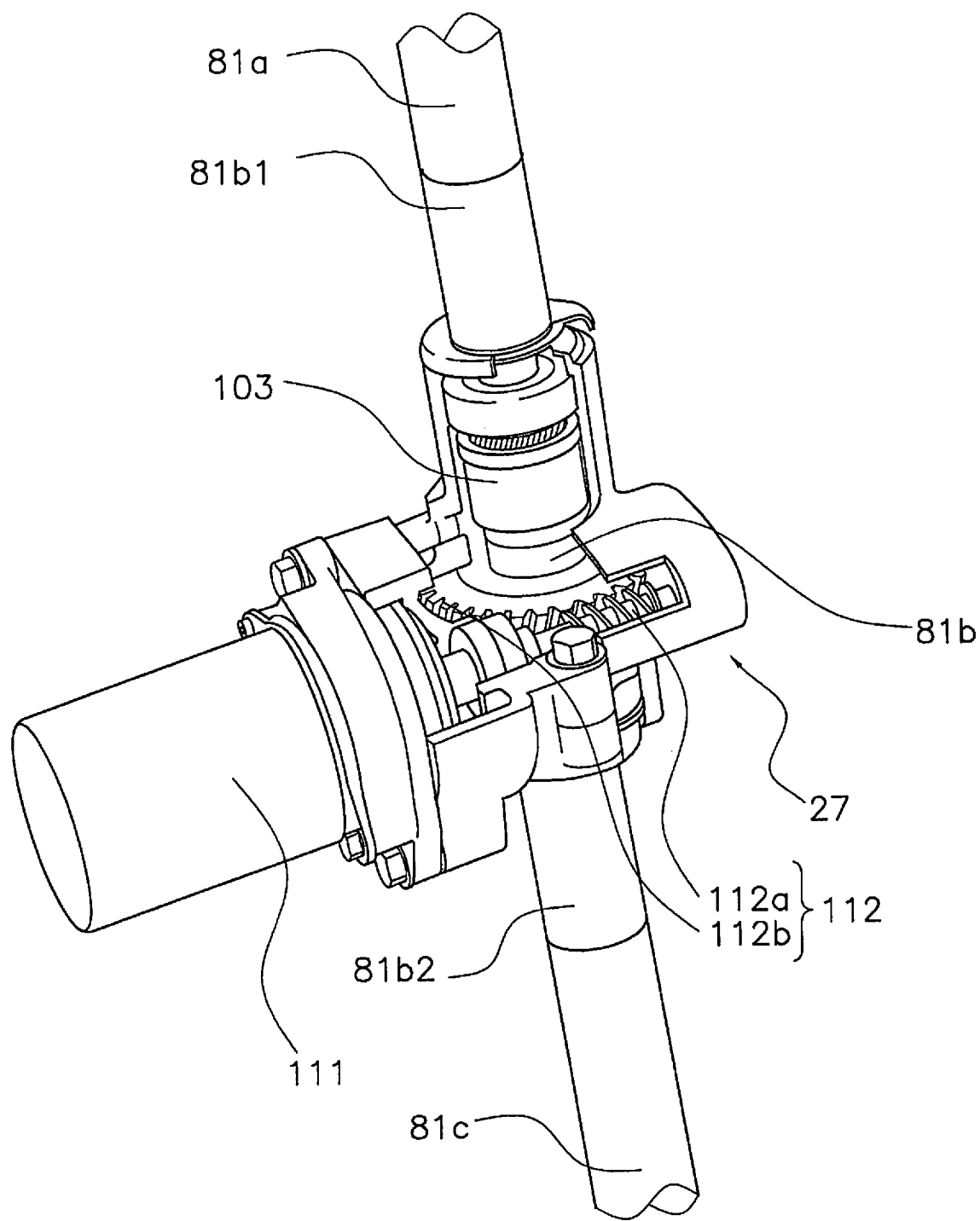
FIG. 8 is an oblique view of the configuration of the force imparting component in FIG. 2.

FIG. 8 is an oblique view of the force imparting component 27.

The force imparting component 27 imparts an assisting force or a counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the above-mentioned input shaft 81b, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

A first end 81b1 of the input shaft 81b is connected to the lever-side shaft 81a, and the second end 81b2 is connected to the valve-side shaft 81c.

When the electric motor 111 is driven, the cylindrical worm 112a rotates, this rotation causes the worm wheel 112b to rotate, and a rotational force is also generated at the input shaft 81b fixed to the worm wheel 112b. A rotational force can be applied to the input shaft 81b in the directions of both left rotation and right rotation by changing the rotation direction of the cylindrical worm 112a.

When the joystick lever 24 is rotated to the right, for example, a force is applied to the input shaft 81b in the clockwise direction, thereby imparting an assisting force to the operation of the joystick lever 24. Also, when the joystick lever 24 is rotated to the right, a force is applied to the input shaft 81b in the counterclockwise direction, thereby imparting a counterforce to the operation of the joystick lever 24.

A torque sensor 103 is provided to the input shaft 81b. The torque sensor 103 senses torque generated at the input shaft 81b when the operator applies force to the joystick lever 24. The torque sensor 103 in this embodiment senses the rotation direction of the torque input shaft 81b and the torque generated at the torque input shaft 81b by using a coil to sense twisting of a torsion bar, for example. The sensed rotation direction and torque T are outputted to the controller 28 as a steering torque signal.

1-2-7. Pressure Sensor

As shown in FIG. 2, the pressure sensing unit 29 has a first pressure sensor 108 and a second pressure sensor 109. The first pressure sensor 108 is disposed closer to the steering valve 32 than the branch point 38a to the contraction port 21b and the extension port 22a along the first steering line 38. The first pressure sensor 108 senses the pressure on the extension port 22a side of the steering cylinder 22 (cylinder bottom side). When fluid is supplied to the extension port 22a, the steering is operated to the left, so the first pressure sensor 108 measures the bottom pressure of the steering cylinder 22 that expands during steering to the left.

The second pressure sensor 109 is disposed closer to the steering valve 32 than the branch point 39a to the contraction port 22b and the extension port 21a along the second steering line 39. The second pressure sensor 109 senses the pressure on the extension port 21a side of the steering cylinder 21 (cylinder bottom side). When fluid is supplied to the extension port 21a, the steering is operated to the right, so the second pressure sensor 109 measures the bottom pressure of the steering cylinder 21 that expands during steering to the right.

1-2-8. Controller

Figure 9:
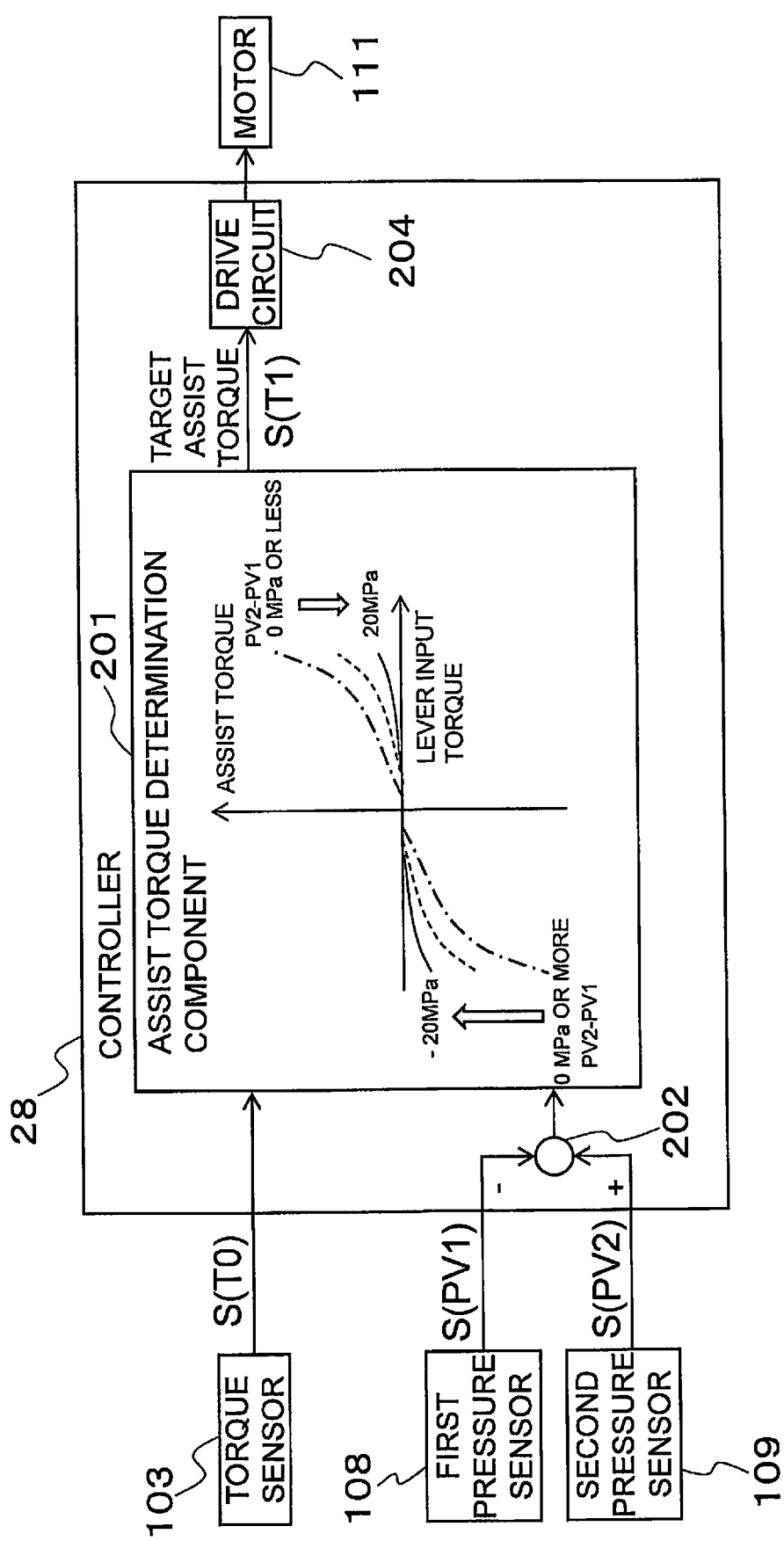
FIG. 9 is a block diagram of the configuration of the controller in FIG. 2.

FIG. 9 is a block diagram of the configuration of the controller 28. As shown in FIG. 9, the controller 28 has an assist torque determination component 201, a pressure difference calculator 202, and a drive circuit 204.

The assist torque determination component 201 and the pressure difference calculator 202 are executed by a computing device such as a CPU.

The pressure difference calculator 202 receives a signal S(PV1) of a first pressure value from the first pressure sensor 108 and a signal S(PV2) of a second pressure value from the second pressure sensor 109. The pressure difference calculator 202 subtracts the first pressure value PV1 from the second pressure value PV2 to calculate the pressure difference $\Delta P$.

The assist torque determination component 201 stores the relation between the assist torque to be imparted and the input torque of the joystick lever 24 (assist torque information) for each of a plurality of pressure differences. The assist torque information will be described in detail below. The assist torque information is stored in a storage component provided to the assist torque determination component 201, but may be stored in a separately provided storage component. Also, the storage component may be provided within the controller 28, or may be provided outside the controller 28. The storage component is constituted by a RAM, a ROM, a hard disk drive, etc.

The assist torque determination component 201 accepts a steering torque signal (S(T0) shown in FIG. 9) from the torque sensor 103, and the pressure difference information from the pressure difference calculator 202. The assist torque determination component 201 then determines the assist torque from the steering torque signal and the pressure difference information.

The assist torque determination component 201 outputs the determined assist torque as a first assist torque signal (S(T1) shown in FIG. 9).

The drive circuit 204 drives the electric motor 111 on the basis of the calculated target assist torque.

The controller 28 thus can apply an assisting force to the operation of the joystick lever 24 by the operator on the basis of the torque T and the pressure difference $\Delta P$.

The controller 28 also controls the variable pressure reducer 41 as shown in FIG. 2 on the basis of the rotation angle $\theta$in, the rotation angle $\theta$fb (=$\theta$s), and the vehicle speed V. Consequently, the original pilot pressure sent to the pilot valve 42 can be controlled so that there is no sudden change in the flow of fluid to the left and right steering cylinders 21 and 22.

Also, the control of the electric motor 111 and the variable pressure reducer 41 by the controller 28 may be performed by wire or wirelessly.

2. Operation

The steering of the wheel loader 1 in this embodiment will be described below.

2-1. Steering Operation

When the joystick lever 24 is in the center position, the operation input shaft 61 is located in a specific initial position, and the rotation angle Din produced by the operation input shaft 61 is zero. Since the steering angle $\theta$s is also zero, the feedback input shaft 62 is also located in a specific initial position. In this embodiment, as shown in FIG. 7A, the steering angle $\theta$s is the angle from a state in which the state along the front-rear direction with respect to the rear frame 12 is considered to be zero. Also, as shown in FIG. 6, the rotation angle Din indicates the rotation angle from the center position of the joystick lever 24. Also, in finding the deviation angle, for example, rotation to the right may be calculated as a positive angle, and rotation to the left may be calculated as a negative angle.

At this point, the operation spool 71 is in the neutral position Np shown in FIG. 4A with respect to the operation sleeve 72. In this case, the pilot pressures of the first pilot chamber 34 and the second pilot chamber 35 of the steering valve 32 are the same, and the valve body 33 of the steering valve 32 is also in the neutral position Ns. Therefore, fluid is neither supplied to nor discharged from the left and right steering cylinders 21 and 22, the steering angle θs is maintained at zero, and the rotation angle θfb (=θs) of the feedback input shaft 62 is also maintained at zero.

Next, the operator applies the operation force Fin in order to rotate the joystick lever 24 from the center position to the right side as shown in FIG. 6. If the operation force Fin exceeds F1 of the first spring 64, the operation input shaft 61 rotates to the right just like the joystick lever 24, and the rotation angle θin of the operation input shaft 61 increases. At this point, the steering angle θs is still zero and the rotation angle θfb (=θs) of the feedback input shaft 62 is also zero, due to the delay in the response of the left and right steering cylinders 21 and 22. Therefore, the deviation angle (α=θin−θs) between the rotation angle θin and the steering angle θs increases.

The operation spool 71 rotates to the right with respect to the operation sleeve 72 along with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is greater than or equal to the counterforce of the spring characteristic S1 of the first spring 64 shown in FIG. 7B. Therefore, the operation sleeve 72 does not rotate along with the operation spool 71, and the operation spool 71 rotates to the right with respect to the operation sleeve 72.

Thus, the operation spool 71 rotates to the right with respect to the operation sleeve 72 and moves to the right pilot position Rp, pilot pressure is supplied to the second pilot port P8, and pilot pressure is supplied to the second pilot chamber 35.

Consequently, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. Consequently, articulation commences, the steering angle θs gradually increases, and the front frame 11 is pointed to the right with respect to the rear frame 12 (see R in FIG. 2). This change in the steering angle θs is transmitted by the link mechanism 26 to the feedback input shaft 62, and the feedback input shaft 62 rotates at the rotation angle θs.

When the operator stops the joystick lever 24 at a specific rotation angle θ1, the operation input shaft 61 also stops at the rotation angle θ1. On the other hand, since the steering angle θs gradually increases, the rotation angle θs of the feedback input shaft 62 also increases. The feedback spool 73 rotates along with the feedback input shaft 62, and the feedback sleeve 74 linked to the feedback spool 73 via the second spring 65 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. The difference in the rotation angle between the operation sleeve 72 and the operation spool 71 (the deviation angle α) decreases as the operation sleeve 72 rotates. When the steering angle θs (the rotation angle θs of the feedback input shaft 62) catches up with the rotation angle θ1 (the rotation angle θin of the operation input shaft 61), the deviation angle α drops to zero. At this point, the operation spool 71 of the pilot valve 42 is in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Accordingly, fluid is neither supplied to nor discharged from the left and right steering cylinders 21 and 22, and the steering angle θs is maintained at the rotation angle θ1.

Thus, when the joystick lever 24 is rotated to the right and stopped at the specific rotation angle θ1, the steering angle θs is also maintained at the same rotation angle θ1. Consequently, the front frame 11 is kept facing in the direction of the rotation angle θ1, to the right with respect to the rear frame 12.

Next, when the operator returns the joystick lever 24 from the right side position toward the center position, the operation input shaft 61 similarly rotates, and the rotation angle θin of the operation input shaft 61 decreases. At this point, because of the delay in the response of the left and right steering cylinders 21 and 22, the steering angle θs is still in the state of the rotation angle θ1. Therefore, the rotation angle difference α (=θin−θs) decreases from zero to a negative value. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually decreases the steering angle θs from the rotation angle θ1. This change in the steering angle θs is transmitted by the link mechanism 26 to the feedback input shaft 62, and the feedback input shaft 62 rotates at the same change in the rotation angle as the change in the steering angle θs.

When the operator stops the joystick lever 24 in the central position, the operation input shaft 61 also stops in the initial position, that is, in the position where the rotation angle θin is zero. Meanwhile, since the steering angle θs is also gradually decreasing from the rotation angle θ1, the rotation angle difference (deviation angle) α gradually decreases. When the steering angle θs drops to zero, the rotation angle θfb of the feedback input shaft 62 (=θs) also goes to zero, and the rotation angle difference α goes to zero. At this point, the operation spool 71 is disposed in the neutral position Np with respect to the operation sleeve 72. In this case, the pilot pressure is the same in the first pilot chamber 34 and the second pilot chamber 35 of the steering valve 32, and the steering valve 32 is also in the neutral position Ns. Therefore, fluid is neither supplied to nor discharged from the left and right steering cylinders 21 and 22, and the steering angle θs also returns to zero and is held there. Consequently, the front frame 11 is returned to an orientation along the longitudinal direction with respect to the rear frame 12.

When the joystick lever 24 is rotated to the left side, everything is the same as above, so it will not be described again.

2-2. Control of Force Imparting Component

The control of the force imparting component 27 when the joystick lever 24 is operated as above will now be described.

With the wheel loader 1 in this embodiment, the assist torque to be imparted to the operation of the joystick lever 24 is changed using the torque and pressure difference, on the basis of assist torque information. Then, when the pressure in the steering cylinders 21 and 22 rises, resistance is generated against the operation of the joystick lever 24, allowing the operator to feel the state of the steering cylinders 21 and 22.

First, the assist torque information will be described.

2-2-1. Assist Torque Information

Figure 10:
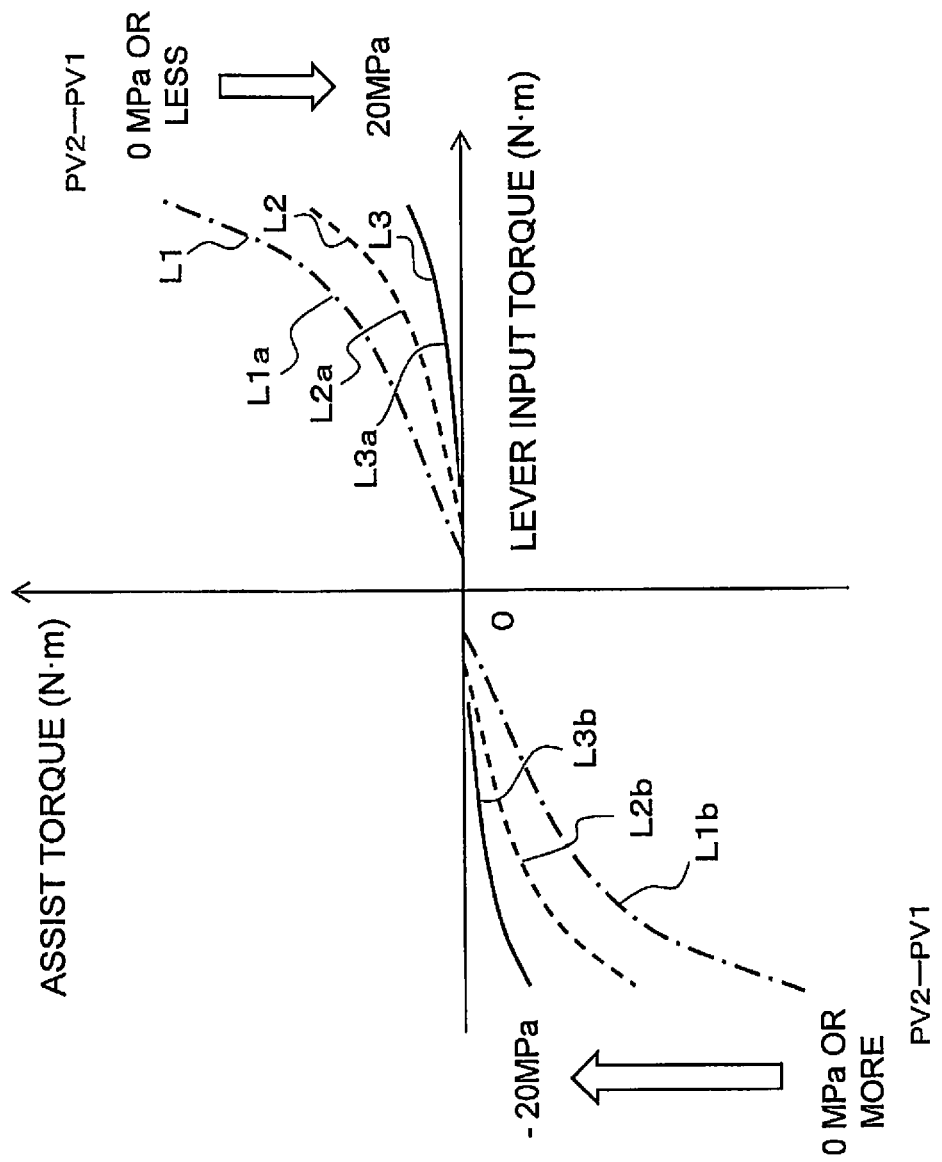
FIG. 10 is a graph of assist torque information (the imparted assist torque versus the lever input torque) provided for each pressure difference stored in the controller in FIG. 9.

FIG. 10 is a graph of the imparted assist torque versus the lever input torque (assist torque information) for each of a plurality of different pressure differences. In FIG. 10, the one-dot chain line L1, the dotted line L2, and the solid line L3 indicate assist torque information when the pressure difference corresponding to the rotation direction (also referred to as the pressure difference when the rotation direction is taken into account) is small, medium and large.

Saying that the pressure difference corresponding to the rotation direction is large means, for example, that the pressure difference ΔP is +20 MPa when the joystick lever 24 is rotated to the right side, and that the pressure difference ΔP is −20 MPa when the joystick lever 24 is rotated to the left side. Also, saying that the pressure difference corresponding to the rotation direction is medium means, for example, that the pressure difference is +10 MPa when the joystick lever 24 is rotated to the right side, and that the pressure difference is −10 MPa when the joystick lever 24 is rotated to the left side. Also, saying that the pressure difference corresponding to the rotation direction is small means, for example, that the pressure difference is 0 MPa or less when the joystick lever 24 is rotated to the right side, and that the pressure difference is 0 MPa or more when the joystick lever 24 is rotated to the left side.

That is, when the joystick lever 24 is rotated to the right side, the pressure difference corresponding to the rotation direction increases from 0 MPa or less to +20 MPa. On the other hand, when the joystick lever 24 is rotated to the left, the pressure difference corresponding to the rotation direction increases from 0 MPa or more to −20 MPa.

In the graph shown in FIG. 10, positive lever input torque indicates the torque generated by rotation of the joystick lever 24 toward the right side, and negative lever input torque indicates the torque generated by rotation of the joystick lever 24 toward the left side. Also, positive assist torque indicates a case when a force is applied to the clockwise rotation of the input shaft 81b, and negative assist torque indicates a case when a force is applied to the counterclockwise rotation of the input shaft 81b.

L1a, which is the part of L1 in which the lever input torque is a positive value, indicates the assist torque when the pressure difference is 0 MPa or less when the joystick lever 24 is rotated to the right. L1b, which is the part of L1 in which the lever input torque is a negative value, indicates the assist torque when the pressure difference is 0 MPa or more when the joystick lever 24 is rotated to the left side.

Here, even when the joystick lever 24 is rotated to the right side, the pressure difference ΔP obtained by subtracting PV1 from PV2 may instantaneously become a negative value, so L1a is set to a pressure difference of 0 MPa or less. Also, even when the joystick lever 24 is rotated to the left side, the pressure difference ΔP obtained by subtracting PV1 from PV2 may instantaneously become a positive value, so L1b is set to a pressure difference of 0 MPa or more.

Also, L2a, which is the part of L2 in which the lever input torque is a positive value, indicates the assist torque when the pressure difference is +10 MPa when the joystick lever 24 is rotated to the right side. L2b, which is the part of L2 in which the lever input torque is a negative value, indicates the assist torque when the pressure difference is −10 MPa when the joystick lever 24 is rotated to the left side. Also, L3a, which is the part of L3 in which the lever input torque is a positive value, indicates the assist torque when the pressure difference is 20 MPa when the joystick lever 24 is rotated to the right side. L3b, which is the part of L3 in which the lever input torque is a negative value, indicates the assist torque when the pressure difference is 20 MPa when the joystick lever 24 is rotated to the left side.

L1a, L2a, and L3a show the case when the joystick lever 24 is rotated to the right side, and since the assist torque is a positive value at this point, a force is imparted to the clockwise rotation of the input shaft 81b. Also, L1b, L2b, and L3b show the case when the joystick lever 24 is rotated to the left side, and since the assist torque is a negative value, a force is imparted to the counterclockwise rotation of the input shaft 81b. Thus, an assisting force is applied to the operation of the joystick lever 24.

Also, L1a and L1b are symmetrical with respect to the origin, L2a and L2b are symmetrical with respect to the origin, and L3a and L3b are symmetrical with respect to the origin. Therefore, the assist force is in left and right symmetry with respect to the absolute value of the input torque.

The assist torque information shown in FIG. 10 is set so that the greater is the pressure difference corresponding to the rotation direction, the smaller is the force that assists the joystick lever 24. That is, since the assisting force decreases as the pressure difference increases, the operator feels resistance to operation of the joystick lever 24, and can feel that a load is being generated in the steering cylinders 21 and 22.

2-2-2. Control Operation

Figure 11:
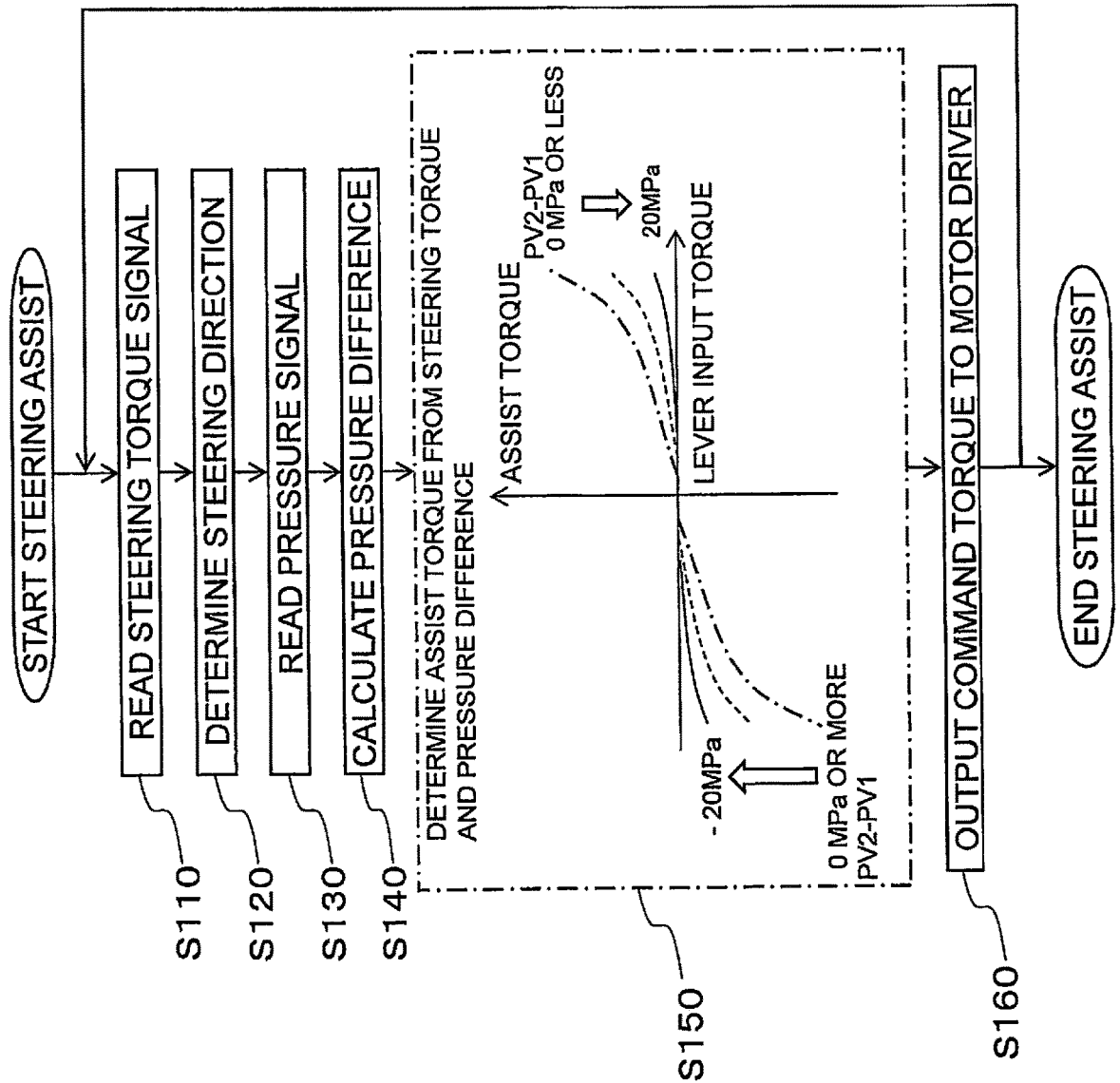
FIG. 11 is a flowchart of the method for controlling a wheel loader in Embodiment 1 of the present invention.

FIG. 11 is a flowchart of the operation for controlling the force imparting component 27.

When the joystick lever 24 is operated, in step S110 the assist torque determination component 201 of the controller 28 receives a steering torque signal (S(T0) shown in FIG. 9) from the torque sensor 103. The steering torque signal includes information related to the amount of torque and the direction of rotation. For example, the torque value can be made to include information related to the amount of torque and the direction of rotation by assuming that the torque is generated by clockwise rotation of the input shaft 81b when the torque value is positive, and assuming that the torque is generated by counterclockwise rotation of the input shaft 81b when the torque value is negative.

Next, in step S120 the controller 28 determines the steering direction of the joystick lever 24 on the basis of the steering torque signal. This steering direction determines the rotation direction of the electric motor 111 when force is to be imparted.

Next, in step S130 the pressure difference calculator 202 of the controller 28 acquires the first pressure value signal S(PV1) from the first pressure sensor 108, and acquires the second pressure value signal S(PV2) from the second pressure sensor 109.

In step S140 the pressure difference calculator 202 calculates the pressure difference by subtracting the first pressure value PV1 from the second pressure value PV2.

Next, in step S150 the assist torque determination section 201 determines the assist torque from the pressure difference information acquired from the pressure difference calculation section 202 and the steering torque signal acquired from the torque sensor 103, on the basis of the stored assistance information shown in FIG. 10. Then, in step S160 the assist torque determination component 201 outputs the determined assist torque to the drive circuit 204 as a target assist torque signal (S(T1) shown in FIG. 9).

The assist torque determination component 201 determines the first assist torque from the assist torque information (L1, L2, and L3 in FIG. 10) for the plurality of stored pressure differences, on the basis of the pressure difference value produced by the pressure difference calculator 202. Also, whether the operation of the joystick lever 24 is rotation to the right or to the left is determined depending on the determination of the steering direction in step S120.

When the value sensed by the pressure difference calculator 202 is between the three pressure differences, the assist torque at that pressure difference is calculated by interpolation. For example, if the pressure difference when the joystick lever 24 is rotated to the right is +5 MPa, the assist torque at +5 MPa is found by interpolation from the assist torque values at 0 MPa or less (L1a), +10 MPa (L2a), and +20 MPa (L3a) at the lever input torque acquired from the steering torque signal. At this point, interpolation is performed assuming that the graph of L1a indicates the assist torque value at 0 MPa.

If the pressure difference when the joystick lever 24 is rotated to the right is a value of 0 MPa or less, interpolation is not performed, and the value of the assist torque is determined from the graph of L1a.

If the pressure difference when the joystick lever 24 is rotated to the left side is −5 MPa, the assist torque at −5 MPa is found by interpolation from the assist torque value at 0 MPa or more (L1b), −10 MPa (L2b), and −20 MPa (L3b) at the lever input torque acquired from the steering torque signal. As interpolation calculation, for example, linear interpolation can be cited. At this point, interpolation is performed assuming that the graph of L1b indicates the value of the assist torque at 0 MPa. Also, when the pressure difference when to the joystick lever 24 is rotated to the left side is a value of 0 MPa or more, interpolation is not performed, and the value of the assist torque is determined from the graph of L1b.

Thus, the assist torque can be continuously varied according to the value of the pressure difference by calculating the assist torque by interpolation.

Figure 12:
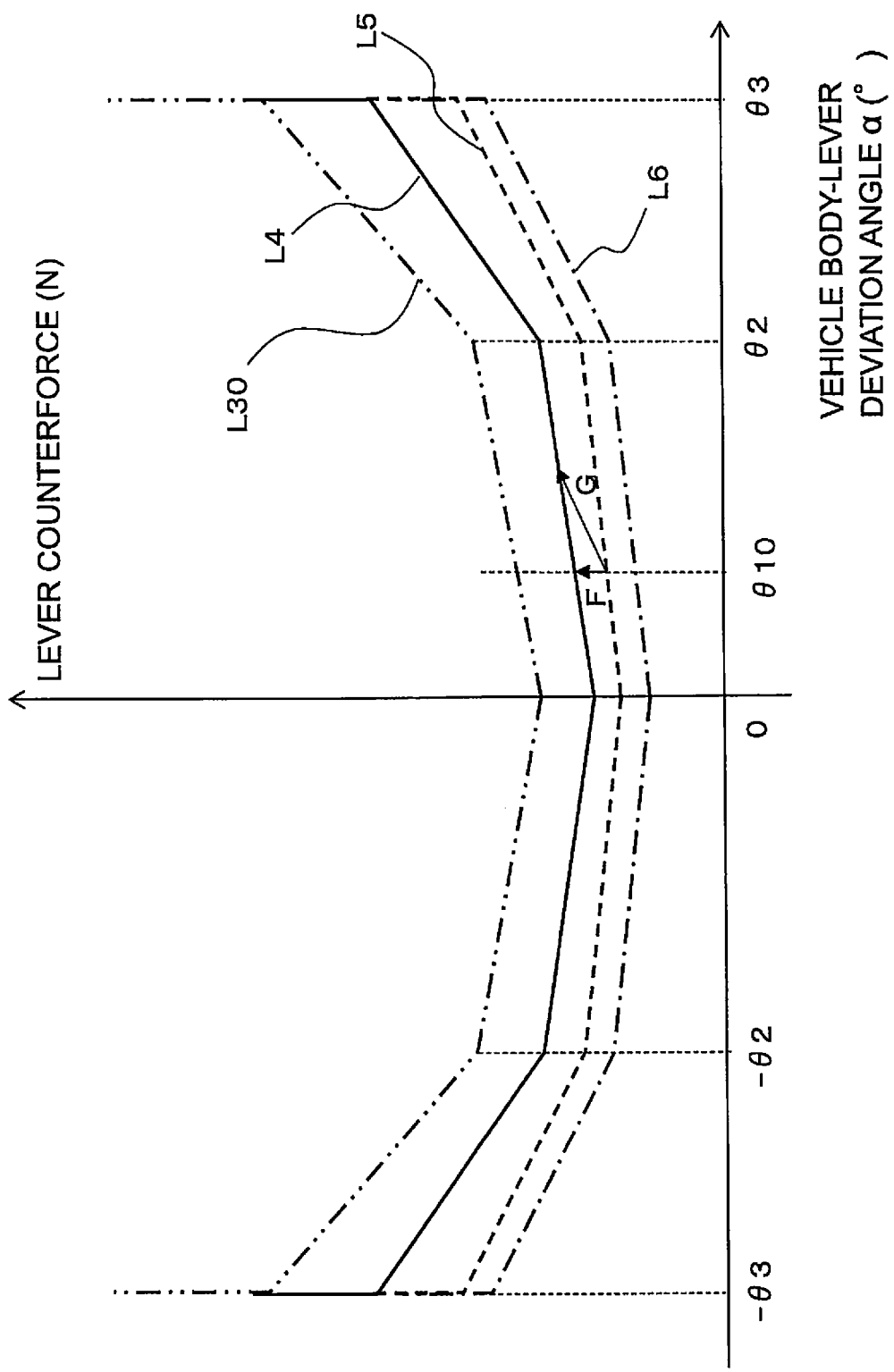
FIG. 12 is a graph of lever counterforce versus vehicle body-lever deviation angle when assist torque is imparted on the basis of the assist torque information in FIG. 10 and when assist torque is not applied.

FIG. 12 is a graph of the lever counterforce versus the deviation angle when the determined assist torque is imparted to the operation of the joystick lever 24. In FIG. 12, the solid line L4 indicates the lever counterforce versus the deviation angle when the pressure difference corresponding to the rotation direction is large (for example, +20 MPa in clockwise rotation and −20 MPa in counterclockwise rotation), the dotted line L5 indicates the lever counterforce versus the deviation angle when the pressure difference corresponding to the rotation direction is medium (for example, +10 MPa in clockwise rotation and −10 MPa in counterclockwise rotation), and the one-dot chain line L6 indicates the lever counterforce versus the deviation angle when the pressure difference corresponding to the rotation direction is small (for example, 0 MPa or less in clockwise rotation and 0 MPa or more in counterclockwise rotation). Also, in FIG. 12, a case in which no assist torque is imparted is indicated by the two-dot chain line L30. L30 in FIG. 12 shows the same state as in FIG. 7B.

Also, in FIG. 12, a positive deviation angle α indicates that the joystick lever 24 has moved to the right side, and a negative deviation angle α indicates that the joystick lever 24 has moved to the left side. That is, as shown in FIG. 7E, the angle θ3 indicates the angle at which operation is restricted when the joystick lever 24 is rotated to the right, and the angle −θ3 indicates the angle at which operation is restricted when the joystick lever 24 is rotated to the left. As shown in FIG. 7D, the angle θ2 indicates the angle at which the first center pin 76 hits the wall portions 71ae and 71be when the joystick lever 24 is rotated to the right, and the angle −θ2 indicates the angle at which the first center pin 76 hits the wall portions 71ae and 71be when the joystick lever 24 is rotated to the left.

As shown in FIG. 12, L4 to L6 and L30 are in line symmetry with respect to the vertical axis. In L4 to L6, the assisting force is imparted symmetrically with respect to left and right operations, and the lever counterforce is smaller than when assist torque is not imparted (L30).

Also, the lever counterforce is set to increase as the pressure difference corresponding to the rotation direction increases.

As described above, resistance to the operation of the joystick lever 24 can be generated on the basis of the pressure values in the steering cylinders 21 and 22.

2-2-3. Example of Load Generation

Figure 13:
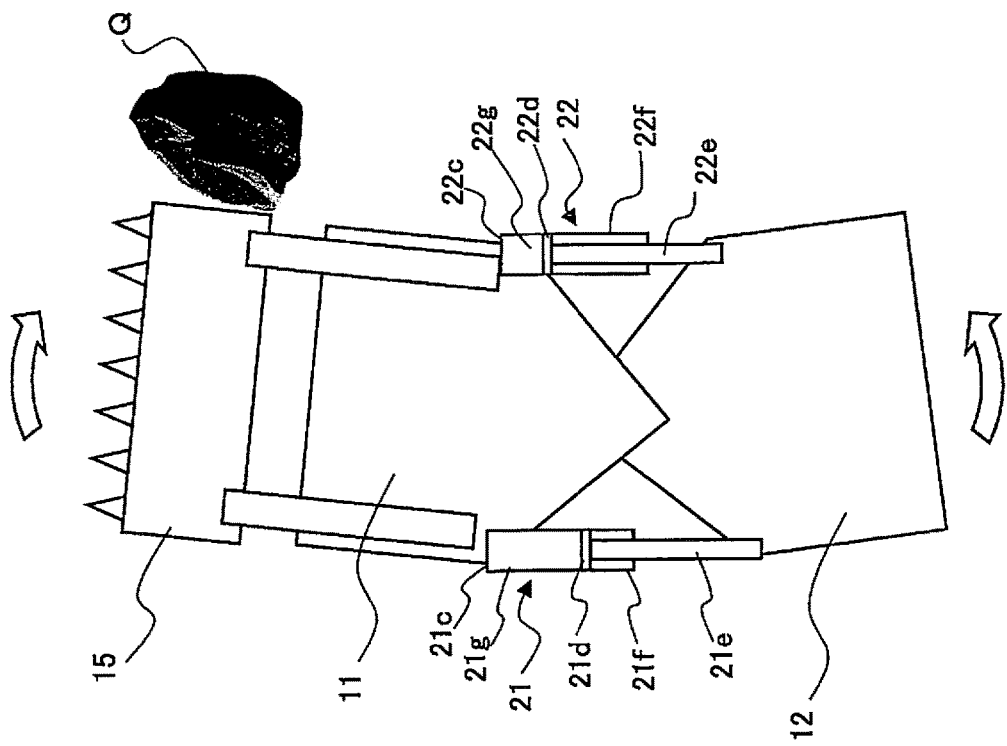
FIG. 13 shows an example of when a load is generated in a steering cylinder during steering of the wheel loader of FIG. 1.

FIG. 13 is a simplified plan view showing an example of when a load is generated in the steering cylinder 21. Of the space divided up by the piston 21d in the cylinder tube 21c of the steering cylinder 21, the first space on the piston rod 21e side is shown numbered 21f, and the second space on the opposite side is numbered 21g. The second space 21g can also be called a space on the bottom side of the steering cylinder 21.

Similarly, of the space divided up by the piston 22d in the cylinder tube 22c of the steering cylinder 22, the first space on the piston rod 22e side is numbered 22f, and the second space on the opposite side is numbered 22g. The second space 22g can also be called a space on the bottom side of the steering cylinder 22.

As shown in FIG. 13, an example will be described in which articulation (also referred to as a steering operation) is performed in the right direction, and there is an obstacle Q (a rock in FIG. 13, but it could be snow or the like instead) on the right side of the bucket 15.

When the joystick lever 24 is operated by the rotation angle θ1 in the right direction, for example, articulation is performed in the right direction, and the steering angle θs changes toward the rotation angle θ1 until the bucket 15 interferes with the obstacle Q. Also, fluid is supplied to the second space 21g of the steering cylinder 21 and the first space 22f of the steering cylinder 22, and fluid is discharged from the first space 21f of the steering cylinder 21 and the second space 22g of the steering cylinder 22, so the difference between the first pressure value produced by the first pressure sensor 108 and the second pressure value produced by the second pressure sensor 109 is 10 MPa, for example. Therefore, the counterforce against the operation of the joystick lever 24 is L5 shown in FIG. 12.

If the obstacle Q is encountered before the steering angle θs reaches the rotation angle θ1, the articulation will be obstructed by the obstacle Q. Let us assume the deviation angle α at this point to be θ10. Since the steering angle θs has not yet reached the rotation angle θ1 at this point, fluid continues to be supplied to the second space 21g of the steering cylinder 21 and the first space 22f of the steering cylinder 22 so that the steering angle θs approaches the rotation angle θ1. Therefore, the pressure in the second space 21g of the steering cylinder 21 and in the first space 22f of the steering cylinder 22 gradually rises. This pressure is sensed as the second pressure value by the second pressure sensor 109 shown in FIG. 2.

On the other hand, since fluid is only discharged from the first space 21f of the steering cylinder 21 and the second space 22g of the steering cylinder 22, the first pressure value sensed by the first pressure sensor 108 does not go very high. Therefore, the pressure difference calculated by the pressure difference calculator 202 (second pressure value−first pressure value) increases. For example, if the pressure difference rises when the position of the joystick lever 24 is maintained (a state in which the deviation angle θs is θ10), for example, the lever counterforce gradually increases (see the arrow F) so as to go from the dotted line L5 (pressure difference of 10 MPa during a normal steering operation) and gradually approach the solid line L4 (pressure difference of 20 MPa). That is, at the deviation angle θ10, the lever counterforce increases from the lever counterforce L5.

Also, if the operator does not notice the obstacle Q and operates the joystick lever 24 further to the right in order to perform an articulation operation, the lever counterforce increases because the deviation angle is larger, and the pressure difference ΔP also increases, and the lever counterforce further increases (see the arrow G). For example, as shown by the arrow G, the lever counterforce approaches the solid line L4 while the deviation angle increases from the dotted line L5. Therefore, the operator can feel resistance to the operation of the joystick lever 24. Consequently, the operator can notice that a load is being generated in the steering cylinders 21 and 22.

Embodiment 2

The wheel loader in Embodiment 2 of the present invention will now be described. In Embodiment 1 above, the assist torque is determined without taking into account the speed of the vehicle, but in this embodiment, the speed of the vehicle is factored into the determination of the assist torque. Embodiment 2 will be described by focusing on how it differs from Embodiment 1. Components that are the same as those in Embodiment 1 will be numbered the same.

1. Configuration

Figure 14:
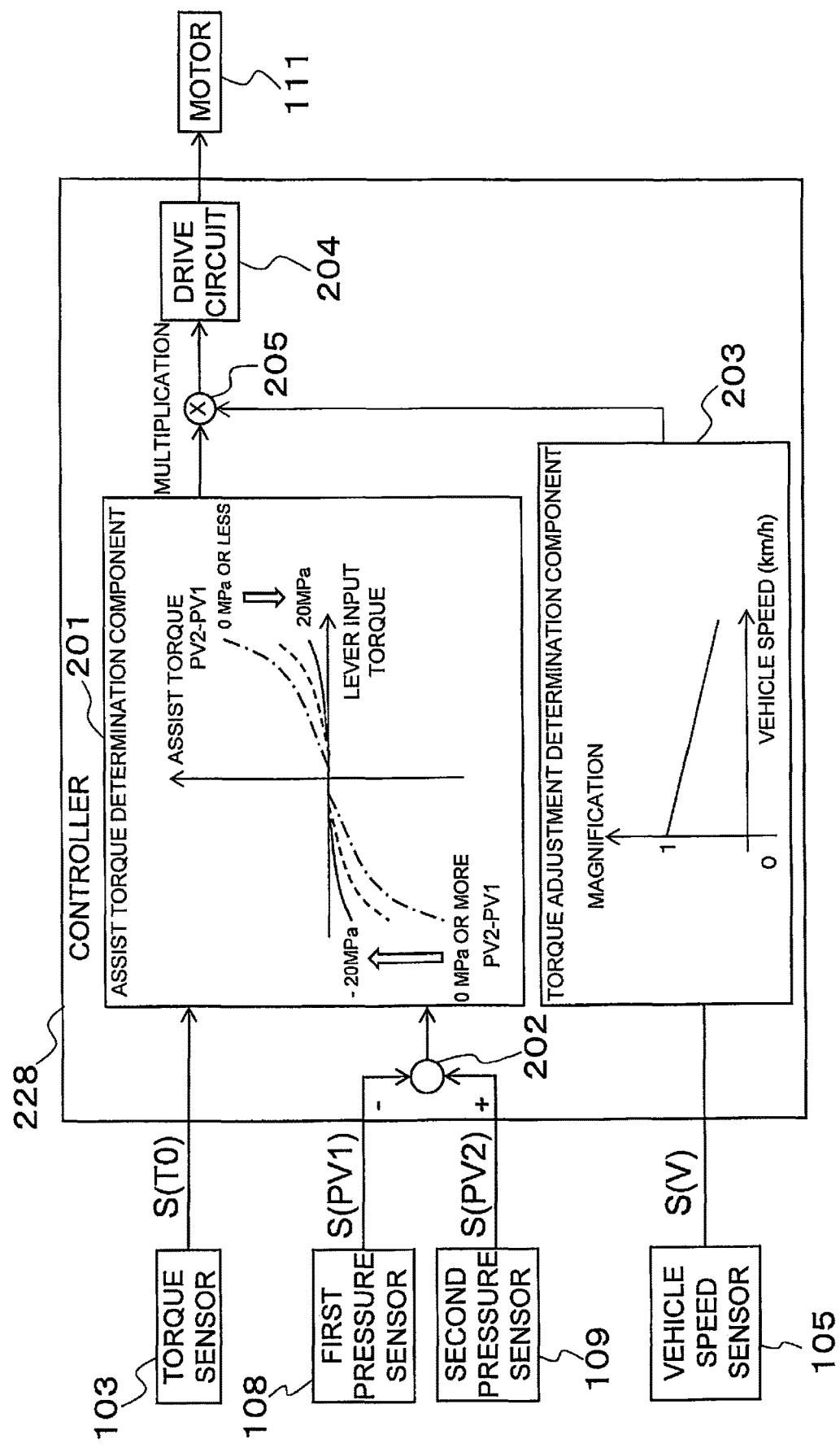
FIG. 14 is a block diagram showing the configuration of the controller of the wheel loader in Embodiment 2 of the present invention.

FIG. 14 is a diagram of a controller 228 of the wheel loader 1 in Embodiment 2. In the Embodiment 2, the controller 228 mainly has the assist torque determination component 201, the pressure difference calculator 202, a torque adjustment determination component 203, an adjustment calculator 205, and the drive circuit 204. The assist torque determination component 201, the pressure difference calculator 202, and the drive circuit 204 are the same as in Embodiment 1.

The torque adjustment determination component 203 receives a vehicle speed signal S(V) from the vehicle speed sensor 105 and adjusts the assist torque determined by the assist torque determination component 201 on the basis of the speed of the wheel loader 1. More specifically, the torque adjustment determination component 203 determines the magnification of the assist torque from the acquired vehicle speed on the basis of the torque adjustment information. The torque adjustment information is stored in the torque adjustment determination component 203, but may be separately stored in a storage component. As shown in FIG. 14, the torque adjustment information is set such that the magnification is 1 when the vehicle speed is zero, and the magnification decreases as vehicle speed increases. The torque adjustment determination component 203 outputs information about the determined adjustment magnification to the adjustment calculator 205.

The adjustment calculator 205 calculates the target assist torque by multiplying the assist torque determined by the assist torque determination component 201 by the adjustment magnification. The adjustment calculator 205 generates a target assist torque signal S(T1) including information related to the target assist torque, and outputs it to the drive circuit 204.

2. Operation

Figure 15:
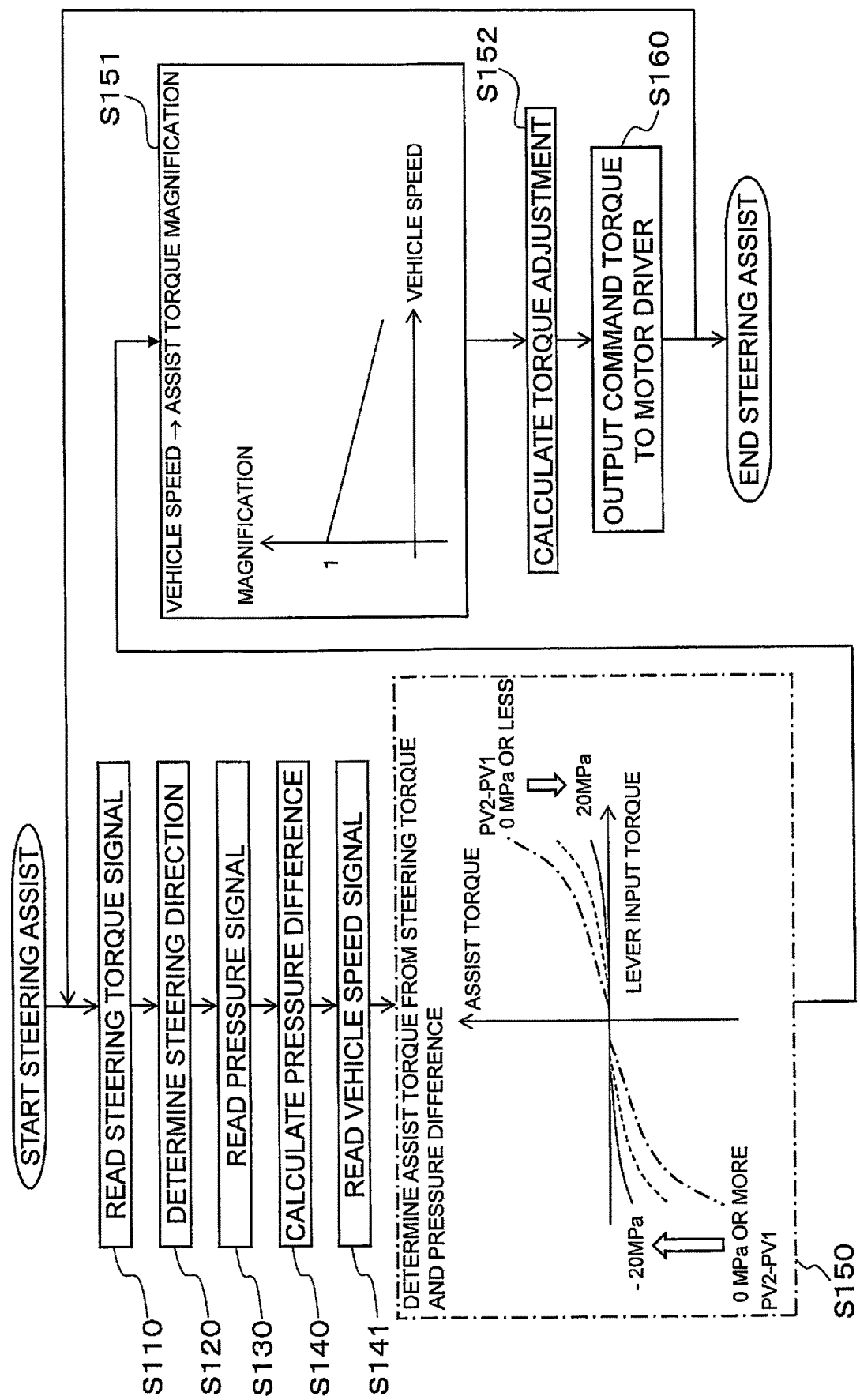
FIG. 15 is a flowchart of the wheel loader control method in Embodiment 2 of the present invention.

The operation for controlling the force imparting component 27 of the wheel loader 1 in Embodiment 2 will now be described. FIG. 15 is a flowchart of the operation for controlling the force imparting component 27 in Embodiment 2.

The operations in steps S110 to S140 are the same as those in Embodiment 1. After step S140, in step S141 the torque adjustment determining section 203 of the controller 228 receives a vehicle speed signal S(V) from the vehicle speed sensor 105.

Next, in step S150, as described in Embodiment 1, the assist torque determination component 201 determines the assist torque on the basis of the assist torque information, from the steering torque signal S(T0) and the pressure difference information.

Next, in step S151 the torque adjustment determination component 203 determines the adjustment magnification from the vehicle speed signal S(V) on the basis of the torque adjustment information.

Next, in step S152 the adjustment calculator 205 calculates the target assist torque by multiplying the assist torque determined in step S150 by the adjustment magnification determined in step S151.

Next, in step S160 the adjustment calculator 205 generates a target assist torque signal S(T1) including information related to the target assist torque (also referred to as the command torque), and outputs this signal to the electric motor 111 via the drive circuit 204.

Figure 16B:
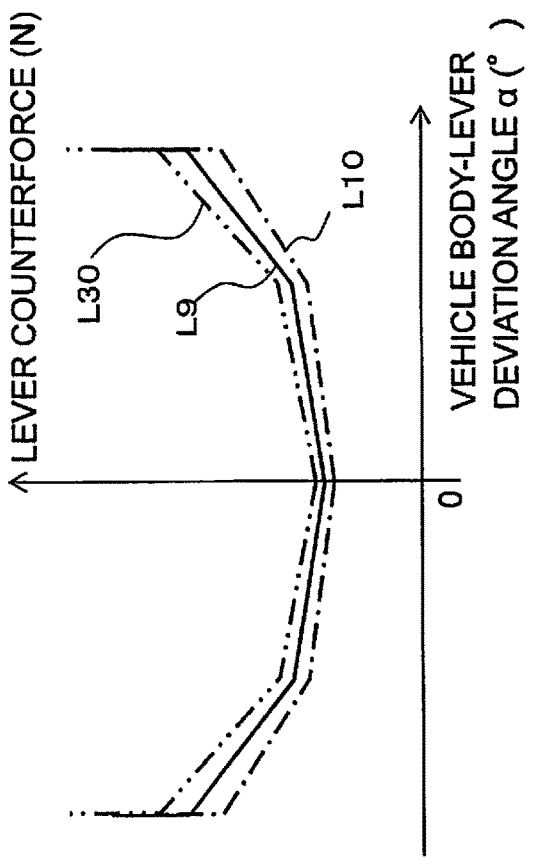
FIG. 16B is a graph of lever counterforce versus vehicle body-lever deviation angle when the assist torque determined by the controller in FIG. 15 is and is not imparted at a high vehicle speed.
Figure 16A:
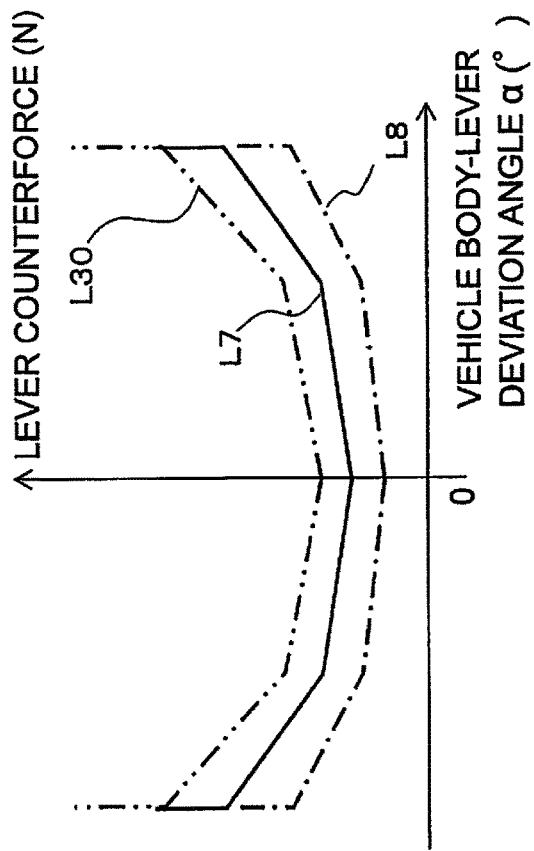
FIG. 16A is a graph of lever counterforce versus vehicle body-lever deviation angle when the assist torque determined by the controller in FIG. 15 is and is not imparted at a low vehicle speed.

FIG. 16A is a graph of the lever counterforce versus the deviation angle when the assist torque determined at a low vehicle speed (5 km/hour) is imparted to the operation of the joystick lever 24. FIG. 16B is a graph of the lever counterforce versus the deviation angle when the assist torque determined at a high vehicle speed (20 km/hour) is imparted to the operation of the joystick lever 24.

The solid line L7 shown in FIG. 16A indicates the lever counterforce versus the deviation angle when the pressure difference corresponding to the rotation direction is large (for example, +20 MPa in clockwise rotation and −20 MPa in counterclockwise rotation), the one-dot chain line L8 indicates the lever counterforce versus the deviation angle when the pressure difference corresponding to the rotation direction is small (for example, 0 MPa or less in clockwise rotation and 0 MPa or more in counterclockwise rotation). A case in which no assist torque is imparted is indicated by the two-dot chain line L30.

The solid line L9 shown in FIG. 16B indicates the lever counterforce versus the deviation angle when the pressure difference corresponding to the rotation direction is large (for example, +20 MPa in clockwise rotation and −20 MPa in counterclockwise rotation), and the one-dot chain line L10 indicates the lever counterforce versus the deviation angle when the pressure difference corresponding to the direction is small (for example, 0 MPa or less in clockwise rotation and 0 MPa or more in counterclockwise rotation). A case in which no assist torque is imparted is indicated by the two-dot chain line L30.

As a comparison of L7 and L9 reveals, the assisting force imparted to the operation of the joystick lever 24 is set to be smaller when the vehicle speed is higher than when it is low, at a given pressure difference (20 MPa). Likewise with L8 and L10, the assisting force imparted to the operation of the joystick lever 24 is set to be smaller when the vehicle speed is higher than when it is low, at a given pressure difference (0 MPa).

Thus setting the assisting force at a high speed to be smaller than at a low speed ensures good travel stability at high speed. Also, setting the assisting force at a low speed to be larger than at a high speed ensures ease of operation at low speeds.

Also, as can be seen from the difference in lever counterforce between L7 and L8 and the difference in lever counterforce between L9 and L10, in the case which the pressure becomes high in either of the steering cylinders 21 and 22, when the vehicle speed is high, the resistance generated against operation of the joystick lever 24 is set to be smaller than when the vehicle speed is low.

This suppresses a sudden increase in resistance during high-speed movement and ensures stability at high speed.

Embodiment 3

The wheel loader 1 in Embodiment 3 of the present invention will now be described. In Embodiment 2, assist torque is determined on the basis of the steering torque, the pressure difference, and the vehicle speed, but in Embodiment 3, assist torque is further determined on the basis of the deviation angle. In Embodiment 3, the description will focus on differences from Embodiments 1 and 2. Those components that are the same as in Embodiments 1 and 2 will be numbered the same.

1. Configuration

Figure 17:
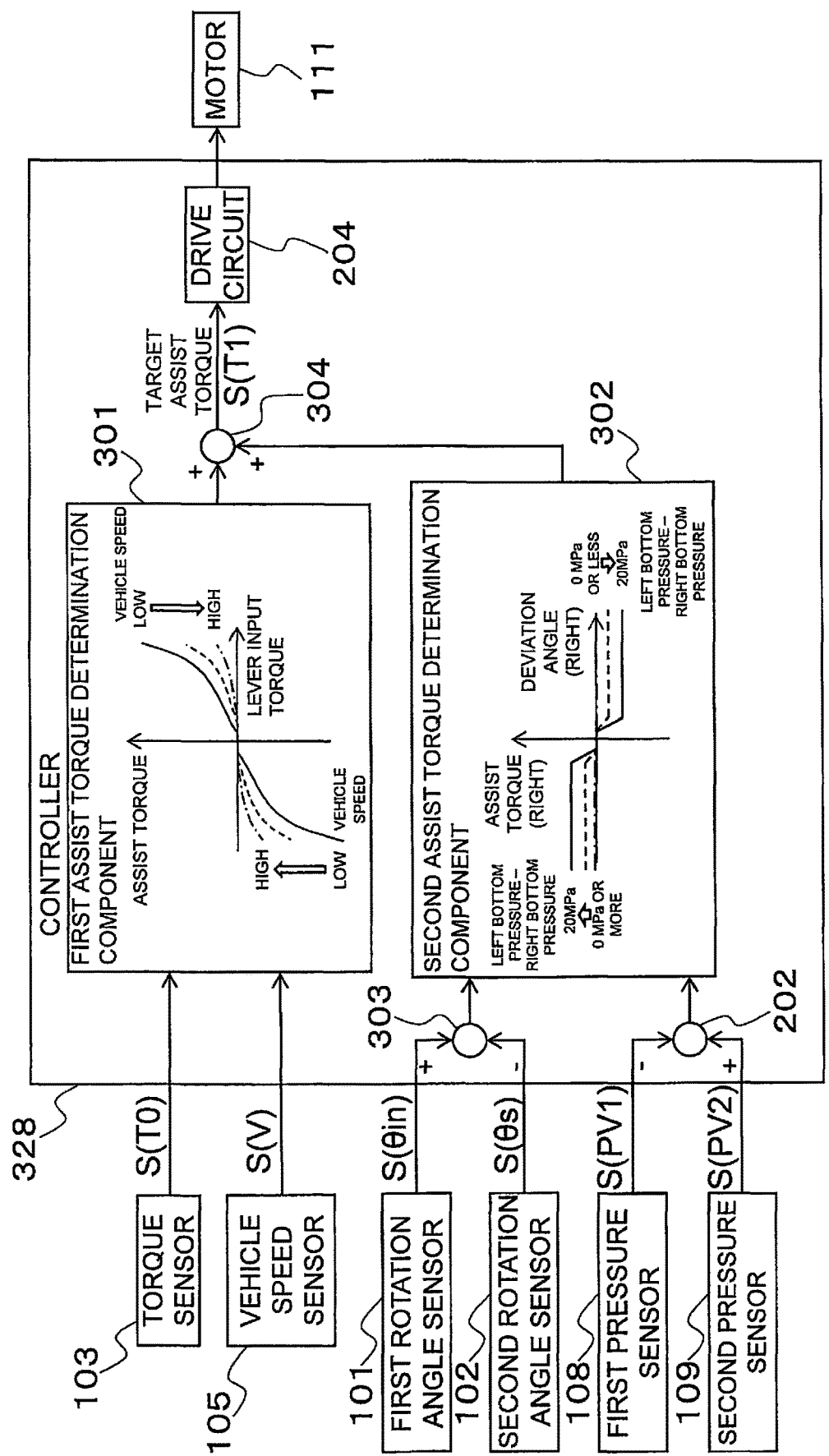
FIG. 17 is a block diagram of the configuration of the controller of the wheel loader in Embodiment 3 of the present invention.

FIG. 17 is a diagram of the configuration of a controller 328 of the wheel loader 1 in Embodiment 3. In Embodiment 3, the controller 328 comprises a first assist torque determination component 301, a second assist torque determination component 302, a deviation angle calculator 303, the pressure difference calculator 202, a summing component 304, and the drive circuit 204.

The first assist torque determination component 301 stores the relation of the imparted assist torque to the lever input torque (first assist torque information) at a plurality of speeds. This first assist torque information is set in advance. The first assist torque determination component 301 receives a steering torque signal (S(T0) shown in FIG. 17) from the torque sensor 103 and a speed signal (S(V) shown in FIG. 17) from the vehicle speed sensor 105. The first assist torque determination component 301 then determines the first assist torque from the steering torque signal received from the torque sensor 103 and the speed signal received from the vehicle speed sensor 105, on the basis of the stored first assist torque information. The first assist torque determination component 301 sends the determined first assist torque to the summing component 304.

The deviation angle calculator 303 receives a first rotation angle signal (S(θin) shown in FIG. 17) indicating the rotation angle θin sensed by the first rotation angle sensor 101, and a second rotation angle signal (S(θs) shown in FIG. 17) indicating the rotation angle θfb (=θs) sensed by the second rotation angle sensor 102. The deviation angle calculator 303 then calculates the difference between the rotation angle θin and the rotation angle θfb, and calculates the deviation angle α (θin−θfb).

The second assist torque determination component 302 stores the relation of the imparted assist torque to the deviation angle α (second assist torque information) at a plurality of pressure differences ΔP. This second assist torque information is set in advance. The second assist torque determination component 302 determines the second assist torque from the deviation angle α on the basis of the stored second assist torque information. The second assist torque determination component 302 sends the determined second assist torque to the summing component 304.

The first assist torque information is stored in a storage component inside the first assist torque determination component 301, and the second assist torque information is stored in a storage component inside the second assist torque determination component 302, but a storage component for storing the first assist torque information and the second assist torque information may be separately provided. Also, the storage component is constituted by a RAM, a ROM, a hard disk drive, or the like.

The summing component 304 calculates the sum of the first assist torque determined by the first assist torque determination component 301 and the second assist torque determined by the second assist torque determination component 302, and calculates the target assist torque to be imparted to the input shaft 81b. The summing component 304 outputs the calculated target assist torque to the drive circuit 204 as a target assist torque signal (S(T1) shown in FIG. 17).

In this manner, the controller 328 can impart an assisting force or counterforce to the operation of the joystick lever 24 by the operator on the basis of the torque T, the deviation angle α, the velocity V, and the pressure difference ΔP.

2. Operation

The operation for controlling the force imparting component 27 of the wheel loader 1 in Embodiment 3 will now be described.

The wheel loader 1 in this embodiment changes the assist torque to be imparted to the operation of the joystick lever 24 according to the torque and the speed, on the basis of the first assist torque information.

Furthermore, the wheel loader 1 in this embodiment generates resistance against the operation of the joystick lever 24 according to the pressure difference when the joystick lever 24 is operated, on the basis of the second assist torque information.

First, the first assist torque information and the second assist torque information will be described.

2-1. First Assist Torque Information

FIG. 18A is a graph of the assist torque (first assist torque information) to be imparted for each vehicle speed, versus the input torque. In FIG. 18A, the solid line L11 indicates assist torque information at a vehicle speed of 0 km/h, the dotted line L12 indicates assist torque information at a vehicle speed of 25 km/h, and the one-dot chain line L13 indicates assist torque information at a vehicle speed of 40 km/h.

In the graph shown in FIG. 18A, the positive lever input torque indicates torque generated by the rotation of the joystick lever 24 toward the right side, and the negative lever input torque indicates torque generated by the rotation of the joystick lever 24 toward the left side. Also, the positive assist torque indicates a case in which a force is applied to the clockwise rotation of the input shaft 81b, the negative assist torque indicates a case in which a force is applied to the counterclockwise rotation of the input shaft 81b.

That is, L11a indicates the assist torque when the joystick lever 24 is rotated to the right at a vehicle speed of 0 km/h, and L11b indicates the assist torque when the joystick lever 24 is rotated to the left at a vehicle speed of 0 km/h. L12a indicates the assist torque when the joystick lever 24 is rotated to the right at a vehicle speed of 25 km/h, and L12b indicates the assist torque when the joystick lever 24 is rotated to the left at a vehicle speed of 25 km/h. L13a indicates the assist torque when the joystick lever 24 is rotated to the right at a vehicle speed of 40 km/h, and L13b indicates the assist torque when the joystick lever 24 is rotated to the left at a vehicle speed of 40 km/h.

L11a, L12a, and L13a indicate when the joystick lever 24 is rotated to the right side, and since the assist torque at this point is a positive value, a force is imparted to the clockwise rotation of the input shaft 81b. L11b, L12b, and L13b indicate when the joystick lever 24 is rotated to the left side, and since the assist torque at this point is a negative value, a force is imparted to the counterclockwise rotation of the input shaft 81b. Thus, with the first assist torque information, an assisting force is imparted to the operation of the joystick lever 24.

L11a and L11b are symmetrical with respect to the origin, L12a and L12b are symmetrical with respect to the origin, and L13a and L13b are symmetrical with respect to the origin. Therefore, the assist force is in left and right symmetry with respect to the absolute value of the input torque.

2-2. Second Assist Torque Information

FIG. 18B is a graph of the second assist torque information. The second assist torque information indicates the assist torque to be imparted to generate resistance to the operation of the joystick lever 24 when a load is produced at either of the steering cylinders 21 and 22. FIG. 18B is a graph of the assist torque (second assist torque information) versus the vehicle body-lever deviation angle (a).

FIG. 18B shows three pieces of assist torque information with different pressure differences, and assist torque information when the pressure difference ΔP corresponding to the rotation direction is large is indicated by the solid line L20. Assist torque information when the pressure difference ΔP corresponding to the rotation direction is medium is indicated by the dotted line L21. Assist torque information when the pressure difference ΔP corresponding to the rotation direction is small is indicated by the one-dot chain line L22. Saying that the pressure difference corresponding to the rotation direction is large means, for example, that the pressure difference is +20 MPa when the joystick lever 24 is rotated to the right side, and that the pressure difference is −20 MPa when the joystick lever 24 is rotated to the left side. Also, saying that the pressure difference corresponding to the rotation direction is medium means, for example, that the pressure difference is +10 MPa when the joystick lever 24 is rotated to the right side, and that the pressure difference is −10 MPa when the joystick lever 24 is rotated to the left side. Also, saying that the pressure difference corresponding to the rotation direction is small means, for example, that the pressure difference is 0 MPa or less when the joystick lever 24 is rotated to the right side, and that the pressure difference is 0 MPa or more when the joystick lever 24 is rotated to the left side.

In FIG. 18B, a positive body-lever deviation angle α (θin−θs) indicates that the joystick lever 24 is operated to the right, and a negative body-lever deviation angle α indicates that the joystick lever 24 is operated to the left. Also, a positive assist torque indicates that a force is applied to the clockwise rotation of the input shaft 81b, and a negative assist torque indicates that a force is applied to the counterclockwise rotation of the input shaft 81b.

L22a, which is the part of L22 in which the deviation angle is a positive value, indicates the assist torque (counterforce) when the joystick lever 24 is rotated to the right at a pressure difference of 0 MPa or less. L22b, which is the part of L22 in which the deviation angle is a negative value, indicates the assist torque (counterforce) when the joystick lever 24 is rotated to the left at a pressure difference of 0 MPa or more.

Also, L21a, which is the part of L21 in which the deviation angle is a positive value, indicates the assist torque when the joystick lever 24 is rotated to the right at a pressure difference of +10 MPa. L21b, which is the part of L21 in which the deviation angle is a negative value, indicates the assist torque when the joystick lever 24 is rotated to the left at a pressure difference of −10 MPa.

Also, L20a, which is the part of L20 in which the lever input torque is a positive value, indicates the assist torque when the joystick lever 24 is rotated to the right at a pressure difference of +20 MPa. L20b, which is the part of L20 in which the lever input torque is a negative value, indicates the assist torque when the joystick lever 24 is rotated to the left at a pressure difference of −20 MPa.

L20a, L21a, and L22a shown in FIG. 18B are set such that when the deviation angle α reaches the angle +θ4, a counterforce is generated and a constant assist torque is imparted. L20b, L21b, and L22b are set such that when the deviation angle α reaches the angle −θ4, a counterforce is generated and a constant assist torque is imparted. The range from −θ4 to +θ4 corresponds to play in the pilot valve 42.

More precisely, at L20a, L21a, and L22a, when the joystick lever 24 is rotated to the right and the deviation angle α reaches the angle +θ4, a force is imparted in the counterclockwise rotation direction to the input shaft 81b until the deviation angle α reaches +θ3 (catch-up angle). This force in the counterclockwise rotation direction is set such that resistance increases at a certain slope from +θ4 to +θ5. Once the deviation angle has reached +θ5, the force imparted to the input shaft 81b in the counterclockwise rotation direction remains constant.

At L20a, L21a, and L22a, when the joystick lever 24 is rotated to the left and the deviation angle α reaches the angle −θ4, a force is imparted in the clockwise rotation direction to the input shaft 81b until the deviation angle α reaches −θ3 (catch-up angle). This force in the clockwise rotation direction is set such that resistance increases at a certain slope. Once the deviation angle has reached −θ5, the force imparted to the input shaft 81b in the clockwise rotation direction remains constant.

As indicated by L20, L21, and L22, the setting is such that the larger is the pressure difference corresponding to the rotation direction, the greater is the resistance force against the operation of the joystick lever 24. That is, when the joystick lever 24 is rotated to the right, a force is imparted to counterclockwise rotation in FIG. 18B, and the magnitude of the absolute value of the negative torque increases along with the pressure difference. Also, when the joystick lever 24 is rotated to the left, a force is imparted to clockwise rotation in FIG. 18B, and the magnitude of the torque increases with the pressure difference. As shown by the one-dot chain line L22, when there is almost no pressure difference, the setting is such that almost no resistance is generated.

2-3. Control Operation

Figure 19:
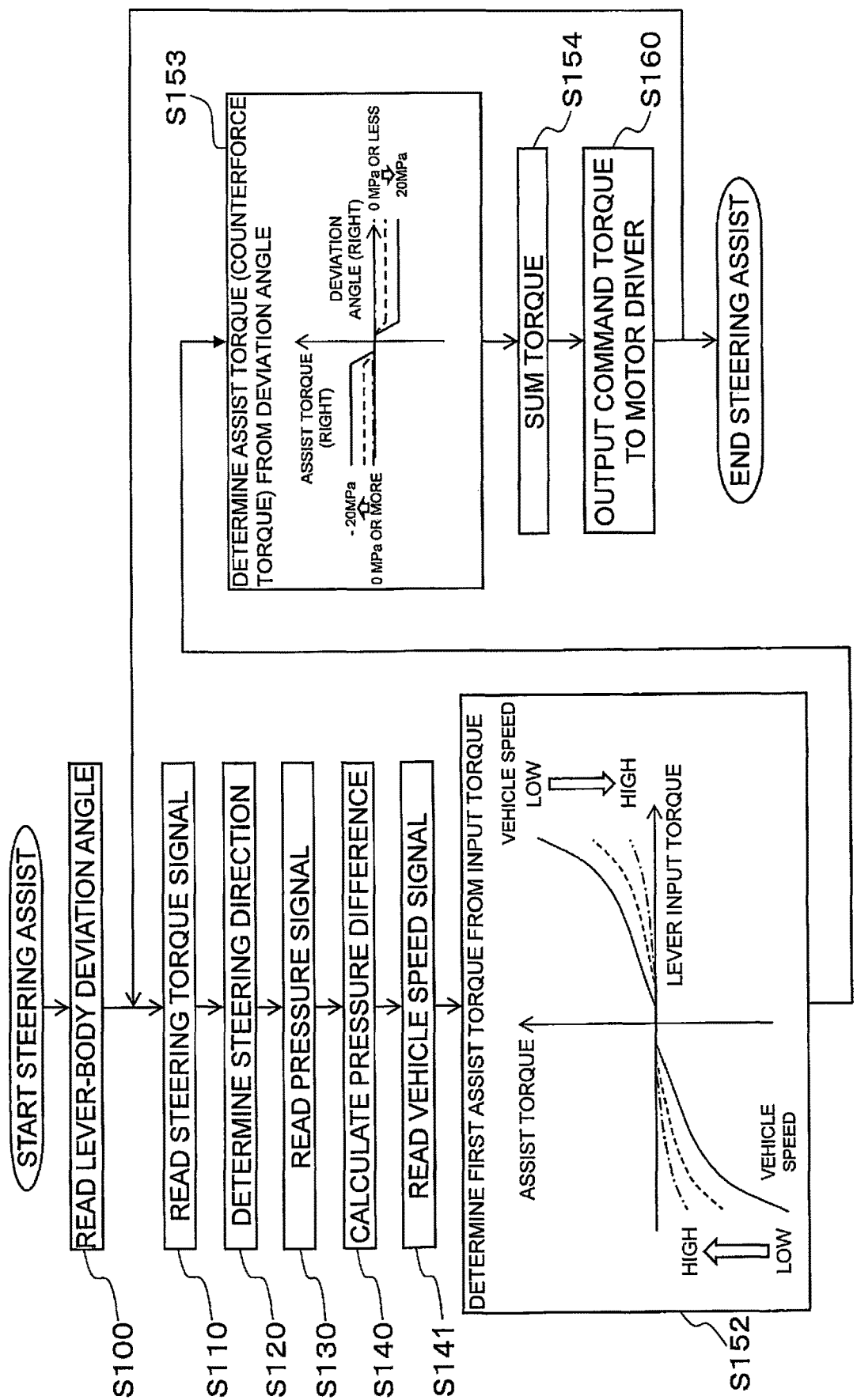
FIG. 19 is a flowchart of the wheel loader control method in Embodiment 3 of the present invention.

FIG. 19 is a flowchart showing the control operation of the force imparting component 27.

When the joystick lever 24 is operated, in step S100 the second assist torque determination component 302 of the controller 28 receives the first rotation angle signal (S(θin) shown in FIG. 17) from the first rotation angle sensor 101, and receives the second rotation angle signal (S(θs) shown in FIG. 17) from the second rotation angle sensor 102. Consequently, the second assist torque determination component 302 acquires the rotation angle Din of the operation input shaft 61 from the first rotation angle sensor 101, and acquires the rotation angle θfb (=θs) of the feedback input shaft 62 from the second rotation angle sensor 102. The second assist torque determination component 302 then calculates the deviation angle α (=θin−θs).

Next, in step S110 the assist torque determination component 201 of the controller 28 receives a steering torque signal (S(T0) shown in FIG. 17) from the torque sensor 103. In step S120 the controller 28 determines the steering direction of the joystick lever 24 on the basis of the steering torque signal.

Next, in step S130 the pressure difference calculator 202 of the controller 28 acquires a first pressure value signal S(PV1) from the first pressure sensor 108, and acquires a second pressure value signal S(P2) from the second pressure sensor 109.

In step S140 the pressure difference calculator 202 calculates the pressure difference by subtracting the first pressure value from the second pressure value.

Next, in step S141 the first assist torque determination component 301 of the controller 28 receives a speed signal S(V) from the vehicle speed sensor 105.

Next, in step S150 the first assist torque determination component 301 determines the first assist torque from the steering torque signal and the speed signal on the basis of the stored first assist torque information shown in FIG. 18A.

More precisely, the first assist torque determination component 301 sores the three types of first assist torque information shown in FIG. 18A (for when the vehicle speed is 0 km/h, 25 km/h, and 40 km/h). When the value sensed by the vehicle speed sensor 105 is between these three speeds (such as 12 km/h), the first assist torque determination component 301 calculates the assist torque at that vehicle speed by interpolation. The controller 28 thus determines the first assist torque by interpolation. Calculating the first assist torque by interpolation allows the assist torque to be continuously varied according to changes in speed. The first assist torque determination component 301 then sends the determined first assist torque to the summing component 304.

Next, in step S153 the second assist torque determination component 302 determines the second assist torque from the deviation angle α calculated in step S130 and the pressure difference ΔP calculated in step S140, on the basis of the second assist torque information shown in FIG. 18B. This second assist torque is a counterforce, and is torque that generates a resistance force according to the pressure difference ΔP against the operation of the joystick lever 24. The second assist torque determination component 302 sends the determined second assist torque to the summing component 304.

Next, in step S154 the summing component 304 sums the first assist torque and the second assist torque and calculates the target assist torque, and outputs the target assist torque calculated in step S160 as a target assist torque signal (S(T1) shown in FIG. 17) to the drive circuit 204. Here, the target assist torque is a positive or negative value, and also includes information about the rotation direction.

The summing component 304 sums these values, and if the absolute value of the counterforce is greater than the absolute value of the assisting force, the target assist torque is a negative value, and a force equal in magnitude to the remainder of subtracting the absolute value of the assisting force from the absolute value of the counterforce when the joystick lever 24 to the right is imparted to the counterclockwise rotation. On the other hand, if the absolute value of the assisting force is greater than the absolute value of the counterforce, the target assist torque is a positive value, and a force equal in magnitude to the remainder of subtracting the absolute value of the counterforce from the absolute value of the assisting force when the joystick lever 24 to the right is imparted to the clockwise rotation.

Figure 20:
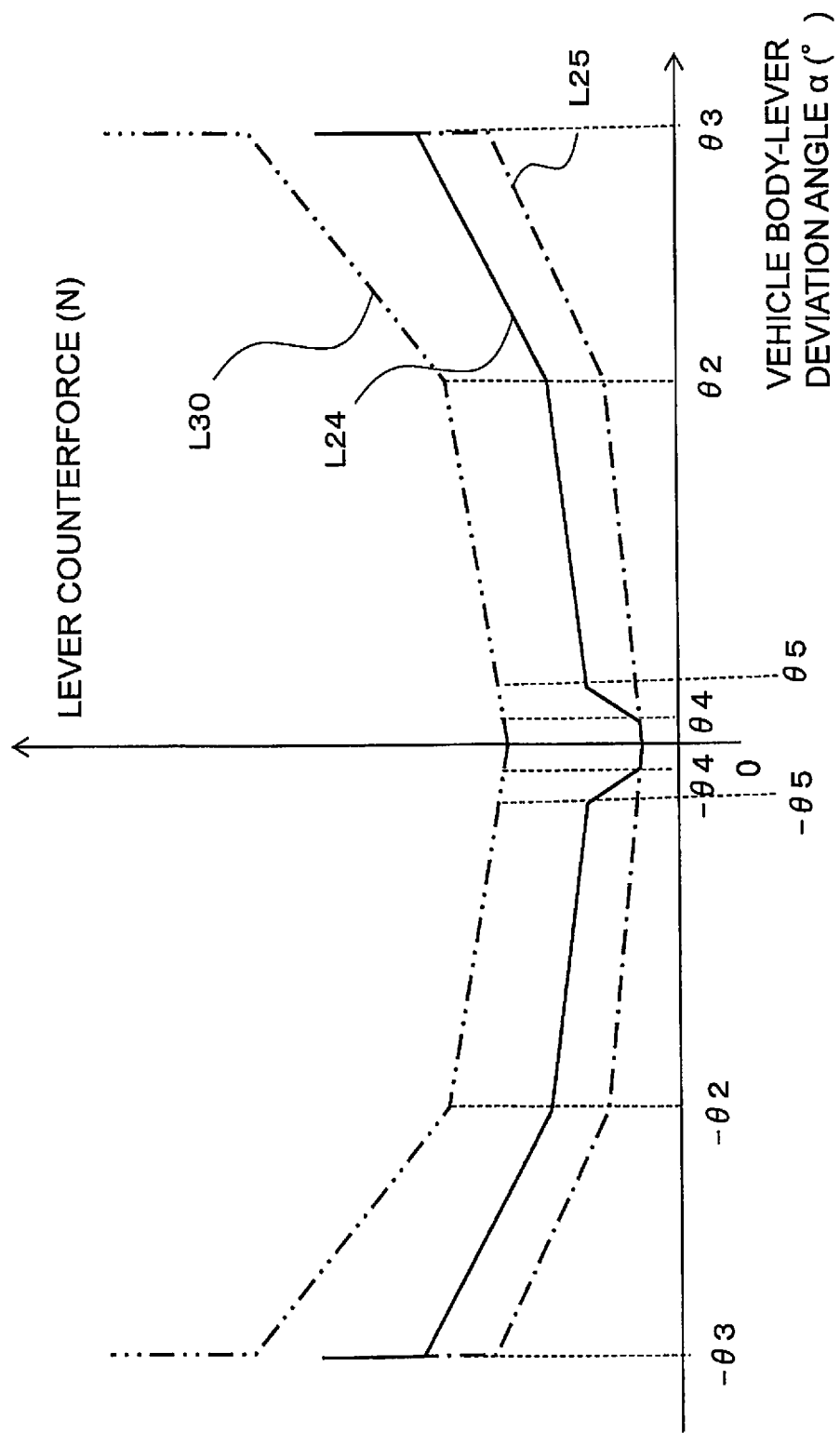
FIG. 20 is a graph of lever counterforce versus vehicle body-lever deviation angle when the assist torque determined by the controller in FIG. 17 is and is not imparted at a low vehicle speed.

FIG. 20 is a graph of the lever counterforce versus the deviation angle when the assist torque combined by the summing component 304 is imparted to the operation of the joystick lever 24 at low speed. In FIG. 20, the solid line L24 is the lever counterforce when the pressure difference ΔP at low speed is 20 MPa, and the one-dot chain line L25 is the lever counterforce when the pressure difference ΔP is 0 MPa at low speed. In FIG. 20, the lever counterforce in a state in which no assist torque is imparted is indicated by the two-dot chain line L30.

At low speed, as shown in FIG. 18A and FIG. 20, the assisting force to the operation of the joystick lever 24 is increased, but when the pressure difference ΔP increases, as shown by L24 and L25, the assisting force decreases. This allows the operator to feel that a load is being generated in the steering cylinders 21 and 22.

Figure 21:
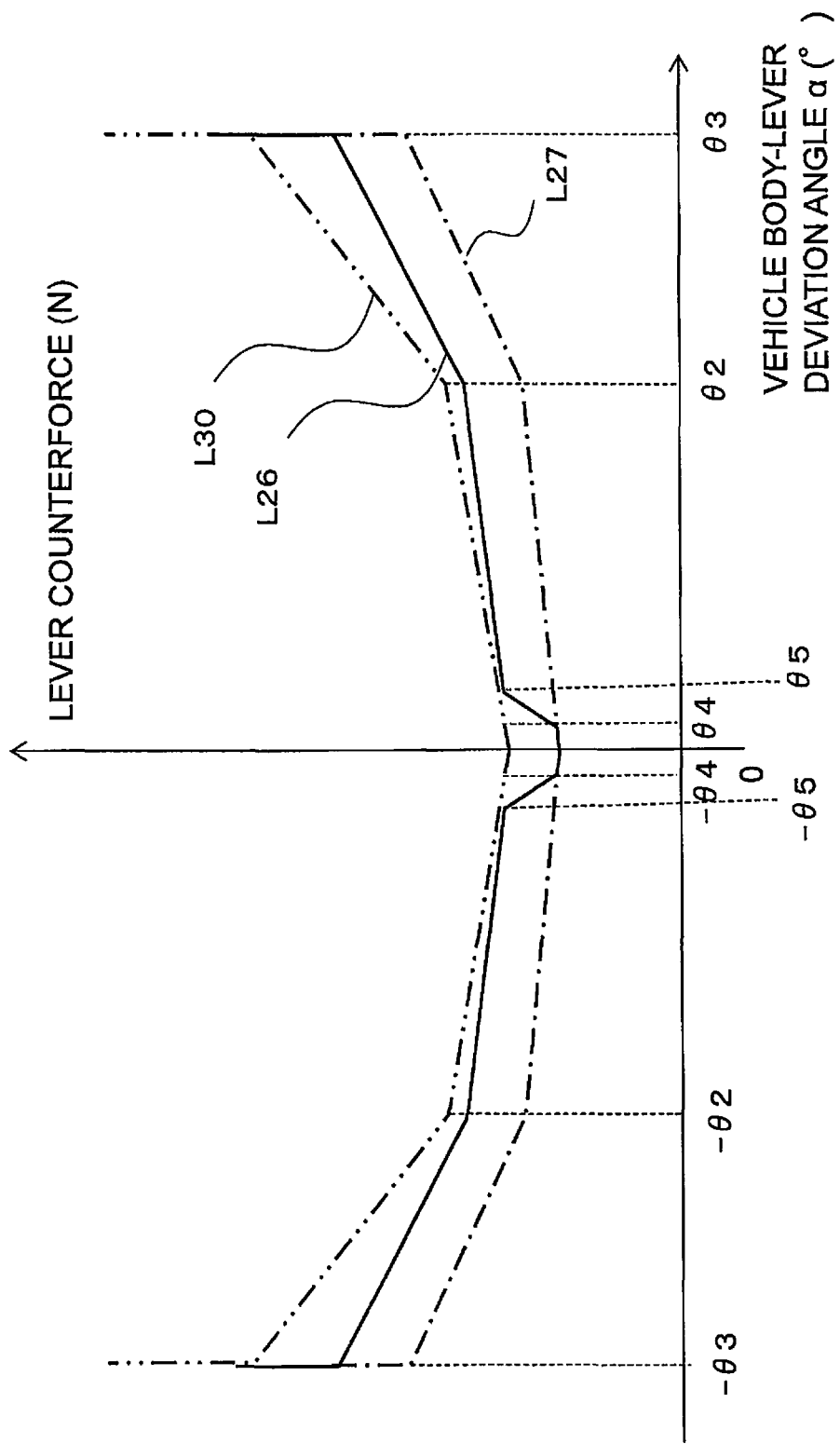
FIG. 21 is a graph of lever counterforce versus vehicle body-lever deviation angle when the assist torque determined by the controller in FIG. 17 is and is not imparted at a high vehicle speed.

FIG. 21 is a graph of the lever counterforce versus the deviation angle when the assist torque combined by the summing component 304 is imparted to the operation of the joystick lever 24 at high speed. In FIG. 21, the solid line L26 is the lever counterforce when the pressure difference ΔP is 20 MPa at high speed, and the one-dot chain line L27 is the lever counterforce when the pressure difference ΔP is 0 MPa at high speed. In FIG. 21, the lever counterforce in a state in which no assist torque is imparted is indicated by the two-dot chain line L30.

At high speed, as shown in FIGS. 18A and 21, the assisting force to the operation of the joystick lever 24 is increased, but when the pressure difference ΔP increases, as shown by L25 and L26, the assisting force decreases once the range of the deviation angle −θ4 to +θ4 is exceeded. This allows the operator to feel that a load is being generated in the steering cylinders 21 and 22.

Also, compared to when the speed is low as shown in FIG. 20, when the speed is high, the assisting force is set to be small at a given pressure difference. As a result, stability at high speed and operability at low speed can both be achieved.

Features, etc.

(1)

The wheel loader 1 (an example of a work vehicle) in Embodiments 1 to 3 comprises the steering cylinders 21 and 22 (an example of a hydraulic actuator), the pilot valve 42 (an example of a control valve), the joystick lever 24 (an example of an operation member), the pressure sensing unit 29, the force imparting component 27, and the controller 28, 228, or 328. The steering cylinders 21 and 22 change the steering angle θs. The pilot valve 42 controls the flow of fluid supplied to the steering cylinders 21 and 22. The joystick lever 24 is operated by the operator when the steering angle θs is to be changed, and controls the pilot valve 42. The pressure sensing unit 29 senses the pressure generated in the steering cylinders 21 and 22. The force imparting component 27 imparts an assisting force or a counterforce to the operation of the joystick lever 24. The controller 28, 228, or 328 controls the force imparting component 27 so as to generate resistance against the operation of the joystick lever 24 on the basis of the pressure value sensed by the pressure sensing unit 29.

Thus sensing the pressure generated in the steering cylinders 21 and 22 makes it possible to detect a state in which there is an obstacle during a steering operation of the wheel loader 1 so that operation is hindered, and a load is generated in the steering cylinders 21 and 22.

Then, when the operator operates the joystick lever 24, resistance is generated against the operation on the basis of the sensed pressure value. This allows the operator to feel that a load is being generated in the steering cylinders 21 and 22 by feeling the resistance. Therefore, when a high load is generated at the steering cylinders 21 and 22, it is possible to prevent the operator from trying to perform an impossible operation.

(2)

With the wheel loader 1 (an example of a work vehicle) in Embodiments 1 to 3, the pilot valve 42 (an example of a valve) is mechanically linked to the joystick lever 24 (an example of an operation member).

This allows the operator to directly feel the operation of the pilot valve 42.

(3)

With the wheel loader 1 (an example of a work vehicle) in Embodiments 1 to 3, the controller 28, 228, or 328 controls the force imparting component 27 so as to generate a larger resistance force as the pressure value increases.

This makes it possible to feel the increase in the pressure generated in the steering cylinders 21 and 22 from the resistance occurring in the joystick lever 24.

(4)

With the wheel loader 1 (an example of a work vehicle) in Embodiments 1 to 3, the controller 28, 228, or 328 increases the counterforce or reduces the assisting force produced by the force imparting component 27 and thereby generates resistance against the operation of the joystick lever 24.

As a result, resistance can be generated while imparting an assisting force or counterforce to the operation of the joystick lever 24.

(5)

With the wheel loader 1 (an example of a work vehicle) in Embodiments 1 to 3, the two steering cylinders 21 and 22 are provided. The steering cylinder 21 contracts and the steering cylinder 22 expands to change the steering angle θs toward either the left or right side. The steering cylinder 22 contracts and the steering cylinder 21 expands to change the steering angle θs toward the other side of the left and right sides. The pressure sensing unit 29 senses the pressure values PV1 and PV2 in the two steering cylinders 21 and 22. The controller 28, 228, or 328 controls the force imparting component 27 on the basis of the two pressure values PV1 and PV2.

When left and right steering operations of the wheel loader 1 are thus performed by the two steering cylinders 21 and 22, the force imparting section 27 is controlled so as to generate resistance to the operation of the joystick lever 24 on the basis of the pressure values PV1 and PV2 in the respective steering cylinders 21 and 22. This allows the operator to feel the load generated in the steering operation when operating the joystick lever 24.

(6)

With the wheel loader 1 (an example of a work vehicle) in Embodiments 1 to 3, the front frame 11 and the rear frame 12 are provided. The rear frame 12 is linked to the front frame 11 by the connecting shaft 13. The two steering cylinders 21 and 22 are disposed on the left and right sides of the connecting shaft 13 in the vehicle width direction, and change the angle of the front frame 11 with respect to the rear frame 12.

With an articulated work vehicle such as this, the operator can feel the load generated in the steering operation when operating the joystick lever 24.

(7)

With the wheel loader 1 (an example of a work vehicle) in Embodiments 1 to 3, the controller 28, 228, or 328 calculates the difference ΔP between the two pressure values PV1 and PV2, and controls the force imparting component 27 on the basis of this pressure difference ΔP.

For example, the resistance imparting part 27 can be controlled so that the larger is the absolute value of the pressure difference, the more the resistance to the operation of the joystick lever 24 is increased.

(8)

The wheel loader 1 (an example of a work vehicle) in Embodiments 1 to 3 further comprises the torque sensor 103 (an example of a torque sensor) that senses torque generated by operation of the joystick lever 24. The force imparting component 27 has the electric motor 111 as its drive source. The controller 28, 228, or 328 actuates the force imparting component 27 on the basis of the pressure value and the torque.

As a result, a force can be imparted according to the torque applied by the operator to the joystick lever 24. For example, the force imparting portion 27 can be controlled so that the assisting force to be imparted is increased when the torque imparted to the joystick lever 24 by the operator is large, and the assisting force is decreased when the torque is small.

(9)

The wheel loader 1 (an example of a work vehicle) in Embodiments 2 and 3 further comprises the vehicle speed sensor 105 (an example of a speed sensor) that senses the speed of the wheel loader 1. The controller 228 or 328 actuates the force imparting component 27 on the basis of the speed in addition to the pressure value and the torque.

As a result, the resistance can be varied according to the speed. For example, the resistance that is generated can be reduced when the speed is high, and the resistance can be increased as the speed drops.

(10)

With the wheel loader 1 (an example of a work vehicle) in Embodiment 3, the controller 328 has the summing component 304 (an example of a calculator) and the drive circuit 204 (an example of an operation controller). The summing component 304 matches the first assist torque (an example of a first imparted force) set in advance on the basis of the torque, and the second assist torque (an example of a second imparted force) set in advance on the basis of the pressure value, to calculate the force to be imparted to the operation of the joystick lever 24. The drive circuit 204 actuates the force imparting component 27 so as to impart the calculated force.

Consequently, while applying an assisting force or a counterforce with the force imparting portion 27 to the operation of the joystick lever 24, resistance can be generated against the operation of the joystick lever 24 according to the pressure generated in the steering cylinders 21 and 22.

(11)

The wheel loader 1 (an example of a work vehicle) in Embodiments 1 to 3 further comprises the vehicle speed sensor 105 (an example of a speed sensor), the first rotation angle sensor 101 (an example of a target steering angle sensor), and the second rotation angle sensor 102 (an example of an actual steering angle sensor). The vehicle speed sensor 105 senses the speed of the wheel loader 1. The first rotation angle sensor 101 senses the rotation angle θin (an example of a target steering angle) inputted with the joystick lever 24. The second rotation angle sensor 102 senses the steering angle θs (an example of an actual steering angle) that is changed by the steering cylinders 21 and 22. The first assist torque is set on the basis of the speed of the wheel loader 1 in addition to the torque. The second assist torque is set on the basis of the deviation angle α calculated from the value sensed by the first rotation angle sensor 101 and the value sensed by the second rotation angle sensor 102, in addition to the pressure value.

As a result, the counterforce or the assisting force imparted by the force imparting portion 27 to the operation of the joystick lever 24 can be varied depending on the speed, and resistance can be generated depending on the deviation angle α.

(12)

With the wheel loader 1 (an example of a work vehicle) in Embodiments 1 to 3, the pilot valve 42 (an example of a control valve) has the operation input shaft 61 (an example of a first input member), the feedback input shaft 62 (an example of a second input member), the first spring 64 (an example of a biasing component), and the second spring 65 (an example of a biasing component). The operation input shaft 61 is displaced according to the rotation angle θin (an example of a target steering angle). The feedback input shaft 62 is displaced according to the steering angle θs (an example of the actual steering angle). The first spring 64 and the second spring 65 bias the operation input shaft 61 so that the rotation angle θin (an example of a displacement amount) of the operation input shaft 61 matches the rotation angle θfb (=θss) (an example of a displacement amount) of the feedback input shaft 62. The difference between the rotation angle θin of the operation input shaft 61 and the rotation angle θfb (=θs) of the feedback input shaft 62 corresponds to the deviation angle α between the rotation angle θin and the steering angle θs. The joystick lever 24 is operated against the biasing force of the first spring 64 and the second spring 65.

Consequently, after the joystick lever 24 is operated, the steering angle θs changes following the joystick lever 24, and when the rotation angle θin of the joystick lever 24 matches the steering angle θs, the pilot valve 42 is in the neutral position Np.

Also, the pilot valve 42 is provided with the first spring 64 and the second spring 65, and the operator operates the joystick lever 24 with an operation force that goes against the biasing force of the first spring 64 and the second spring 65. The force imparting component 27 is controlled so as to generate resistance to the operation against this biasing force.

(13)

The wheel loader 1 (an example of a working vehicle) in Embodiments 1 to 3 further comprises the steering valve 32 that adjusts the flow of fluid supplied to the steering cylinders 21 and 22 on the basis of the pilot pressure inputted from the pilot valve 42. The pilot valve 42 controls the flow of fluid supplied from the steering valve 32 to the steering cylinders 21 and 22 by adjusting the pilot pressure.

Since the steering valve 32 is thus operated by pilot pressure, the load generated in the steering cylinders 21 and 22 is not transmitted to the joystick lever 24, but with the present invention, resistance to the operation of the joystick lever 24 is generated, which allows the operator to perceive information about the steering cylinders 21 and 22.

(14)

The method for controlling the wheel loader 1 (an example of a work vehicle) in Embodiments 1 to 3 comprises step S130 (an example of an acquisition step), steps S150 and S153 (an example of a generation step), and step S160 (an example of a transmission step). Step S130 (an example of an acquisition step) involves acquiring the detection signals S(PV1) and S(PV2) from the pressure sensing unit 29 that senses the pressure generated in the steering cylinders 21 and 22 (an example of a hydraulic actuator). Steps S150 and S153 (an example of a generation step) involve generating a target assist torque signal S(T2) (an example of a control signal) for generating resistance on the basis of the sensing signals S(PV1) and S(PV2) in response to the operation of the joystick lever 24 (an example of an operation member) by the operator when changing the steering angle θs. In step S160 (an example of a transmission step), the target assist torque signal S(T2) is transmitted to the force imparting component 27 that imparts an assisting force or a counterforce to the operation of the joystick lever 24.

Thus sensing the pressure generated in the steering cylinders 21 and 22 makes it possible to detect a state in which there is an obstacle during a steering operation of the wheel loader 1 so that operation is hindered, and a load is generated in the steering cylinders 21 and 22.

Then, when the operator operates the joystick lever 24, resistance is generated against the operation on the basis of the sensed pressure value. This allows the operator to feel that a load is being generated in the steering cylinders 21 and 22 by feeling the resistance. Therefore, when a high load is generated at the steering cylinders 21 and 22, it is possible to prevent the operator from trying to perform an impossible operation.

Other Embodiments

Embodiments of the present invention were described above, but the present invention is not limited to or by the above embodiments, and various modifications are possible without departing from the gist of the disclosure.

(A)

In Embodiment 3, in the case of high speed shown in FIG. 21, an assisting force is imparted to the lever counterforce (see L30) produced by the spring force of the first spring 64 and the second spring 65 of the pilot valve 42, but a counterforce may be imparted so that the lever counterforce becomes greater than the spring force of the pilot valve 42.

Figure 22:
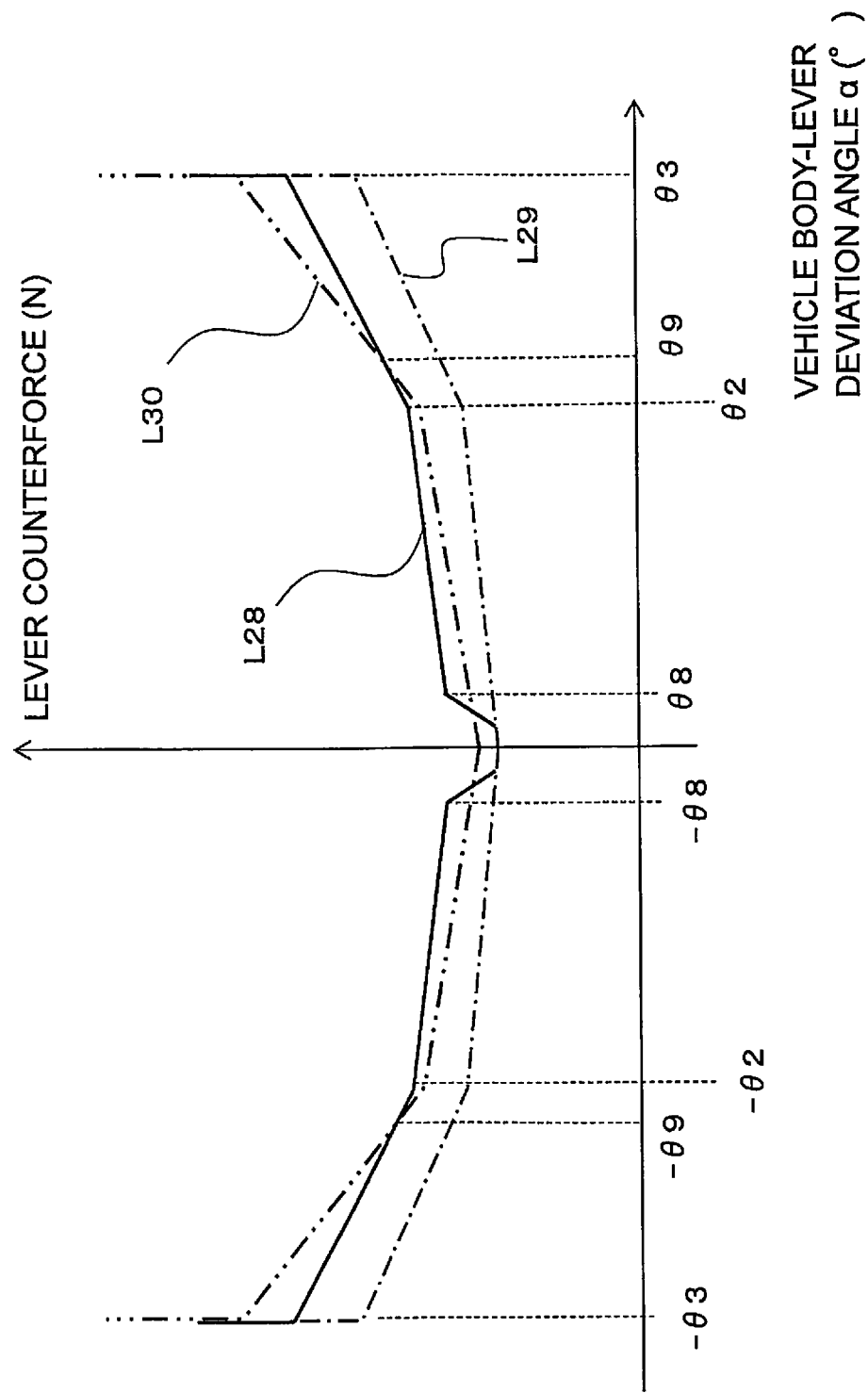
FIG. 22 is a graph of lever counterforce versus vehicle body-lever deviation angle when assist torque is and is not imparted at a high vehicle speed in a modification example of Embodiment 3 of the present invention.

FIG. 22 illustrates when the lever counterforce becomes greater than the spring force of the pilot valve 42, and is a graph of the lever counterforce versus the deviation angle when assist torque is imparted to the operation of the joystick lever 24 at a high vehicle speed. The solid line L28 shown in FIG. 22 indicates the lever counterforce when the pressure difference ΔP corresponding to the rotation direction at a high speed is large (such as +20 MPa in clockwise rotation and −20 MPa in counterclockwise rotation), and the one-dot chain line L29 indicates the lever counterforce when the pressure difference ΔP corresponding to the rotation direction at a high speed is small (such as 0 MPa or less in clockwise rotation and 0 MPa or more in counterclockwise rotation).

When the pressure difference ΔP is small, as in L29, since the counterforce imparted by the second assist torque information is substantially zero, so the assisting force is imparted by the first assist torque information.

L28 intersects with L30, which indicates the lever counterforce when no assist torque is imparted, at the deviation angles ±θ8 and ±θ9. With L28, the force needed to operate the joystick lever 24 is greater than L30 between the deviation angles θ8 to θ9 and between −θ9 and −θ8.

That is, when the joystick lever 24 is operated to the right, the force imparting component 27 imparts a force to the input shaft 81b in the counterclockwise direction while the deviation angle α is between θ8 and θ9.

Suitably setting the first assist torque information and the second assist torque information in this manner allows counterforce to be imparted to the operation of the joystick lever 24.

Figure 23:
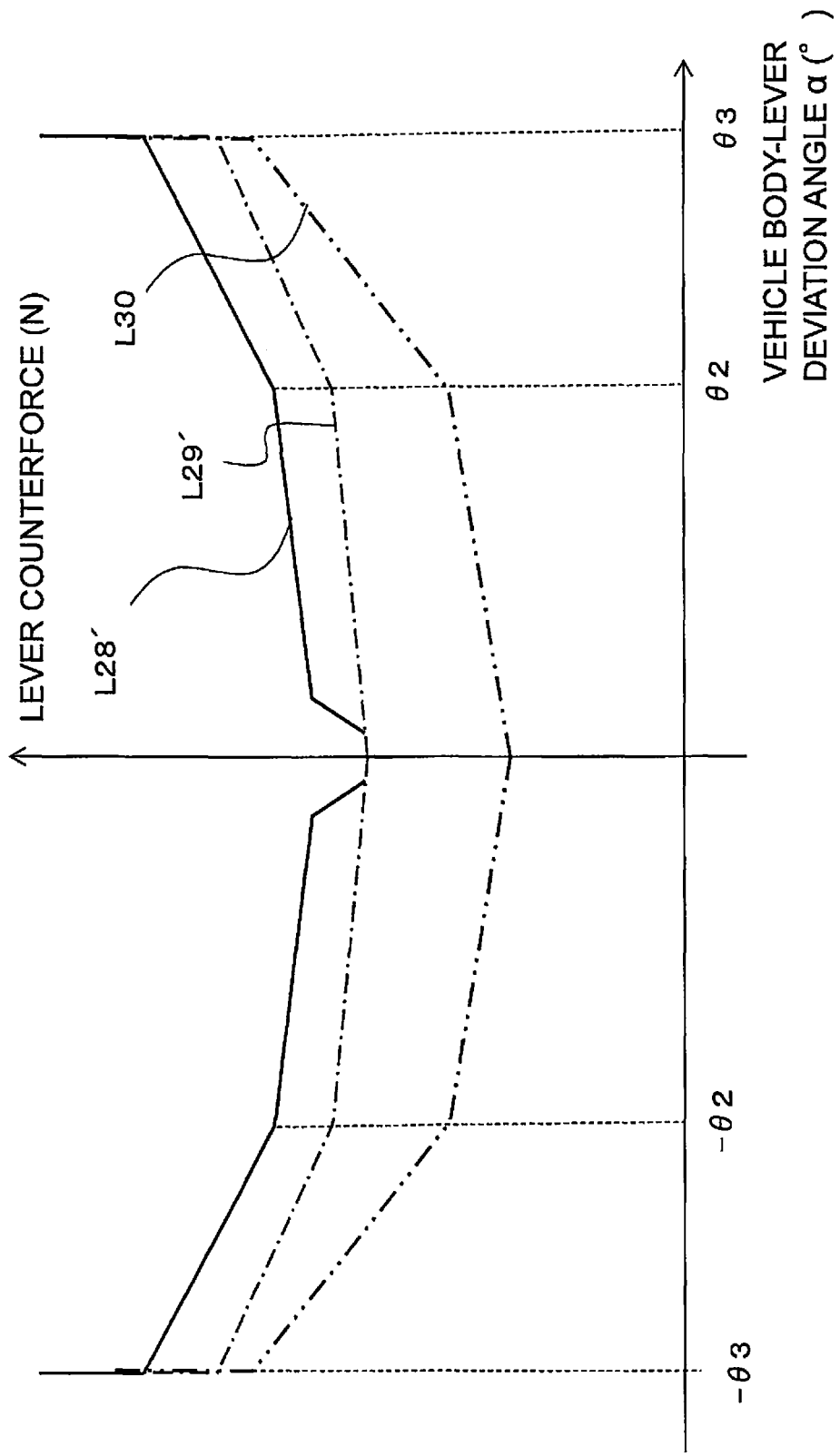
FIG. 23 is a graph of lever counterforce versus vehicle body-lever deviation angle when assist torque is and is not imparted at a high vehicle speed in a modification example of Embodiment 3 of the present invention.

Also, as shown in FIG. 23, when the pressure difference ΔP is 20 MPa (solid line L28') and the pressure difference ΔP is 0 MPa (one-dot chain line L29'), the lever counterforce may be set larger than L30 over the entire range of deviation angles (−θ3 to +θ3). In this case, when the pressure difference ΔP increases, resistance against the operation of the joystick lever 24 is generated by controlling the force imparting component 27 so as to increase the counterforce.

(B)

In the above embodiments, the wheel loader 1 is used as an example of a work vehicle, but the work vehicle may be an articulated dump truck, motor grader, or the like, and it is not even limited to an articulated type. In the following description, a forklift will be used as an example of a work vehicle.

(B-1)

Figure 24:
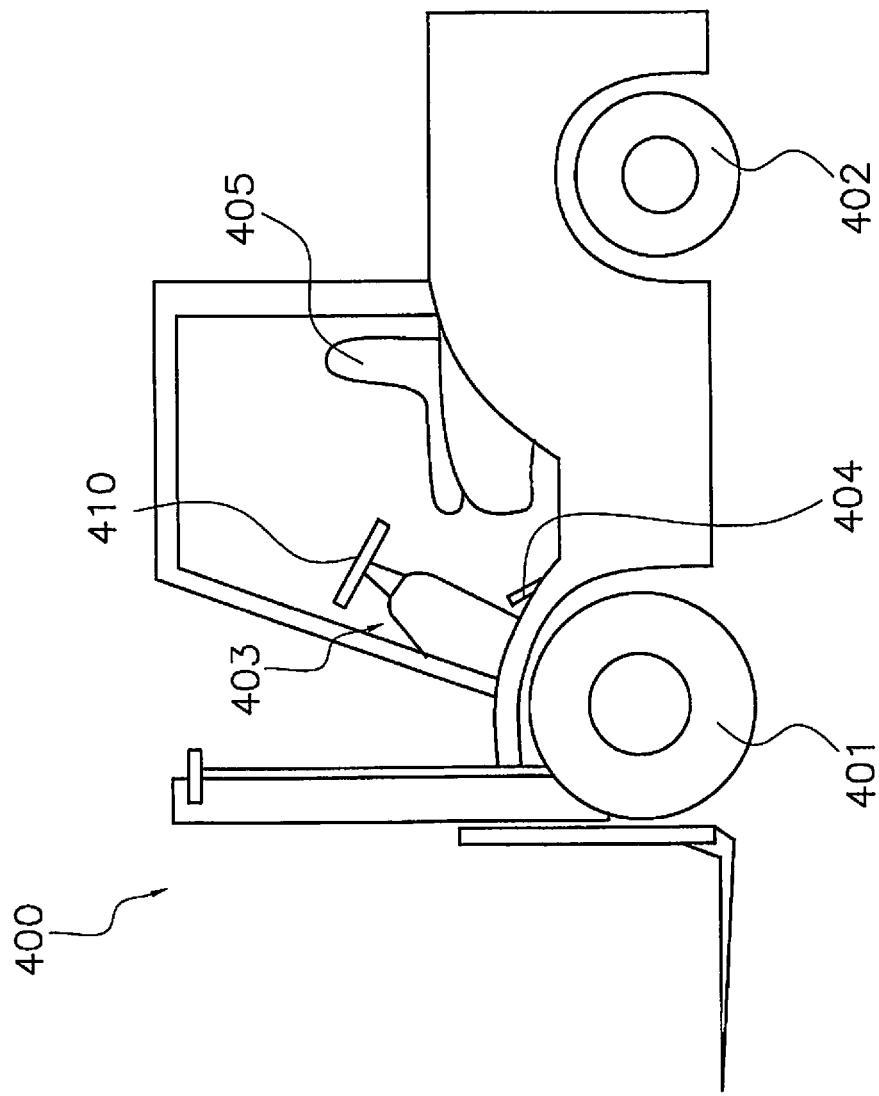
FIG. 24 is a diagram showing the appearance of a forklift in a modification example of an embodiment of the present invention.

FIG. 24 is a diagram of a forklift 400. The forklift 400 comprises a pair of left and right front wheels 401, a pair of left and right rear wheels 402, a steering operation device 403 (see FIG. 25), an accelerator pedal 404, a driver's seat 405, and so on. The front wheels 401 are used for both drive and steering. The steering operation device 403 has a steering wheel 410, and the steering wheel 410 is operated by the operator to turn the front wheels 401 to the left and right and thereby change the steering angle.

Figure 25:
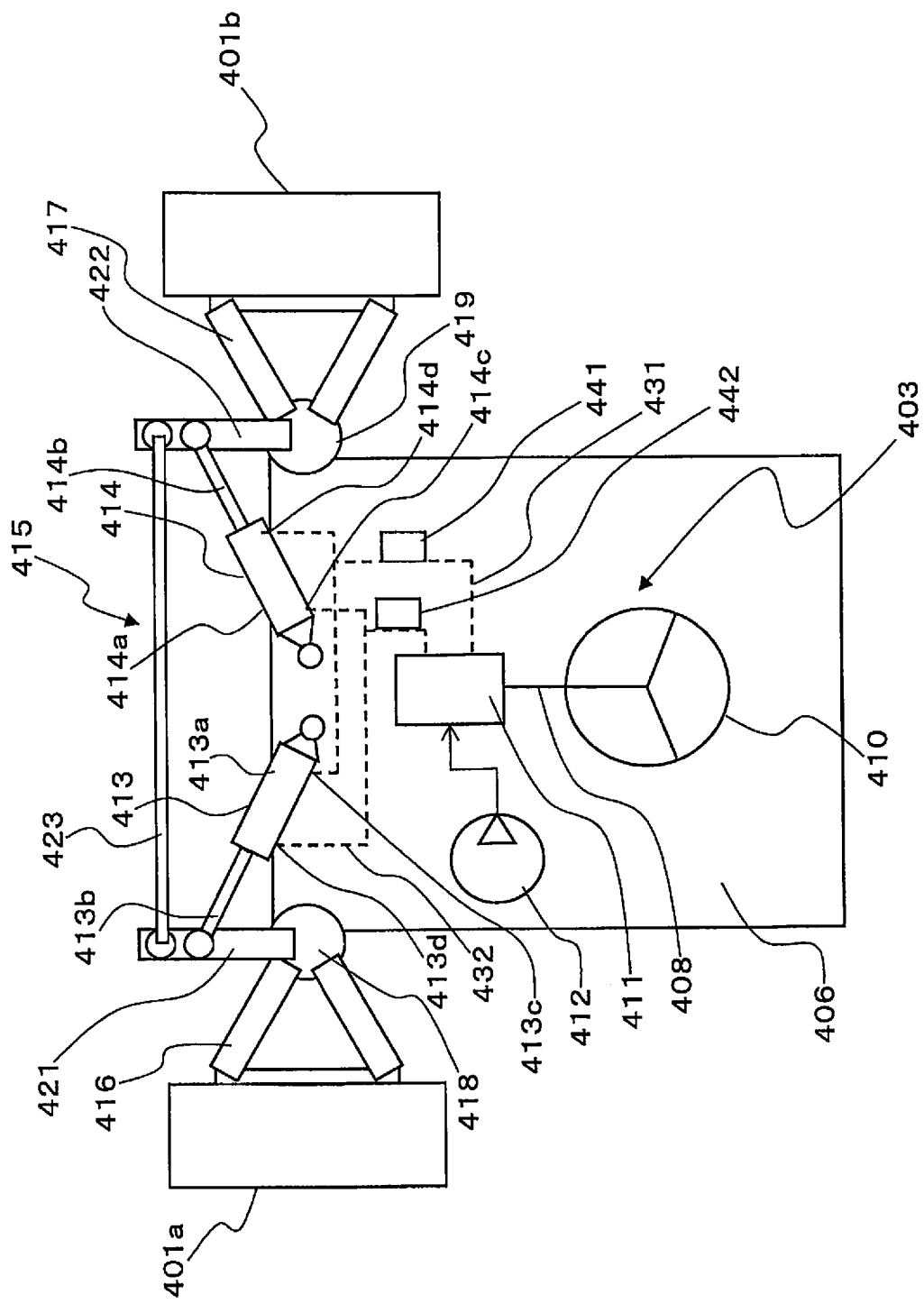
FIG. 25 shows an example of a steering operation device in the forklift in FIG. 24.

FIG. 25 is a simplified diagram of the configuration of the steering operation device 403. The steering operation device 403 mainly has the steering wheel 410, an Orbit Roll (registered trademark) 411, a pump 412, steering cylinders 413 and 414, a link mechanism 415, arms 416 and 417, and rotary shafts 418 and 419.

The steering wheel 410 is connected to the Orbit Roll 411 via a column 408. The Orbit Roll 411 supplies the fluid supplied from the pump 412 to the steering cylinders 413 and 414 as the steering wheel 410 rotates.

The front wheel 401 on the left side shall be called the front wheel 401a, and the front wheel 401 on the right side the front wheel 401b. The rotating shafts 418 and 419 are rotatably attached to the frame 406 of the forklift 400. The front wheel 401a is linked to the rotary shaft 418 via the arm 416. The front wheel 401b is linked to the rotary shaft 419 via the arm 417. The link mechanism 415 is constituted by an arm 421 that projects forward from the rotary shaft 418, an arm 422 that projects forward from the rotary shaft 419, and a link 423 that links the distal ends of the arm 421 and the arm 422.

The distal end of a cylinder tube 413a of the steering cylinder 413 is linked to the frame 406. The distal end of a piston rod 413b of the steering cylinder 413 is linked to the arm 421. The distal end of a cylinder tube 414a of the steering cylinder 414 is linked to the frame 406. Also, the distal end of a piston rod 414b of the steering cylinder 414 is linked to the arm 422.

A first fluid path 431 is provided connecting an extension port 413c of the steering cylinder 413 and a contraction port 414d of the steering cylinder 414 from the orbit roll 411. A second fluid path 432 is provided connecting a contraction port 413d of the steering cylinder 413 and an extension port 414c of the steering cylinder 414 from the orbit roll 411. Also, a first pressure sensor 441 is provided to the first fluid path 431 to sense the pressure in the space on the extension port 413c side of the steering cylinder 413 and the space on the contraction port 414d side of the steering cylinder 414. A second pressure sensor 442 is provided to the second fluid path 432 to sense the pressure in the space on the contraction port 413d side of the steering cylinder 413 and the space on the extension port 414c side of the steering cylinder 414.

When the steering wheel 410 is turned to the right, the amount of fluid supplied from the Orbit Roll 411 to the extension port 414c of the steering cylinder 414 and the contraction port 413d of the steering cylinder 413 through the second fluid path 432 increases. Consequently, the steering cylinder 413 contracts, the steering cylinder 414 extends, and the arms 421 and 422 rotate to the right. Therefore, the arms 416 and 417 fixed to the rotary shafts 418 and 419 also rotate to the right, and the front wheels 401a and 401b turn to the right.

When the steering wheel 410 is turned to the left, the amount of fluid supplied from the Orbit Roll 411 to the extension port 413c of the steering cylinder 413 and the contraction port 414d of the steering cylinder 414 through the first fluid path 431 increases. Consequently, the steering cylinder 413 extends, the steering cylinder 414 contracts, and the front wheels 401a and 401b turn to the left.

If there is an obstacle when vehicle is turned to the right, and the pressure increases in the space on the contraction port 413d side of the steering cylinder 413 and in the space on the extension port 414c side of the steering cylinder 414, the value of the second pressure sensor 442 becomes larger than the value of the first pressure sensor 441. To describe this through reference to FIG. 9, if we let the first pressure sensor 108 shown in FIG. 9 be the first pressure sensor 441 and the second pressure sensor 109 be the second pressure sensor 442, the pressure difference is calculated by subtracting the pressure value of the first pressure sensor 441 from the pressure value of the second pressure sensor 442. Since the value sensed by the second pressure sensor 442 is greater than the value sensed by the first pressure sensor 441, the pressure difference has a positive value. Therefore, as shown by L1a and L3a, the assisting force to clockwise rotation of the steering wheel 410 decreases, and the operator feels resistance to the operation when the steering wheel 410 is turned (the operation can be said to be heavier).

Thus, the operator can feel that a load is being generated in the steering cylinders 413 and 414.

(B-2)

Also, with the steering operation device 403 of the forklift 400, two steering cylinders are provided, but this is not the only option, and a so-called integral steering type of steering operation device may be used. As above, the front wheels 401 are driven and steered wheels; Also, the front wheel 401 on the left side is the front wheel 401a, and the front wheel 401 on the right side is the front wheel 401b.

Figure 26:
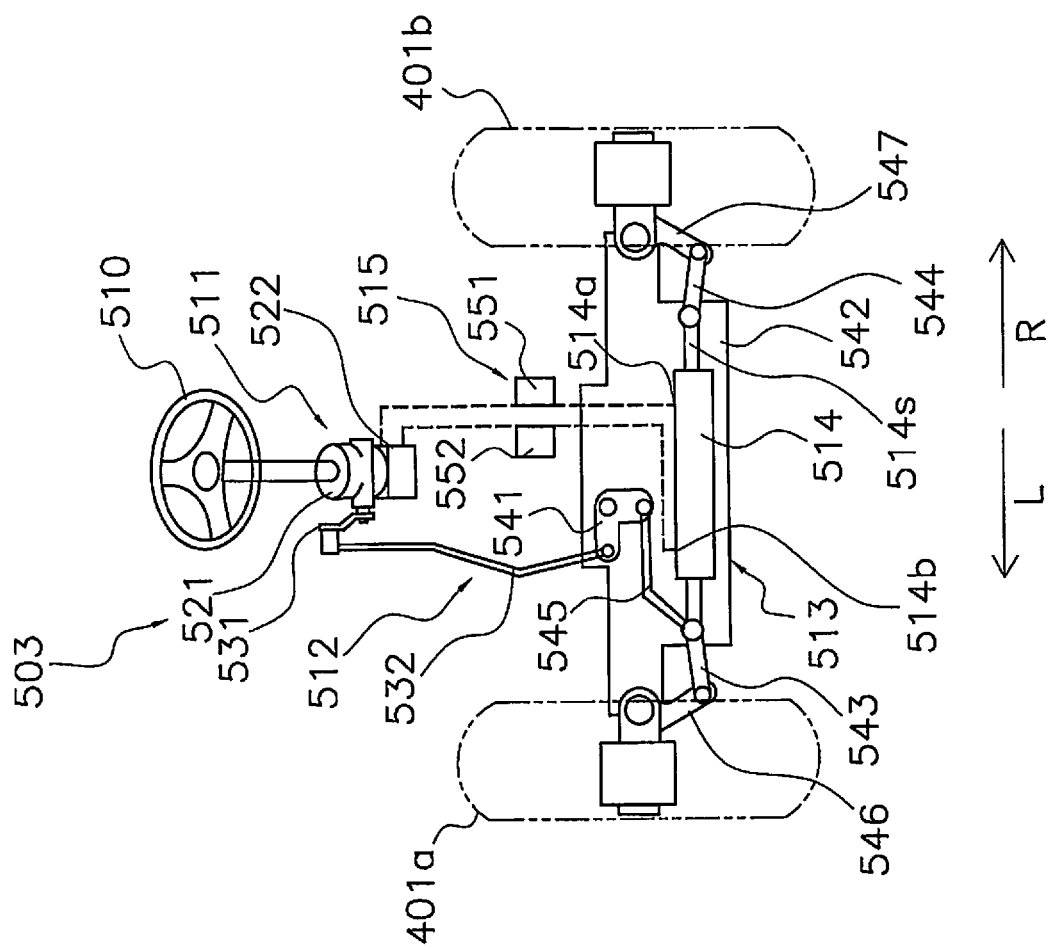
FIG. 26 shows an example of a steering operation device in the forklift in FIG. 24.

FIG. 26 is a diagram of the configuration of a steering operation device 503, which is an integral steering type. The steering operation device 503 mainly comprises a steering wheel 510, a power steering gear box 511, a link mechanism 512, an axle 513, a power cylinder 514, and a pressure sensing unit 515.

The power steering gear box 511 has an actuator 521 for actuating the link mechanism 512 and a hydraulic circuit 522 for supplying fluid to the power cylinder 514.

One end of the link mechanism 512 is linked to the actuator 521, and the other end is linked to the axle 513. The link mechanism 512 is mainly made up of a Pitman arm 531 and a drag link 532 that are linked together. The Pitman arm 531 is linked to the actuator 521, and the drag link 532 is linked to a bell crank 541 of the axle 513.

The axle 513 has the bell crank 541, an axle beam 542 in which the bell crank 541 is rotatably disposed, left and right parallel links 543 and 544, a tie rod 545 connecting one of the parallel links 543 and 544 and the bell crank 541, and knuckles 546 and 547 to which the parallel links 543 and 544 are respectively linked. The left and right knuckles 546 and 547 of the axle 513 are linked to the front wheels 401a and 401b, respectively.

Also, the power cylinder 514 is disposed in the left and right direction, and has a rod in both of the left and right directions. The rods 514s of the power cylinder 514 are linked to the left and right parallel links 543 and 544. The power cylinder 514 is supplied with fluid from the hydraulic circuit 522 of the power steering gear box 511, and actuates the left and right parallel links 543 and 544, thereby generating assisting force for steering.

The pressure sensing unit 515 has a second pressure sensor 551 and a first pressure sensor 552. The second pressure sensor 551 senses the pressure in the space on the first port 514a side that moves the rods 514s of the power cylinder 514 to the left (see the arrow L). The first pressure sensor 552 senses the pressure in the space on the second port 514b side that moves the rods 514s of the power cylinder 514 to the right (see the arrow R). When the rods 514s move to the left, the knuckles 546 and 547 rotate to the right, the front wheels 401a and 401b turn to the right, and the vehicle is steered to the right. When the rods 514s move to the right, the knuckles 546 and 547 rotate to the left, the front wheels 402a and 402b turn to the left, and the vehicle is steered to the left.

For example, if there is an obstacle when vehicle is turned to the right, and the pressure increases in the space on the first port 514a side of the power cylinder 514, the value of the second pressure sensor 551 becomes larger than the value of the first pressure sensor 552. To describe this through reference to FIG. 9, if we let the first pressure sensor 108 shown in FIG. 9 be the first pressure sensor 552 and the second pressure sensor 109 be the second pressure sensor 551, the pressure difference is calculated by subtracting the pressure value of the first pressure sensor 552 from the pressure value of the second pressure sensor 551. Since the value sensed by the second pressure sensor 551 is greater than the value sensed by the first pressure sensor 552, the pressure difference has a positive value. Therefore, as shown by L1a and L3a, the assisting force to clockwise rotation of the steering wheel 410 decreases, and the operator feels resistance to the operation when the steering wheel 410 is turned (the operation can be said to be heavier).

Thus, the operator can feel that a load is being generated in the power cylinder 514.

As described in Embodiment 2, a configuration in which the assist torque is varied according to the speed may be applied to the steering operation devices 403 and 503 described in (B-1) and (B-2) above.

(C)

In the above embodiments, the controller 28 stores assist torque information for pressure differences (0 MPa or less, +10 MPa, or +20 MPa in clockwise rotation, 0 MPa or more, −10 MPa, or −20 MPa in counterclockwise rotation), but these pressure values are not the only options.

Also, there are three sets of assist torque information for large, medium, and small pressure differences corresponding to the rotation direction, but the number of sets of assist torque information is not limited to three, and there may be two, or four or more sets. When the assist torque is varied smoothly by performing interpolation, it is preferable to provide three or more sets of information.

(D)

In the above embodiments, the controller 28 stores first assist torque information for three speeds (0 km/h, 25 km/h, and 40 km/h), but these speeds are not the only options. Also, the first assist torque information is not limited to three sets, and two sets or four or more sets may be provided. When the assist torque is smoothly varied according to the speed, it is preferable to provide three or more sets of information.

(E)

In the above embodiments, the controller 28 stores three sets of assist torque information, and the assist torque is continuously varied according to the pressure value by interpolation, but it may be varied stepwise.

For example, when rotation to the right is performed, we will let the assist torque information when the pressure difference is small be the one-dot chain line L1a in FIG. 10, the assist torque information when the pressure difference is medium be the dotted line L2a in FIG. 10, and the assist torque information when the pressure difference is large be the solid line L3a in FIG. 10. Then, for example, when the pressure difference is small, the value can be set to be greater than a predetermined value of 0 MP or less (such as −10 MPa) and less than 6.5 MPa, when the pressure difference is medium the value can be at least 6.5 MPa and no more than 13.5 MPa, and when the pressure difference is large the value can be greater than 13.5 MPa and no more than 20 MPa. Also, when a rotation to the left is performed, we will let the assist torque information when the pressure difference is small be the one-dot chain line L1b in FIG. 10, the assist torque information when the pressure difference is medium be the dotted line L2b in FIG. 10, and the assist torque information when the pressure difference is large be the solid line L3b in FIG. 10. When the pressure difference is small, the value can be set to be less than a predetermined value of 0 MP or more (such as +10 MPa) and greater than −6.5 MPa, when the pressure difference is medium the value can be between 6.5 MPa or less and 13.5 MPa or more, and when the pressure difference is large the value can be between less than −13.5 MPa and 20 MPa or more.

In such a case, when the joystick lever 24 is operated, the controller 28 determines whether the pressure difference calculated by the pressure difference calculator 202 corresponds to the above-mentioned large, medium, or small. The assist torque is then determined from the steering torque signal by using the assist torque information for the determined pressure difference. The number of levels is not limited to three, and the range may be divided into two levels, or may be divided into three or more levels.

(F)

In Embodiment 3, as shown in FIG. 18A, the controller 328 stores three pieces of first assist torque information, and the assist torque is continuously varied according to the speed by interpolation, but it may be varied stepwise.

For example, the first assist torque information at low speed is indicated by a solid line L11 in FIG. 18A, the first assist torque information at medium speed is indicated by a dotted line L12 in FIG. 18A, and the first assist torque information at high speed is indicated by a one-dot chain line L13 in FIG. 18A. For example, a low speed is set to a speed of less than 15 km/hour, a medium speed is set to a speed of between 15 km/hour or more and less than 25 km/hour, and a high speed is set to a speed of between 25 km/hour or more and 40 km/hour or less. Also, for example, 15 km/hour can be set as a first threshold value, and 25 km/hour can be set as a second threshold value.

In such a case, when the joystick lever 24 is operated, the controller 28 compares the speed sensed by the vehicle speed sensor 105 with the first threshold value and the second threshold value, and determines whether the vehicle speed corresponds to low, medium, or high speed. Then, using the first assist torque information for the determined speed, the first assist torque is determined from the steering torque signal. The number of speeds is not limited to three, and the range may be divided into just two speeds, or may be divided more finely than three speeds.

(G)

In Embodiments 1 to 3, the operation direction of the joystick lever 24 is sensed by the torque sensor 103, but the operation direction may instead be sensed by using the vehicle body-lever deviation angle α sensed by the first rotation angle sensor 101 and the second rotation angle sensor 102.

Also, instead of using the value sensed by the second rotation angle sensor 102, the vehicle body-lever deviation angle α may be calculated from the steering angle θs sensed by the steering angle sensor 104 and the rotation angle θin sensed by the first rotation angle sensor 101.

Furthermore, the vehicle body-lever deviation angle α may be calculated from the steering angle θs calculated from the values sensed by the cylinder stroke sensors 106 and 107, and the rotation angle θin sensed by the first rotation angle sensor 101.

(H)

In Embodiment 3, as shown in FIG. 18B, in the second assist torque information, the counterforce linearly increases while the absolute value of the deviation angle when the joystick lever 24 is operated to the right or the left is between θ4 and θ5, but it may instead increase exponentially.

In order to prevent vibration caused by hunting, it is preferable to increase the resistance laterally, without it rising vertically.

Also, in Embodiment 3, a constant counterforce is imparted at a deviation angle α of +θ5 or more and −θ5 or less, a constant value is not the only option.

(I)

In Embodiments 1 to 3, the assist torque is determined on the basis of the pressure difference, but the assist torque may be determined on the basis of the hydraulic pressure in each line, without calculating the differential pressure. For example, in FIG. 2, the assist torque may be determined on the basis of the amount of change from the pressure of the second steering line 39 in a state in which the steering valve 32 is in the neutral position Ns, and the amount of change from the pressure in the first steering line 38 in a state in which the steering valve 32 is in the neutral position Ns.

(J)

In Embodiments 1 to 3, the two springs (the first spring 64 and the second spring 65) are provided, but the second spring 65 need not be provided. In this case, for example, the feedback spool 73 and the feedback sleeve 74 should be fixed together.

(K)

In Embodiments 1 to 3, the amount of fluid supplied from the steering valve 32 to the steering cylinders 21 and 22 is controlled according to the pilot pressure inputted from the pilot valve 42 (an example of a control valve), but the configuration may be such that the fluid from the pilot valve 42 is supplied directly to the steering cylinders 21 and 22.

(L)

In the above embodiments, a force is generated by the electric motor 111, but the electric motor is not the only option, and a hydraulic motor or the like may be used. In other words, any actuator or the like that can generate the force to be imparted can be used.

(M)

In the above embodiments, the drive circuit 204 is included in the controller 28, but it may not be included in the controller 28, and only the drive circuit 204 may be mounted as a unit. Furthermore, the drive circuit 204 may be mounted on an electric motor (N)

In the above embodiments, the force imparting component 27 imparts an assisting force or a counterforce to the input shaft component 81b, but this is not the only option, and an assisting force or counterforce may be imparted at any position from the joystick lever 24 to the pilot valve 42. For example, the force imparting component 27 may impart an assisting force or counterforce to the operation input shaft 61.

(O)

In the above embodiments, as illustrated in FIG. 10, for example, the assist torque force is in left and right symmetry with respect to the absolute value of the input torque, but it may instead be asymmetrical to the left and right.

(P)

In the above embodiments, the joystick lever 24 and the pilot valve 42 are mechanically linked by the connecting portion 25, but they may be electrically linked instead of being mechanically linked. The term "electrically linked" means that electric signals can be communicated, and this communication may be performed over a wire or wirelessly. Also, communication of the electric signal may not be performed directly, and may instead be performed indirectly, so that the operation of the joystick lever 24 is transmitted to the controller or the like, and a command is transmitted from the controller to the pilot valve 42.

Modification examples of Embodiment 1 will now be described in detail. These modifications can also be applied to Embodiments 2 and 3.

In the above embodiments, the joystick lever 24 and the pilot valve 42 are mechanically linked by the connecting portion 25, but this is not the only option. The joystick lever 24 and the pilot valve may not mechanically linked, and the operation of the joystick lever 24 may be electrically transmitted to the pilot valve to operate the pilot valve.

Figure 27:
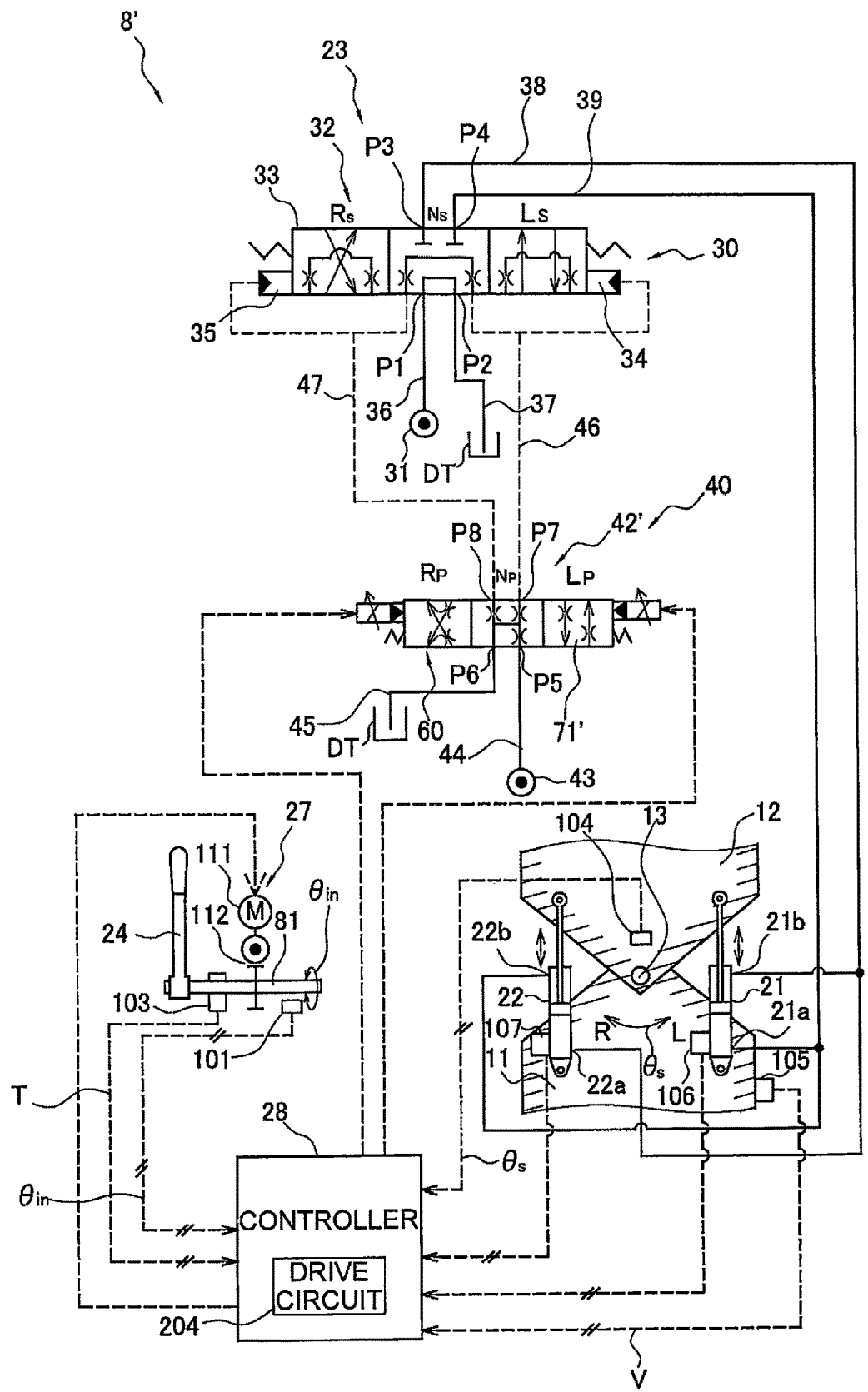
FIG. 27 is a diagram of the configuration of the steering operation device in a modification example of an embodiment of the present invention.

FIG. 27 is a diagram of a steering operation device 8' as an example of a configuration in which the operation of the joystick lever 24 is electrically transmitted to the pilot valve 42'. The pilot valve 42' shown in FIG. 27 is of a spool type instead of the rotary type in the above embodiments. The pilot valve 42' has a valve body component 60 including a spool 71' and a sleeve (not shown), and the spool 71' is able to move between the neutral position Np, the left pilot Position Lp, and right pilot position Rp by means of a signal from the controller 28, using the sleeve as a reference.

With the configuration shown in FIG. 27, for example, the universal joint 83 shown in FIG. 5 is not provided. The joystick lever 24 is linked to the steering operation shaft 81. The steering operation shaft 81 is not linked to the pilot valve. Just as in the above embodiments, the force imparting component 27 imparts an assisting force or a counterforce to the steering operation shaft 81. Also, the first rotation angle sensor 101 senses the rotation angle θin of the steering operation shaft 81 and transmits it to the controller 28.

Also, the link mechanism 26 for linking the pilot valve and the front frame 11 as shown in FIG. 5 is not provided.

The steering angle θs of the front frame 11 relative to the rear frame 12 is detected by the steering angle sensor 104 and transmitted to the controller 28.

The controller 28 sends a command to the pilot valve 42' to control the movement of the spool 71' of the pilot valve 42' on the basis of the received information about the rotation angle θin and the steering angle θs. Movement of the spool 71' changes the pilot pressure supplied from the pilot valve 42' to the steering valve 32, and also changes the amount of fluid supplied from the steering valve 32 to the steering cylinders 21 and 22. This causes a steering operation to be performed. At this point, the controller 28 may control so that the rotation angle θin and the steering angle θs coincide by controlling the pilot pressure to reduce the difference between θin and θs.

Figure 28:
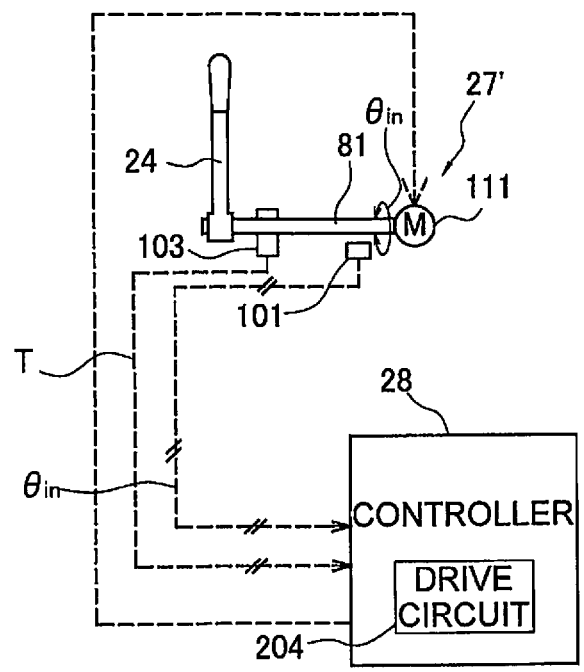
FIG. 28 is a diagram of the configuration of a force imparting component in a modification example of an embodiment of the present invention.

With the steering operation device 8', the force of the electric motor 111 is transmitted to the steering operation shaft 81 by the worm gear 112, but as with the force application portion 27' shown in FIG. 28, the worm gear 112 or other such reduction gear device may not be installed, and the rotary shaft of the electric motor 111 may be directly linked to the steering operation shaft 81.

With the steering operation device 8 shown in FIG. 5, the joystick lever 24 itself is able to rotate around a vertical axis, inside or outside the driver's seat. The joystick lever 24 of the steering operation device 8' shown in FIG. 27 may itself be able to rotate around a horizontal axis, inside or outside the driver's seat. In other words, the configuration may be such that the pilot valve 42' is actuated on the basis of the operation of the joystick lever 24, and the force from the force imparting component 27 can be transmitted to the joystick lever 24.

As described above, electrical transmission may be performed either by wire or wirelessly.

The work vehicle and work vehicle control method of the present invention have the effect of allowing an operator to feel the load generated in the hydraulic actuator during a steering operation, and are useful with a wheel loader, a forklift, and the like.

The invention claimed is:

1. A work vehicle, comprising:
    a first hydraulic actuator and a second hydraulic actuator configured to vary a steering angle
        the first hydraulic actuator contracting and the second hydraulic actuator expanding to change the steering angle toward a left side,
        the second hydraulic actuator contracting and the first hydraulic actuator expanding to change the steering angle toward the right side;
    a control valve configured to control flow of fluid supplied to the first and second hydraulic actuators;
    an operation member mechanically linked to the control valve, the operation member being configured
        to be operated by an operator and
        to control the control valve when varying the steering angle;
    a pressure sensing unit configured to sense a first pressure produced by the first hydraulic actuator and a second pressure produced by the second hydraulic actuator;
    a force imparting component configured to impart an assisting force or a counterforce to operation of the operation member; and
    a controller configured to control the force imparting component so as to generate a resistance to operation of the operation member based on the first pressure and the second pressure detected by the pressure sensing unit, the controller calculating a pressure difference between the first pressure and the second pressure and controlling the force imparting component such that the resistance becomes larger as the pressure difference increases.

2. The work vehicle according to claim 1, wherein
    the controller is further configured to generate resistance to operation of the operation member by decreasing the assisting force or increasing the counterforce produced by the force imparting component.

3. The work vehicle according to claim 1, further comprising:
    a front frame; and
    a rear frame linked to the front frame at a linking shaft,
    one of the first and second hydraulic actuators being disposed to the left and the other of the first and second hydraulic cylinders being disposed to the right, respectively, of the linking shaft along a vehicle width direction, and the first and second hydraulic actuators being configured to vary an angle of the front frame with respect to the rear frame.

4. The work vehicle according to claim 1, further comprising:
    a torque sensor configured to detect a torque generated by operation of the operation member,
    the force imparting component having an electric motor, and
    the controller being further configured to actuate the force imparting component based on the first pressure, the second pressure, and the torque.

5. The work vehicle according to claim 4, further comprising:
    a speed sensor configured to detect speed of the work vehicle,
    the controller being further configured to actuate the force imparting component based on the speed in addition to the first pressure, the second pressure, and the torque.

6. The work vehicle according to claim 4, wherein the controller includes
    a calculator configured to calculate a force to be imparted to operation of the operation member by combining
        a first imparted force set based on the torque, and
        a second imparted force set based on the pressure; and
    an actuation controller configured to actuate the force imparting component so as to impart the calculated force.

7. The work vehicle according to claim 1, further comprising:
    a steering valve configured to adjust flow of fluid supplied to the hydraulic actuator based on pilot pressure inputted from the control valve,
    the control valve controlling the flow of fluid supplied from the steering valve to the hydraulic actuator by adjusting the pilot pressure.

8. A work vehicle, comprising:
    a hydraulic actuator configured to vary a steering angle;
    a control valve configured to control flow of fluid supplied to the hydraulic actuator;
    an operation member configured
        to be operated by an operator and
        to control the control valve when varying the steering angle;
    a pressure sensing unit configured to detect a pressure produced by the hydraulic actuator;
    a force imparting component having an electric motor arranged and configured to impart an assisting force or a counterforce to operation of the operation member; and a torque sensor configured to detect a torque generated by operation of the operation member;
a speed sensor configured to detect a speed of the work vehicle;
a target steering angle sensor configured to detect a target steering angle inputted with the operation member;
an actual steering angle sensor configured to detect the actual steering angle changed by the hydraulic actuators; and
a controller configured to control the force imparting component so as to generate resistance to operation of the operation member based on the pressure detected by the pressure sensing unit and the torque detected by the torque sensor,
the controller including
a calculator configured to calculate a force to be imparted to operation of the operation member by combining
a first imparted force that is set based on the torque detected by the torque sensor and the speed detected by the speed sensor, a first imparted force set based on the torque detected by the torque sensor and the speed detected by the speed sensor, and
a second imparted force that is set based on the pressure detected by the pressure sensing unit and a deviation angle calculated from the target steering angle detected by the target steering angle sensor and the actual steering angle detected by the actual steering angle sensor, and
an actuation controller configured to actuate the force imparting component so as to impart the calculated force.

9. The work vehicle according to claim 8, wherein
the operating member is a joystick lever,
the control valve includes
a first input member configured to be displaced according to the target steering angle,
a second input member configured to be displaced according to the actual steering angle, and
a biasing component configured to bias the first input member so that displacement of the first input member matches displacement of the second input member,
a difference between the displacement of the first input member and the displacement of the second input member corresponds to the deviation angle between the target steering angle and the actual steering angle, and
the joystick lever is operated against biasing force of the biasing component.

10. A control method for a work vehicle, comprising:
acquiring a detection signal from a pressure sensing unit configured to detect a first pressure and a second pressure produced by a first hydraulic actuator and a second hydraulic actuator, respectively, the first and second hydraulic actuators being configured and arranged to vary a steering angle in response to an operating position of a control valve configured to control flow of fluid supplied to the first and second hydraulic actuators,
the first hydraulic actuator contracting and the second hydraulic actuator expanding to change the steering angle toward a left side,
the second hydraulic actuator contracting and the first hydraulic actuator expanding to change the steering angle toward the right side;
calculating a pressure difference between the first pressure and the second pressure;
based on the difference, generating a control signal to generate a resistance to operation of an operating member by an operator when varying the steering angle, the operating member being mechanically linked to the control valve, and the control signal being generated such that the resistance becomes larger as the pressure difference increases; and
transmitting the control signal to a force imparting component configured to impart an assisting force or a counterforce to operation of the operation member.

* * * * *